United States Patent
Nagata

(10) Patent No.: US 6,927,920 B2
(45) Date of Patent: Aug. 9, 2005

(54) ZOOM OPTICAL SYSTEM AND IMAGING APPARATUS USING THE SAME

(75) Inventor: Tetsuo Nagata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/457,363

(22) Filed: Jun. 10, 2003

(65) Prior Publication Data

US 2004/0201901 A1 Oct. 14, 2004

Related U.S. Application Data

(63) Continuation-in-part of application No. 10/411,155, filed on Apr. 11, 2003, now abandoned.

(51) Int. Cl.[7] .......................... G02B 15/15; G02B 15/14
(52) U.S. Cl. ...................... 359/677; 359/676; 359/689
(58) Field of Search ............................... 359/676, 677, 359/680, 689, 691

(56) References Cited

U.S. PATENT DOCUMENTS 4,784,479 A * 11/1988 Ikemori ...................... 359/666

2004/0027684 A1 * 2/2004 Nishioka et al. ............ 359/676

FOREIGN PATENT DOCUMENTS

| JP | 08-248318 | 9/1996 |
|---|---|---|
| JP | 11-220646 | 8/1999 |

* cited by examiner

*Primary Examiner*—David N. Spector
(74) *Attorney, Agent, or Firm*—Kenyon & Kenyon

(57) ABSTRACT

A zoom optical system includes only one optical-element group moved in a magnification change and at least one deformable mirror having a compensating function for compensating for a shift of an image surface caused by the magnification change and a focusing function. According to this configuration of the zoom optical system, it is possible to attain a zoom optical system and an imaging apparatus using the zoom optical system that have as small a number of movable lenses as possible, are very small in size, and work with an extremely low power consumption and low operation noise.

24 Claims, 36 Drawing Sheets

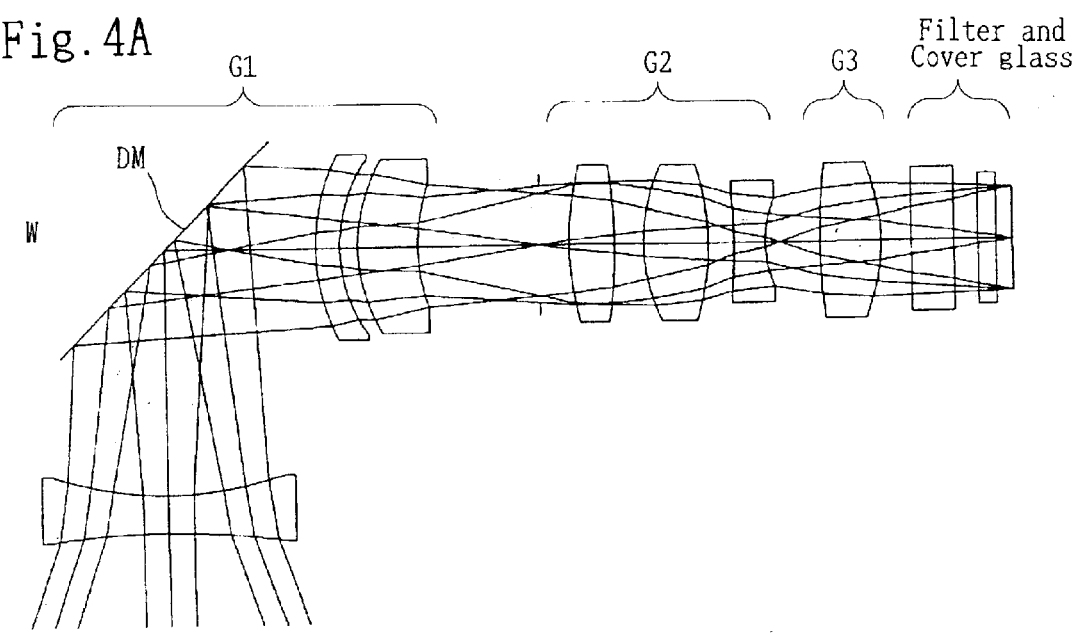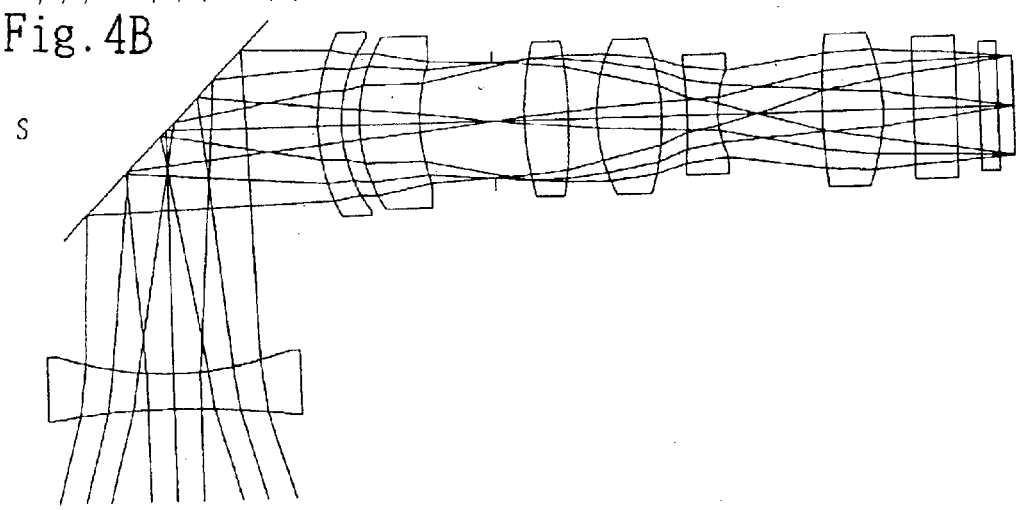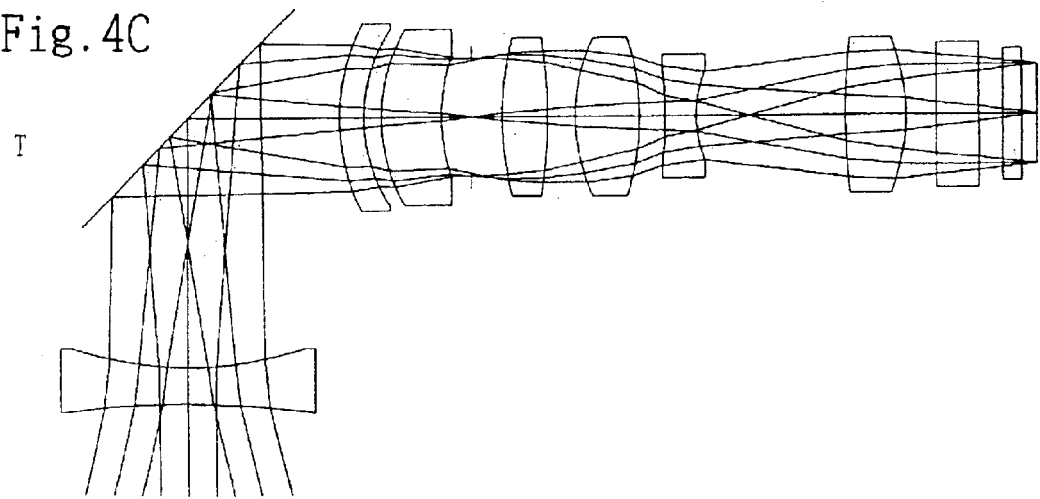

Fig.12A Y-FAN (X,Y) (24.9°,-19.3°) Fig.12B X-FAN
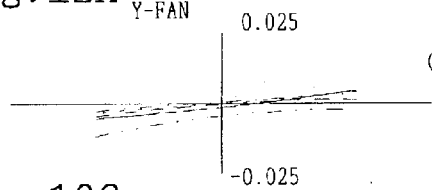 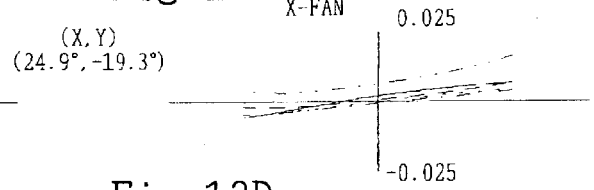
Fig.12C (0.00°,-19.3°) Fig.12D
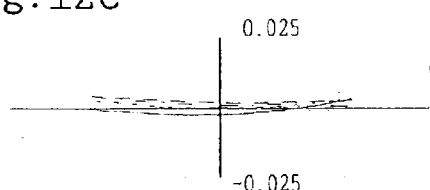 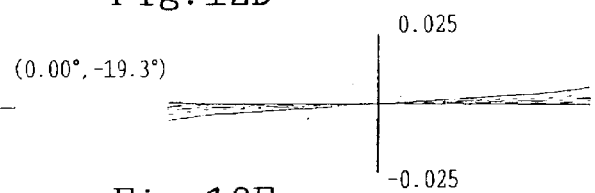
Fig.12E (0.00°,0.00°) Fig.12F
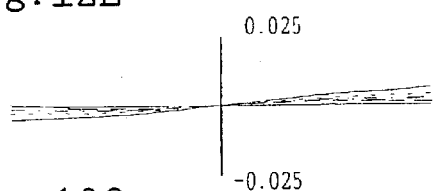 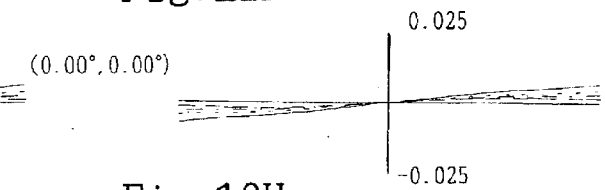
Fig.12G (0.00°,19.3°) Fig.12H
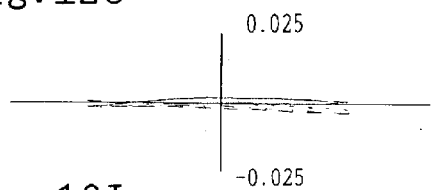 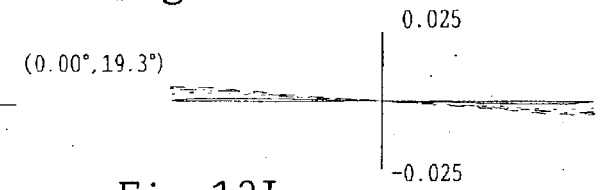
Fig.12I (24.9°,19.3°) Fig.12J
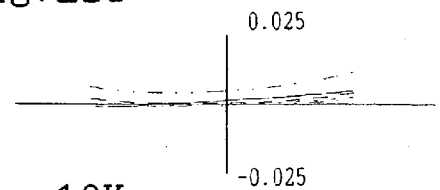 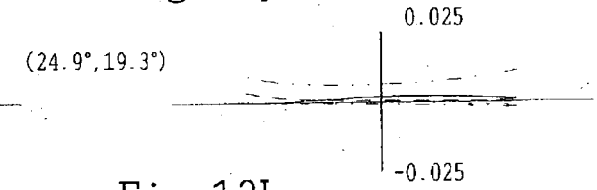
Fig.12K (24.9°,0.00°) Fig.12L
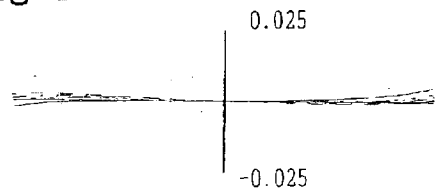 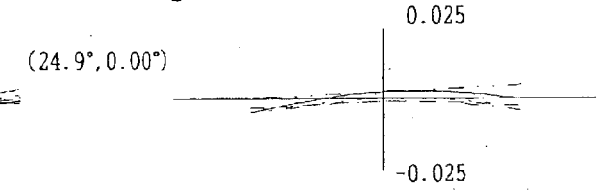
```
——————————— 656.2700 NM
·············· 587.5600 NM
·—·—·—·—· 546.0700 NM
— — — — — 486.1300 NM
·· — ·· — ·· 435.8300 NM
```

Fig.13A Y-FAN 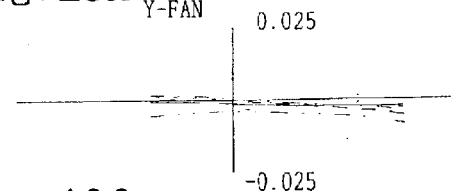 Fig.13B X-FAN 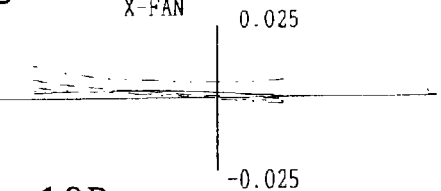
(X,Y) (20.4°,-15.6°)
Fig.13C 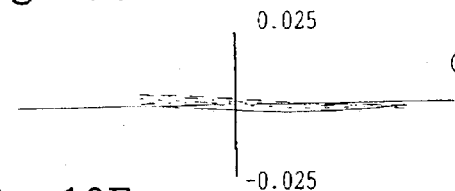 Fig.13D 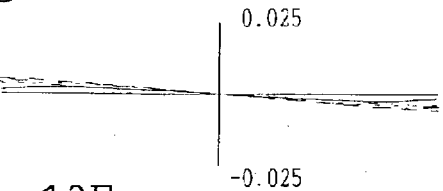
(0.00°,-15.6°)
Fig.13E 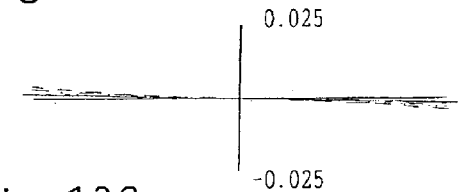 Fig.13F 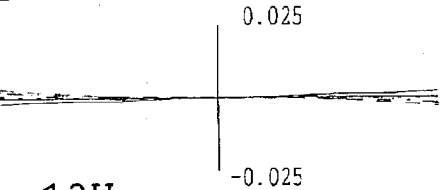
(0.00°,0.00°)
Fig.13G 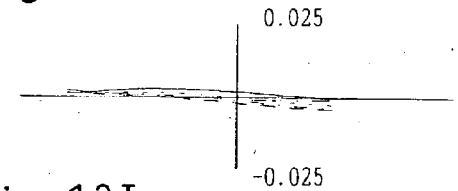 Fig.13H 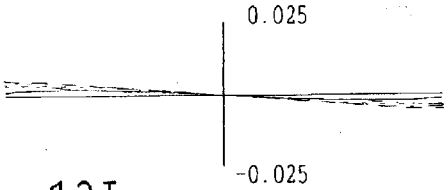
(0.00°,15.6°)
Fig.13I 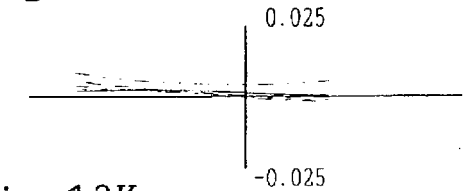 Fig.13J 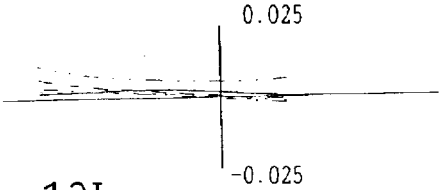
(20.4°,15.6°)
Fig.13K 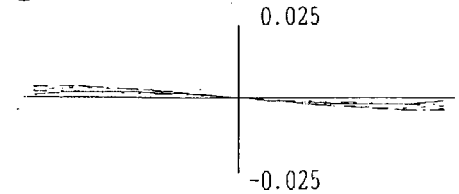 Fig.13L 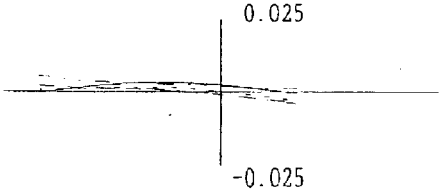
(20.4°,0.00°)
—————— 656.2700 NM
·············· 587.5600 NM
— — — 546.0700 NM
— — — — 486.1300 NM
—··—··— 435.8300 NM Fig.14A Y-FAN
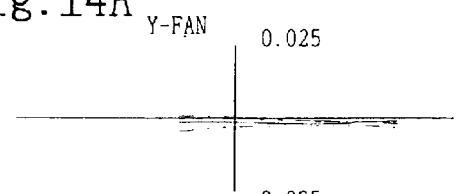
Fig.14B X-FAN
(X,Y)
(17.2°,-13.1°)
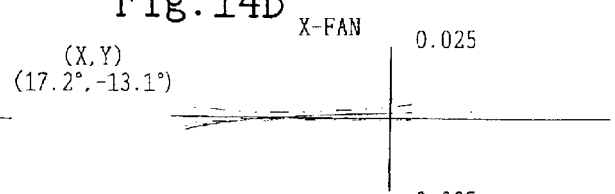
Fig.14C
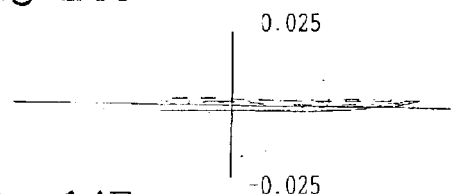
Fig.14D
(0.00°,-13.1°)
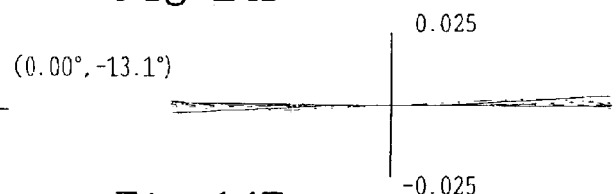
Fig.14E
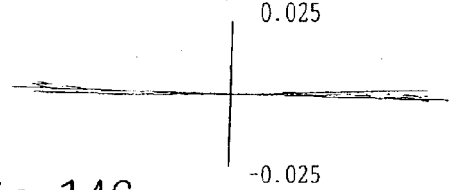
Fig.14F
(0.00°,0.00°)
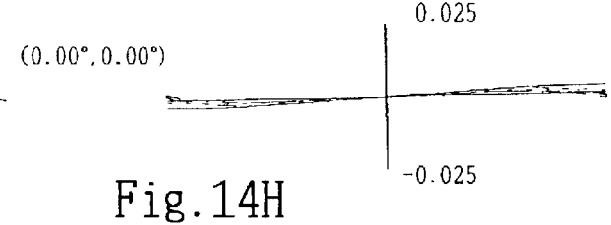
Fig.14G
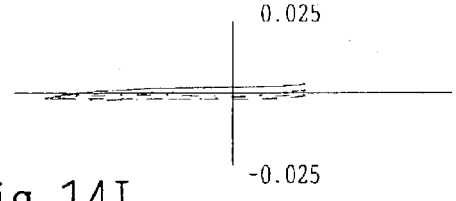
Fig.14H
(0.00°,13.1°)
Fig.14I
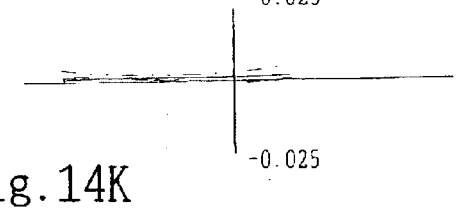
Fig.14J
(17.2°,13.1°)
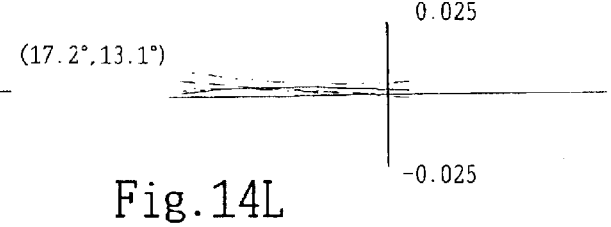
Fig.14K
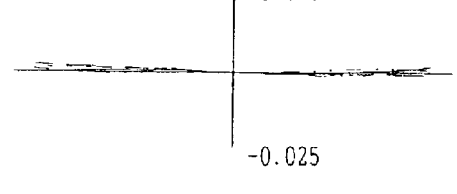
Fig.14L
(17.2°,0.00°)
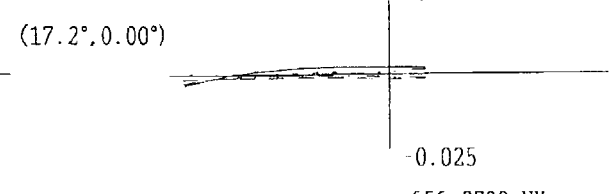
—————— 656.2700 NM
· · · · · · · · · · 587.5600 NM
— · — · — · — 546.0700 NM
— — — — — 486.1300 NM
— · · — · · — 435.8300 NM

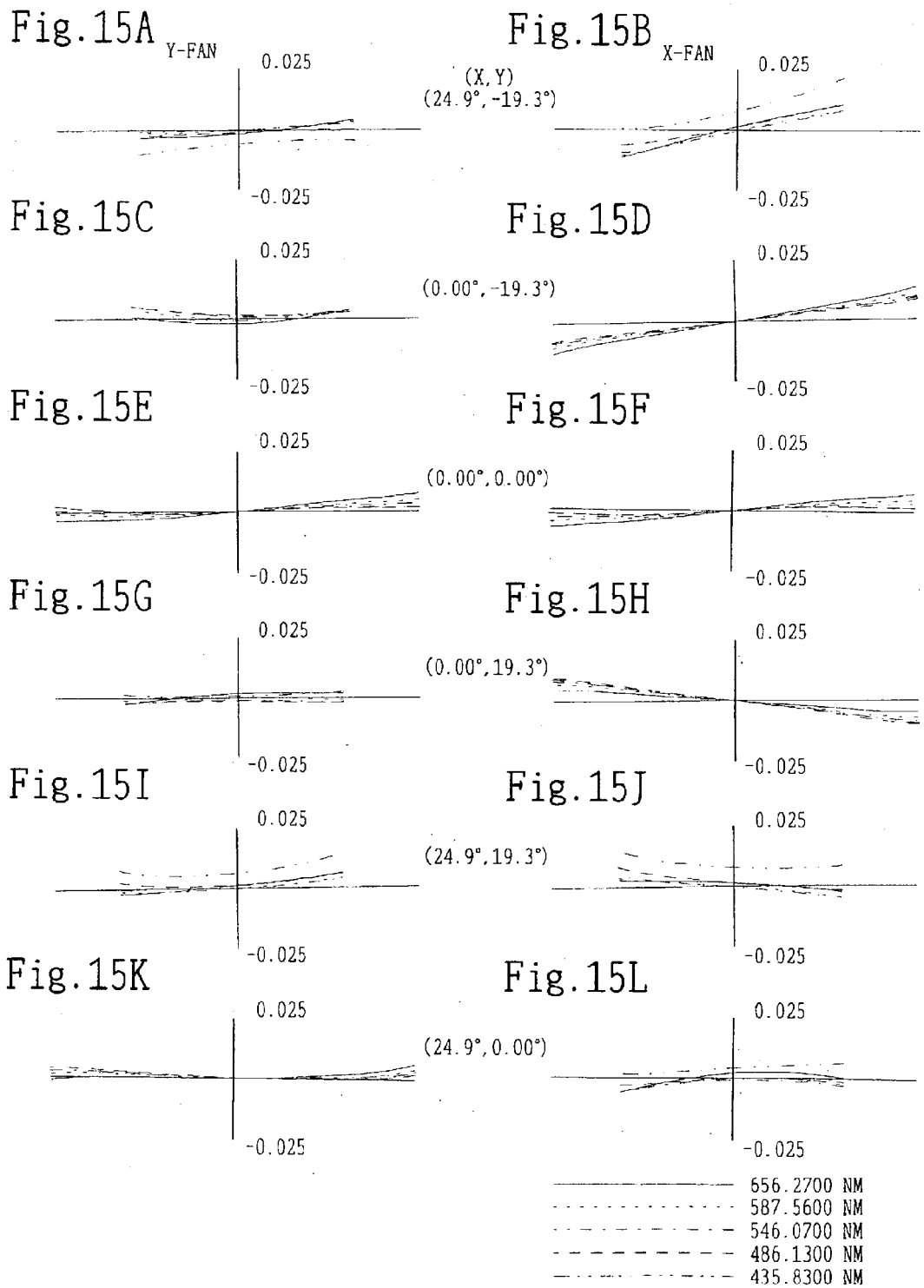

Fig.16A Y-FAN (X,Y) (20.4°,-15.6°)
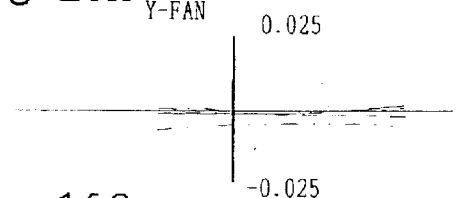
Fig.16B X-FAN
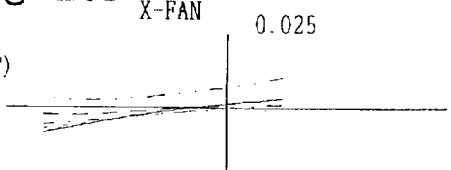
Fig.16C (0.00°,-15.6°)
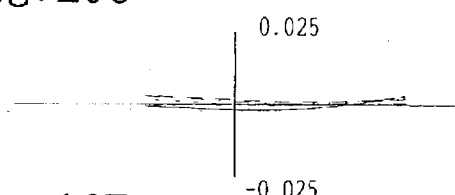
Fig.16D
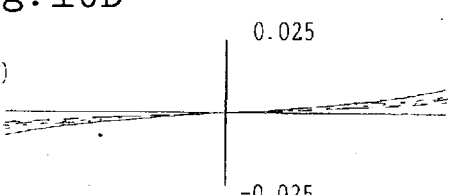
Fig.16E (0.00°,0.00°)
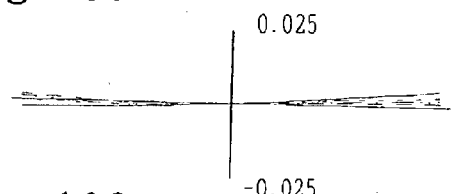
Fig.16F
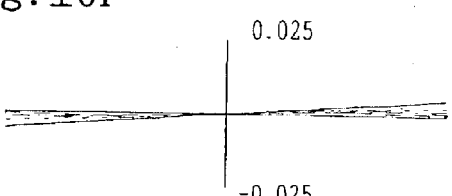
Fig.16G (0.00°,15.6°)
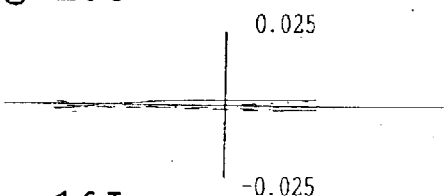
Fig.16H
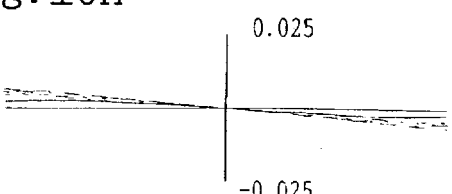
Fig.16I (20.4°,15.6°)
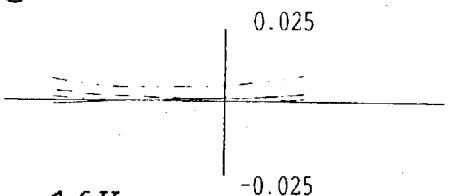
Fig.16J
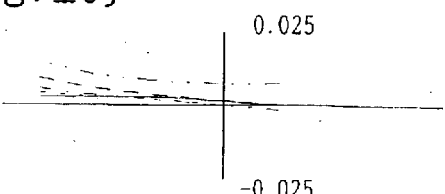
Fig.16K (20.4°,0.00°)
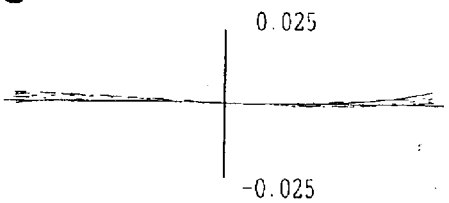
Fig.16L
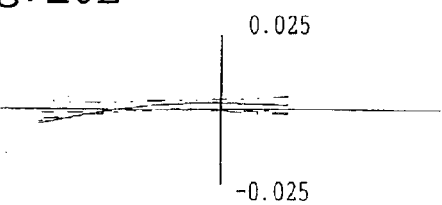
```
——————————— 656.2700 NM
· · · · · · · · · · · 587.5600 NM
— · — · — · — · — 546.0700 NM
— — — — — — — 486.1300 NM
— · · — · · — · · — 435.8300 NM
```

Fig.17A Y-FAN 0.025
Fig.17B X-FAN 0.025
(X,Y)
(17.2°,-13.1°)
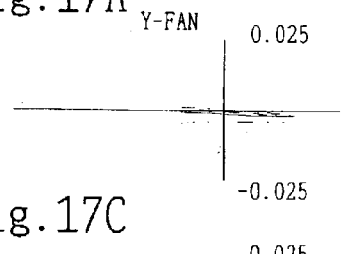
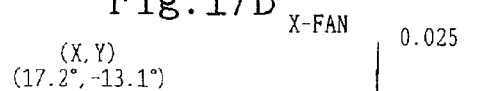
Fig.17C −0.025
Fig.17D 0.025
(0.00°,-13.1°)
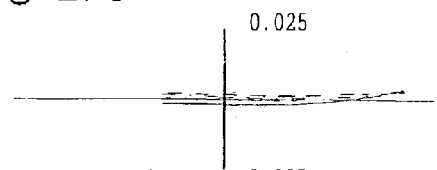
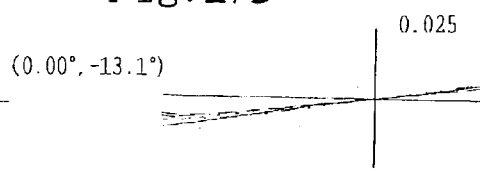
Fig.17E −0.025
Fig.17F −0.025
(0.00°,0.00°)
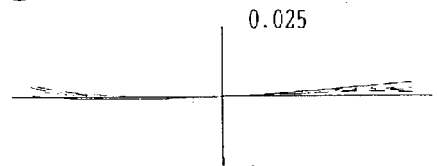
Fig.17G −0.025
Fig.17H −0.025
(0.00°,13.1°)
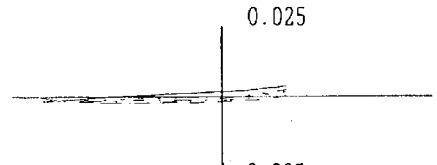
Fig.17I −0.025
Fig.17J −0.025
(17.2°,13.1°)
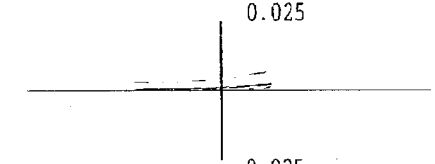
Fig.17K −0.025
Fig.17L −0.025
(17.2°,0.00°)
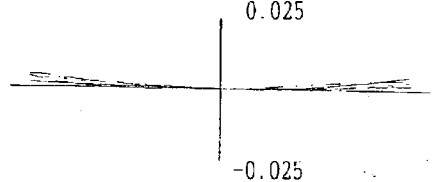
−0.025
−0.025
———————— 656.2700 NM
· · · · · · · · · 587.5600 NM
— · — · — · — 546.0700 NM
— — — — — — 486.1300 NM
— ·· — ·· — ·· 435.8300 NM Fig.18A Y-FAN
Fig.18B X-FAN
(X,Y)
(28.8°,-22.4°)
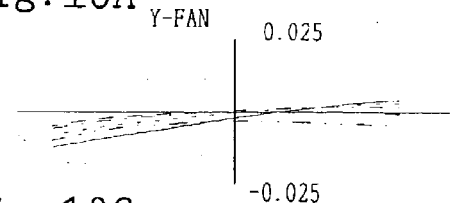
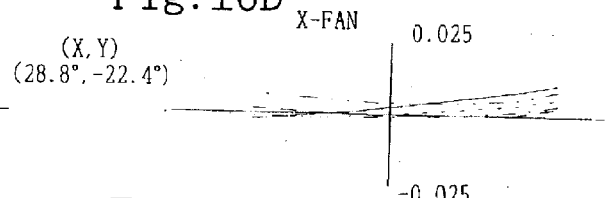
Fig.18C
Fig.18D
(0.00°,-22.4°)
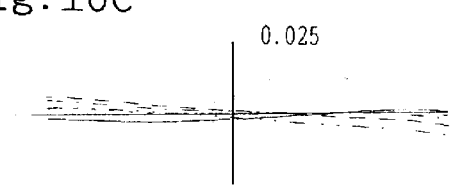
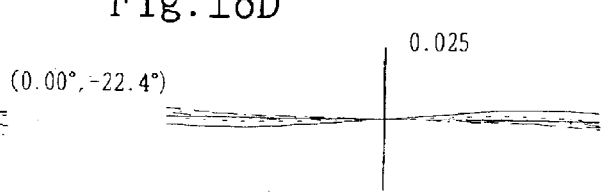
Fig.18E
Fig.18F
(0.00°,0.00°)
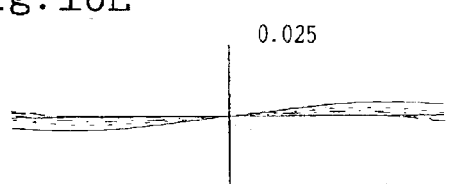
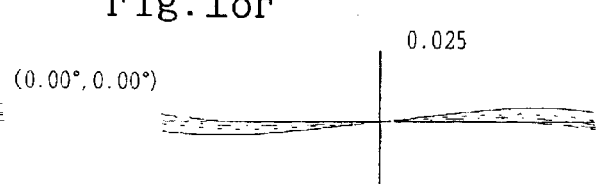
Fig.18G
Fig.18H
(0.00°,22.4°)
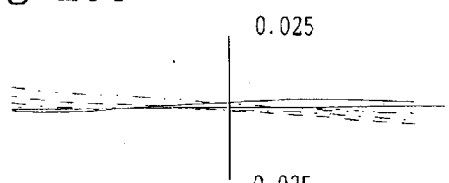
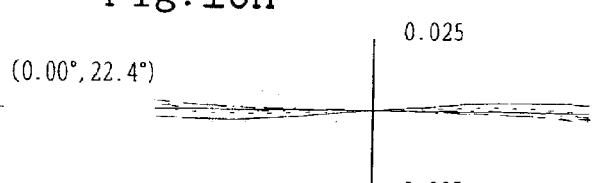
Fig.18I
Fig.18J
(28.8°,22.4°)
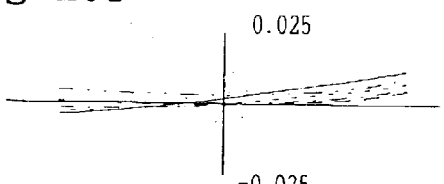
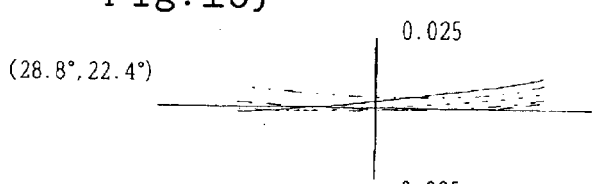
Fig.18K
Fig.18L
(28.8°,0.00°)
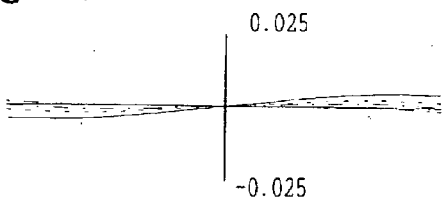
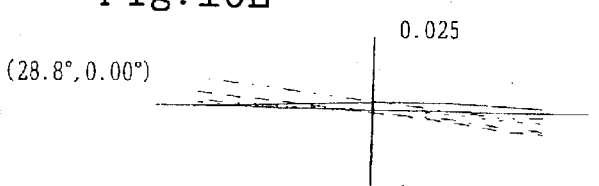
——————— 656.2700 NM
··············· 587.5600 NM
— — — — 546.0700 NM
— — — — — 486.1300 NM
—·—·—·—·— 435.8300 NM

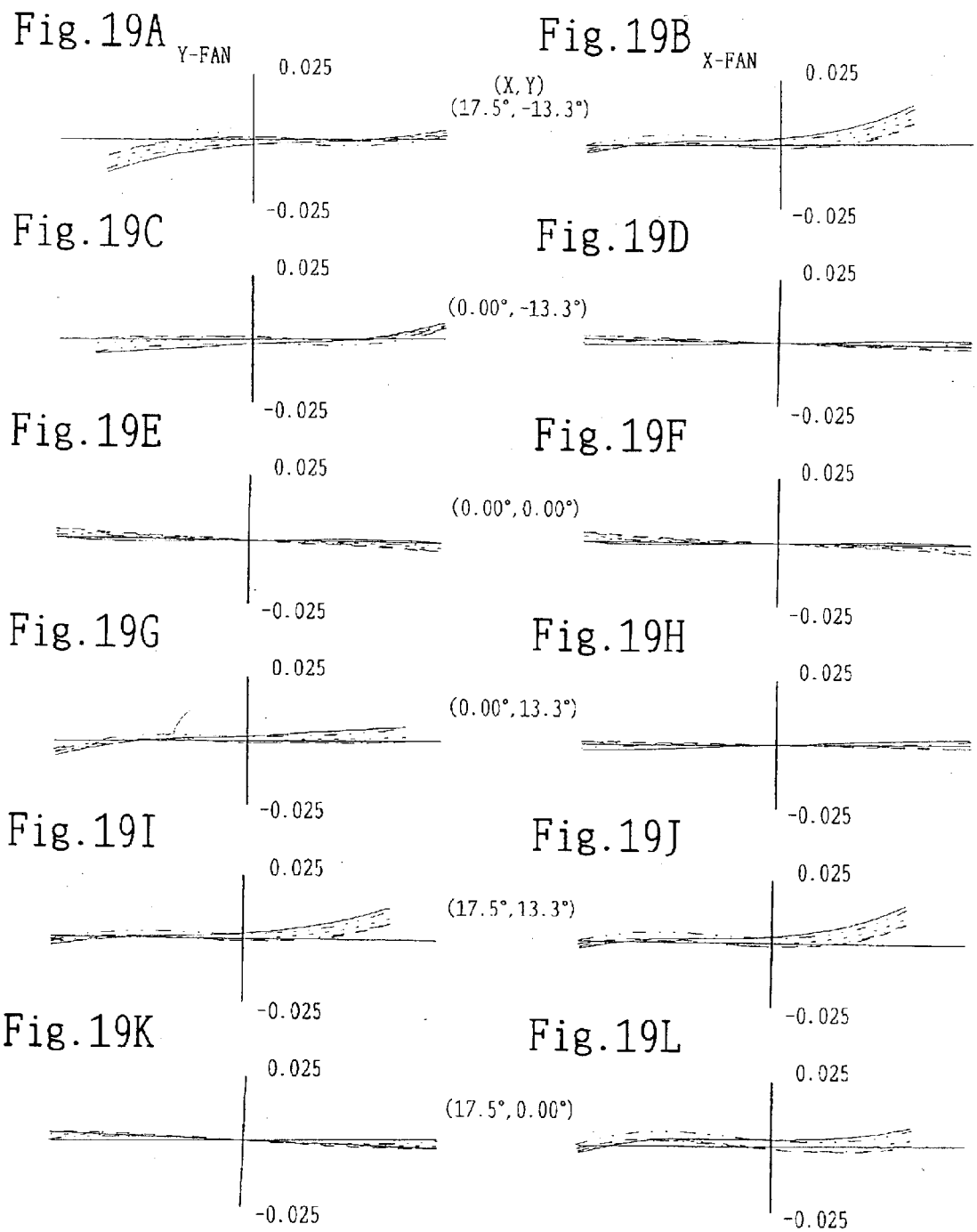

Fig.20A Y-FAN  (X,Y) (12.4°, -9.37°)  Fig.20B X-FAN
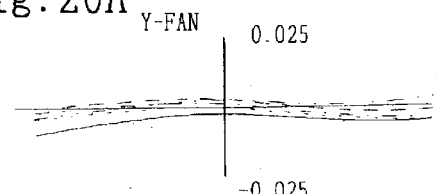 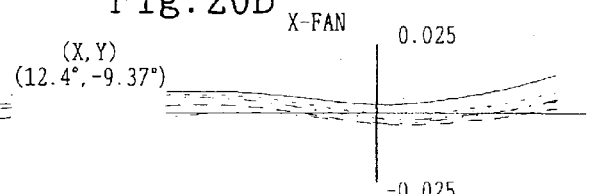
Fig.20C  (0.00°, -9.37°)  Fig.20D
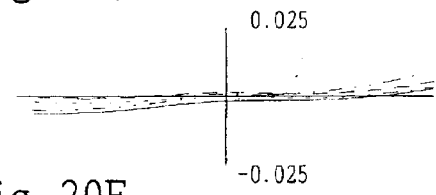 
Fig.20E  (0.00°, 0.00°)  Fig.20F
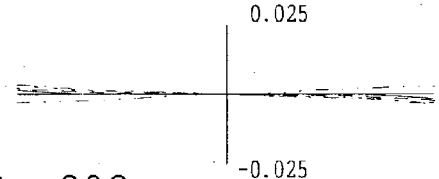 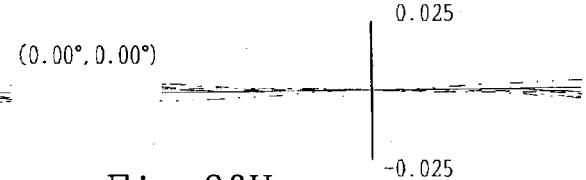
Fig.20G  (0.00°, 9.37°)  Fig.20H
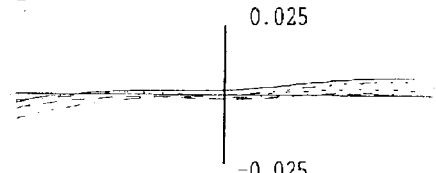 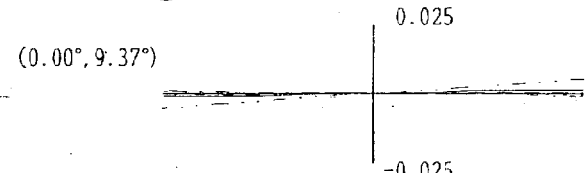
Fig.20I  (12.4°, 9.37°)  Fig.20J
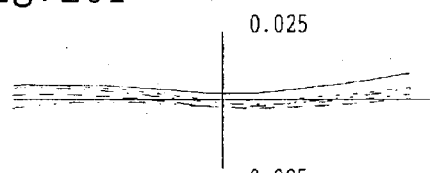 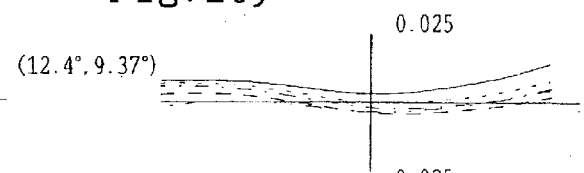
Fig.20K  (12.4°, 0.00°)  Fig.20L
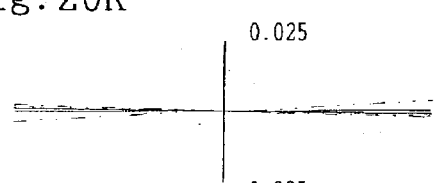 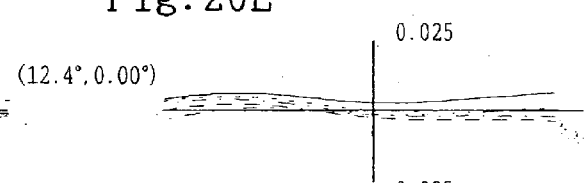
——————— 656.2700 NM
· · · · · · · · · · 587.5600 NM
— · — · — · 546.0700 NM
— — — — — 486.1300 NM
— · · — · · — 435.8300 NM Fig. 21A Y-FAN  (X,Y) (28.8°, −22.4°)  Fig. 21B X-FAN
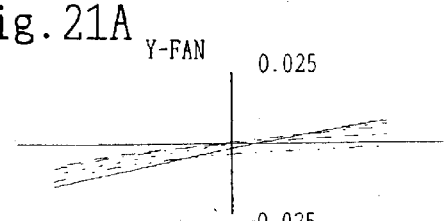
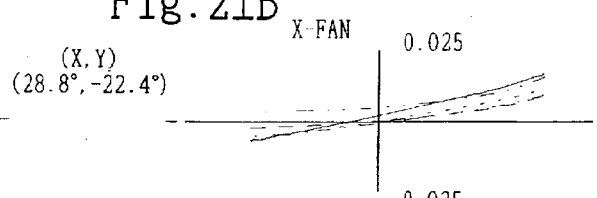
Fig. 21C  (0.00°, −22.4°)  Fig. 21D
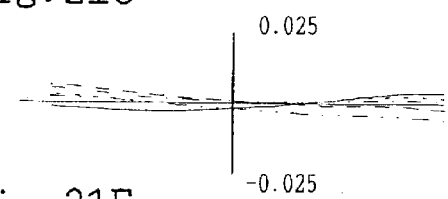
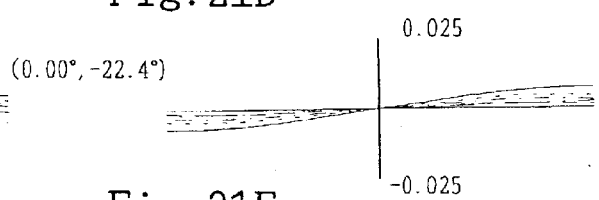
Fig. 21E  Fig. 21F
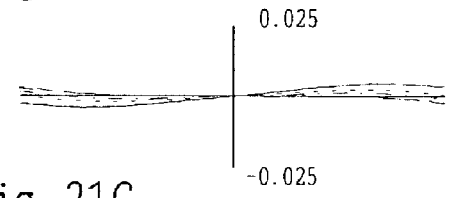
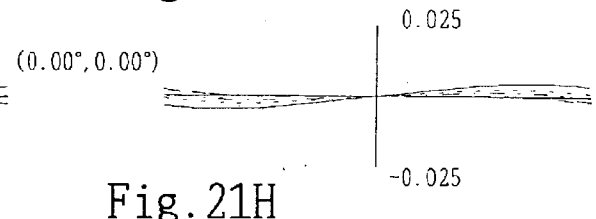
Fig. 21G  (0.00°, 0.00°)  Fig. 21H
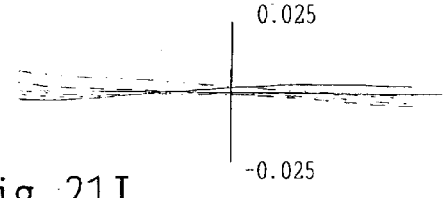
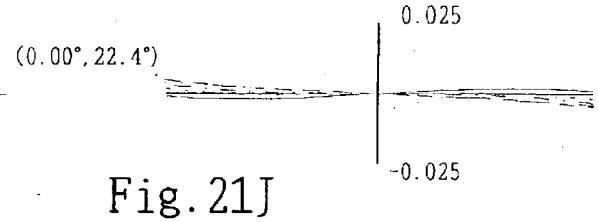
Fig. 21I  (0.00°, 22.4°)  Fig. 21J
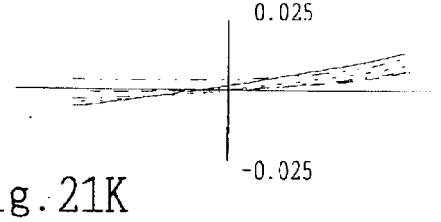
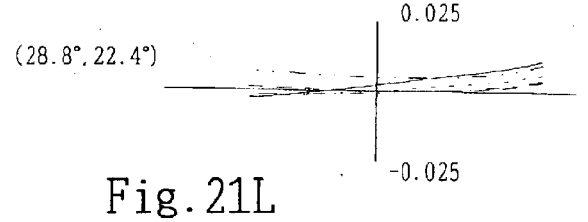
Fig. 21K  (28.8°, 22.4°)  Fig. 21L
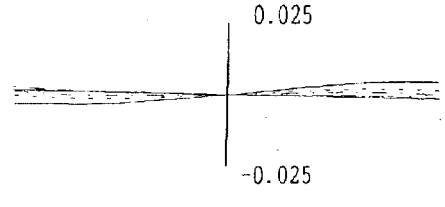
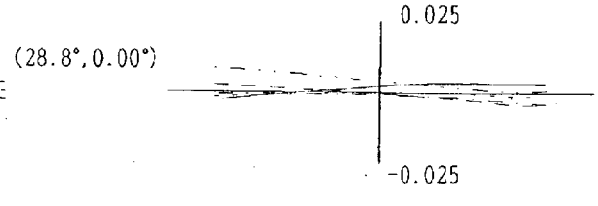
(28.8°, 0.00°)
———— 656.2700 NM
·········· 587.5600 NM
— — — 546.0700 NM
— — — — 486.1300 NM
—··—··— 435.8300 NM Fig. 22A Y-FAN (X,Y) (17.5°,-13.3°) 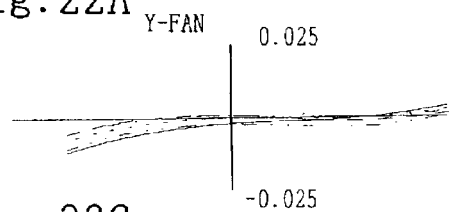 Fig. 22B X-FAN 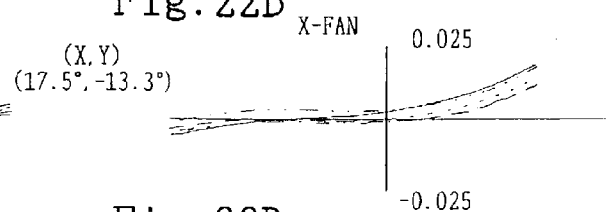
Fig. 22C 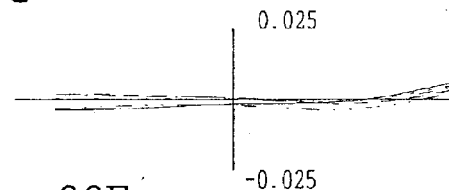 Fig. 22D (0.00°,-13.3°) 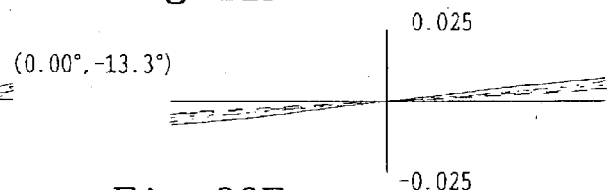
Fig. 22E 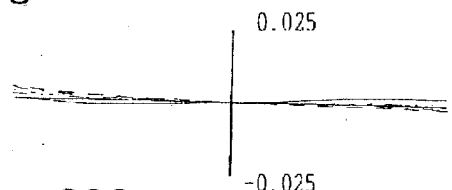 Fig. 22F (0.00°,0.00°) 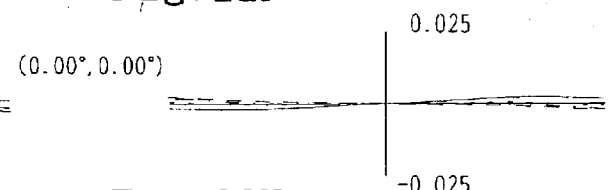
Fig. 22G 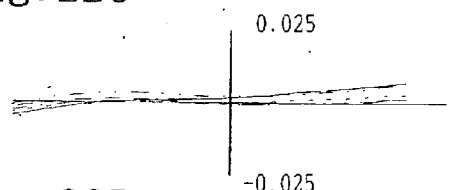 Fig. 22H (0.00°,13.3°) 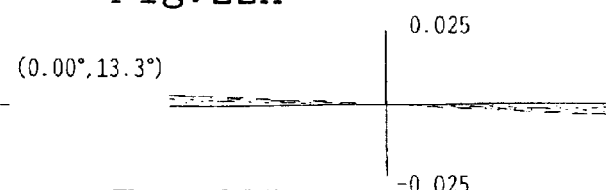
Fig. 22I 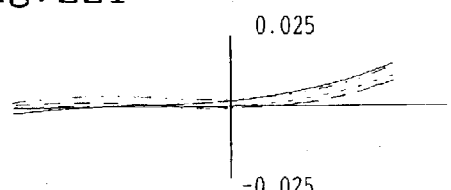 Fig. 22J (17.5°,13.3°) 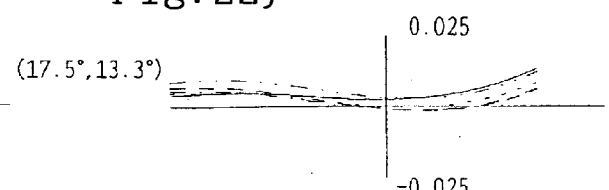
Fig. 22K 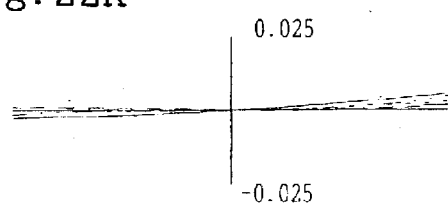 Fig. 22L (17.5°,0.00°) 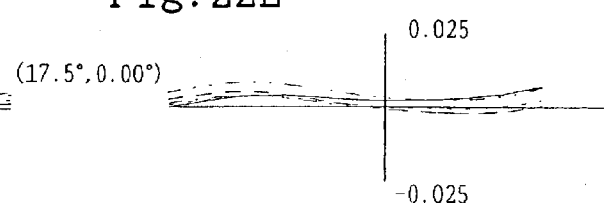
——————— 656.2700 NM
· · · · · · · · · · · 587.5600 NM
— · — · — · — 546.0700 NM
— — — — — 486.1300 NM
— · · — · · — 435.8300 NM Fig.23A Y-FAN
Fig.23B X-FAN
(X,Y)
(12.4°,-9.37°)
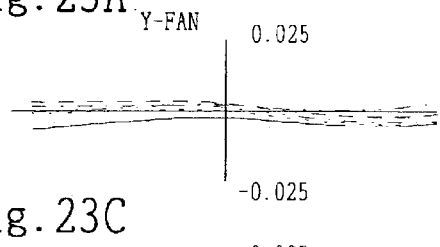
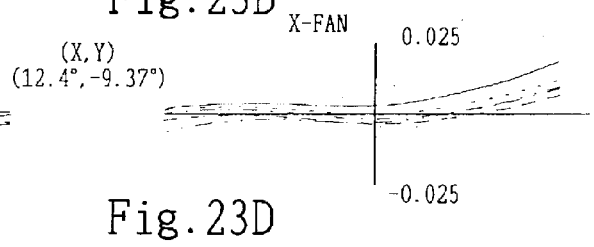
Fig.23C
Fig.23D
(0.00°,-9.37°)
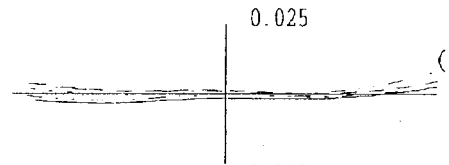
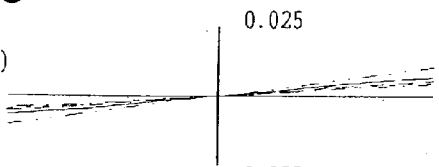
Fig.23E
Fig.23F
(0.00°,0.00°)
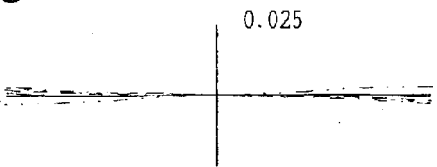
Fig.23G
Fig.23H
(0.00°,9.37°)
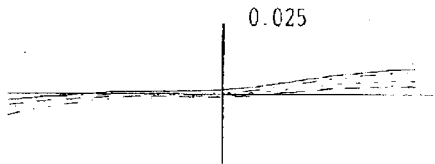
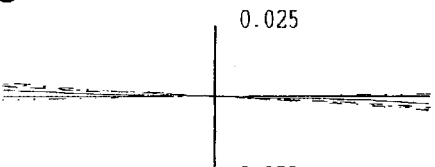
Fig.23I
Fig.23J
(12.4°,9.37°)
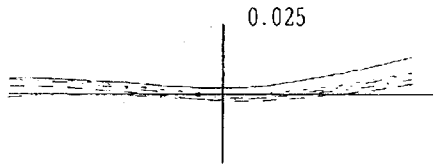
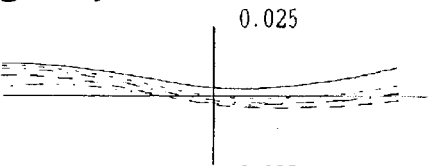
Fig.23K
Fig.23L
(12.4°,0.00°)
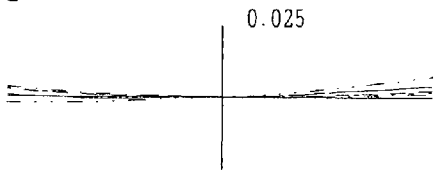
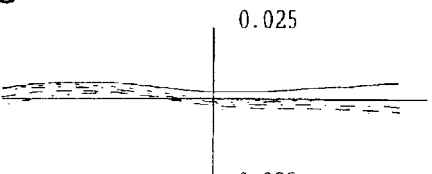
```
——————————  656.2700 NM
· · · · · · · ·  587.5600 NM
— - - - - - —  546.0700 NM
— —  — —  486.1300 NM
— · · — · · —  435.8300 NM
```

Fig.24

|  | W OB=INF | | S OB=INF | | T OB=INF | | W OB=300 | | S OB=300 | | T OB=300 | |
|---|---|---|---|---|---|---|---|---|---|---|---|---|
|  | X | Y | X | Y | X | Y | X | Y | X | Y | X | Y |
| EX1 | 1351.4 | 1176.5 | INF | INF | 1785.7 | 1612.9 | 467.3 | 427.4 | 833.3 | 781.3 | 512.8 | 487.8 |
| EX2 | 1265.8 | 1176.5 | INF | INF | 3225.8 | 2941.2 | 518.1 | 483.1 | 934.6 | 885.0 | 675.7 | 641.0 |
| EX3 | 458.7 | 446.4 | -20000.0 | -12500.0 | 365.0 | 358.4 | 333.3 | 317.5 | 1818.2 | 1923.1 | 280.9 | 276.2 |
| EX4 | 1818.2 | 1666.7 | INF | INF | 1960.8 | 1785.7 | 613.5 | 568.2 | 1020.4 | 961.5 | 621.1 | 591.7 |
| EX5 | -10000.0 | -12500.0 | -781.3 | -746.3 | -4545.5 | -4545.5 | 917.4 | 840.3 | -12500.0 | -11111.1 | 1010.1 | 961.5 |
| EX6 | 3703.7 | 3448.3 | -671.1 | -649.4 | 11111.1 | 11111.1 | 709.2 | 653.6 | -2941.2 | -2702.7 | 793.7 | 763.4 |
| EX7 DM1 | 1204.8 | 793.7 | INF | INF | 520.8 | 404.9 | 520.8 | 460.8 | 1204.8 | 25000.0 | 381.7 | 258.4 |
| DM2 | 862.1 | 14285.7 | -1098.9 | -735.3 | 4761.9 | -358.4 | 386.1 | 348.4 | 555.6 | 194.2 | 170.9 | 1098.9 |
| EX8 | 448.4 | 423.7 | INF | INF | 483.1 | 452.5 | 308.6 | 289.9 | 1098.9 | 1041.7 | 330.0 | 311.5 |
| EX9 | INF | INF | INF | INF | INF | INF | 833.3 | 757.6 | 925.9 | 909.1 | 854.7 | 819.7 |
| EX10 | INF | INF | INF | INF | INF | INF | 617.3 | 555.6 | 645.2 | 625.0 | 613.5 | 598.8 |

ZOOM OPTICAL SYSTEM AND IMAGING APPARATUS USING THE SAME

CROSS REFERENCE TO RELATED APPLICATIONS

This application is a continuation-in-part of application Ser. No. 10/411,155, filed Apr. 11, 2003, now abandoned.

BACKGROUND OF THE INVENTION

1. Field of the Invention

The present invention relates to a zoom optical system and an imaging apparatus using the zoom optical system.

2. Description of the Related Art

A conventional zoom optical system is formed of a variator group having a magnification varying function, a compensator group for compensating for shift of an image surface and aberrations caused by magnification change, and a focusing group for focusing onto an object. Also, the zoom optical system is configured to perform magnification change and focusing by moving, of the above described lens groups, predetermined lens groups in the direction of the optical axis.

Also, in recent years, imaging apparatuses using high-resolution zoom optical systems have been required. For example, each of Japanese Patent Application Preliminary Publication (KOKAI) No. Hei 8-248318 and Japanese patent Application Preliminary Publication (KOKAI) No. 11-220646 discloses an imaging apparatus using a zoom optical system that achieves compact design by folding the path of rays.

SUMMARY OF THE INVENTION

A zoom optical system according to the present invention includes an optical element group that is moved in a magnification change and a variable optical-property optical element, wherein the optical element group that is moved in a magnification change is provided in a singularity and the variable optical-property optical element has at least one of a compensating function for compensating for a shift of the image surface caused in accordance with the magnification change and a focusing function.

Also, a zoom optical system according to the present invention includes two optical element groups and a variable optical-property optical element, wherein the two optical element groups are movable in a magnification change and having a magnification varying function or a compensating function for compensating for a shift of the image surface caused in accordance with the magnification change, and the variable optical-property optical element has a focusing function.

Also, according to the present invention, the variable optical-property optical element has a rotationally asymmetric curved surface having a function for compensating for decentered aberrations.

Also, an imaging apparatus according to the present invention is provided with one of the zoom optical systems set forth above.

These and other features and advantages of the present invention will become apparent from the following detailed description when taken in conjunction with the accompanying drawings.

BRIEF DESCRIPTION OF THE DRAWINGS

FIG. 4A is a sectional view that shows a lens configuration of a zoom optical system according to the fourth embodiment of the present invention at the wide-angle end.

FIG. 4B is a sectional view that shows a lens configuration of the zoom optical system according to the fourth embodiment of the present invention at the intermediate position.

FIG. 4C is a sectional view that shows a lens configuration of the zoom optical system according to the fourth embodiment of the present invention at the telephoto end.

FIG. 12A is an aberration diagram that shows Y-direction lateral aberration of a chief ray that traverses a point where X-direction field angle is extreme in positive direction, or 24.9° and Y-direction field angle is extreme in negative direction, or −19.3° in the zoom optical system according to the first embodiment.

FIG. 12B is an aberration diagram that shows X-direction lateral aberration of the chief ray that traverses the point where X-direction field angle is extreme in positive direction, or 24.9° and Y-direction field angle is extreme in negative direction, or 19.3° under the condition where the object distance is infinite at the wide-angle end in the zoom optical system according to the first embodiment.

FIG. 12C is an aberration diagram that shows Y-direction lateral aberration of a chief ray that traverses a point where X-direction field angle is zero and Y-direction field angle is extreme in negative direction, or −19.3° under the condition where the object distance is infinite at the wide-angle end in the zoom optical system according to the first embodiment.

FIG. 12D is an aberration diagram that shows X-direction lateral aberration of the chief ray that traverses the point where X-direction field angle is zero and Y-direction field angle is extreme in negative direction, or −19.3° under the condition where the object distance is infinite at the wide-angle end in the zoom optical system according to the first embodiment.

FIG. 12E is an aberration diagram that shows Y-direction lateral aberration of a chief ray that traverses a point where X-direction field angle is zero and Y-direction field angle is zero under the condition where the object distance is infinite at the wide-angle end in the zoom optical system according to the first embodiment.

FIG. 12F is an aberration diagram that shows X-direction lateral aberration of the chief ray that traverses the point where X-direction field angle is zero and Y-direction field angle is zero under the condition where the object distance is infinite at the wide-angle end in the zoom optical system according to the first embodiment.

FIG. 12G is an aberration diagram that shows Y-direction lateral aberration of a chief ray that traverses a point where X-direction field angle is zero and Y-direction field angle is extreme in positive direction, or 19.3° under the condition where the object distance is infinite at the wide-angle end in the zoom optical system according to the first embodiment.

FIG. 12H is an aberration diagram that shows X-direction lateral aberration of the chief ray that traverses the point where X-direction field angle is zero and Y-direction field angle is extreme in positive direction, or 19.3° under the condition where the object distance is infinite at the wide-angle end in the zoom optical system according to the first embodiment.

FIG. 12I is an aberration diagram that shows Y-direction lateral aberration of a chief ray that traverses a point where X-direction field angle is extreme in positive direction, or 24.9° and Y-direction field angle is extreme in positive direction, or 19.3° under the condition where the object distance is infinite at the wide-angle end in the zoom optical system according to the first embodiment.

FIG. 12J is an aberration diagram that shows X-direction lateral aberration of the chief ray that traverses the point where X-direction field angle is extreme in positive direction, or 24.9° and Y-direction field angle is extreme in positive direction, or 19.3° under the condition where the object distance is infinite at the wide-angle end in the zoom optical system according to the first embodiment.

FIG. 12K is an aberration diagram that shows Y-direction lateral aberration of a chief ray that traverses a point where X-direction field angle is extreme in positive direction, or 24.9° and Y-direction field angle is zero under the condition where the object distance is infinite at the wide-angle end in the zoom optical system according to the first embodiment.

FIG. 12L is an aberration diagram that shows X-direction lateral aberration of the chief ray that traverses the point where X-direction field angle is extreme in positive direction, or 24.9° and Y-direction field angle is zero under the condition where the object distance is infinite at the wide-angle end in the zoom optical system according to the first embodiment.

FIG. 13A is an aberration diagram that shows Y-direction lateral aberration of a chief ray that traverses a point where X-direction field angle is extreme in positive direction, or 20.4° and Y-direction field angle is extreme in negative direction, or −15.6° under the condition where the object distance is infinite at the intermediate position in the zoom optical system according to the first embodiment.

FIG. 13B is an aberration diagram that shows X-direction lateral aberration of the chief ray that traverses the point where X-direction field angle is extreme in positive direction, or 20.4° and Y-direction field angle is extreme in negative direction, or −15.6° under the condition where the object distance is infinite at the intermediate position in the zoom optical system according to the first embodiment.

FIG. 13C is an aberration diagram that shows Y-direction lateral aberration of a chief ray that traverses a point where X-direction field angle is zero and Y-direction field angle is extreme in negative direction, or −15.6° under the condition where the object distance is infinite at the intermediate position in the zoom optical system according to the first embodiment.

FIG. 13D is an aberration diagram that shows X-direction lateral aberration of the chief ray that traverses the point where X-direction field angle is zero and Y-direction field angle is extreme in negative direction, or −15.6° under the condition where the object distance is infinite at the intermediate position in the zoom optical system according to the first embodiment.

FIG. 13E is an aberration diagram that shows Y-direction lateral aberration of a chief ray that traverses a point where X-direction field angle is zero and Y-direction field angle is zero under the condition where the object distance is infinite at the intermediate position in the zoom optical system according to the first embodiment.

FIG. 13F is an aberration diagram that shows X-direction lateral aberration of the chief ray that traverses the point where X-direction field angle is zero and Y-direction field angle is zero under the condition where the object distance is infinite at the intermediate position in the zoom optical system according to the first embodiment.

FIG. 13G is an aberration diagram that shows Y-direction lateral aberration of a chief ray that traverses a point where X-direction field angle is zero and Y-direction field angle is extreme in positive direction, or 15.6° under the condition where the object distance is infinite at the intermediate position in the zoom optical system according to the first embodiment.

FIG. 13H is an aberration diagram that shows X-direction lateral aberration of the chief ray that traverses the point where X-direction field angle is zero and Y-direction field angle is extreme in positive direction, or 15.6° under the condition where the object distance is infinite at the intermediate position in the zoom optical system according to the first embodiment.

FIG. 13I is an aberration diagram that shows Y-direction lateral aberration of a chief ray that traverses a point where X-direction field angle is extreme in positive direction, or 20.4° and Y-direction field angle is extreme in positive direction, or 15.6° under the condition where the object distance is infinite at the intermediate position in the zoom optical system according to the first embodiment.

FIG. 13J is an aberration diagram that shows X-direction lateral aberration of the chief ray that traverses the point where X-direction field angle is extreme in positive direction, or 20.4° and Y-direction field angle is extreme in positive direction, or 15.6° under the condition where the object distance is infinite at the intermediate position in the zoom optical system according to the first embodiment.

FIG. 13K is an aberration diagram that shows Y-direction lateral aberration of a chief ray that traverses a point where X-direction field angle is extreme in positive direction, or 20.4° and Y-direction field angle is zero under the condition where the object distance is infinite at the intermediate position in the zoom optical system according to the first embodiment.

FIG. 13L is an aberration diagram that shows X-direction lateral aberration of the chief ray that traverses the point where X-direction field angle is extreme in positive direction, or 20.4° and Y-direction field angle is zero under the condition where the object distance is infinite at the intermediate position in the zoom optical system according to the first embodiment.

FIG. 14A is an aberration diagram that shows Y-direction lateral aberration of a chief ray that traverses a point where X-direction field angle is extreme in positive direction, or 17.2° and Y-direction field angle is extreme in negative direction, or −13.1° under the condition where the object distance is infinite at the telephoto end in the zoom optical system according to the first embodiment.

FIG. 14B is an aberration diagram that shows X-direction lateral aberration of the chief ray that traverses the point where X-direction field angle is extreme in positive direction, or 17.2° and Y-direction field angle is extreme in negative direction, or −13.1° under the condition where the object distance is infinite at the telephoto end in the zoom optical system according to the first embodiment.

FIG. 14C is an aberration diagram that shows Y-direction lateral aberration of a chief ray that traverses a point where X-direction field angle is zero and Y-direction field angle is extreme in negative direction, or −13.1° under the condition where the object distance is infinite at the telephoto end in the zoom optical system according to the first embodiment.

FIG. 14D is an aberration diagram that shows X-direction lateral aberration of the chief ray that traverses the point where X-direction field angle is zero and Y-direction field angle is extreme in negative direction, or −13.1° under the condition where the object distance is infinite at the telephoto end in the zoom optical system according to the first embodiment.

FIG. 14E is an aberration diagram that shows Y-direction lateral aberration of a chief ray that traverses a point where X-direction field angle is zero and Y-direction field angle is zero under the condition where the object distance is infinite at the telephoto end in the zoom optical system according to the first embodiment.

FIG. 14F is an aberration diagram that shows X-direction lateral aberration of the chief ray that traverses the point where X-direction field angle is zero and Y-direction field angle is zero under the condition where the object distance is infinite at the telephoto end in the zoom optical system according to the first embodiment.

FIG. 14G is an aberration diagram that shows Y-direction lateral aberration of a chief ray that traverses a point where X-direction field angle is zero and Y-direction field angle is extreme in positive direction, or 13.1° under the condition where the object distance is infinite at the telephoto end in the zoom optical system according to the first embodiment.

FIG. 14H is an aberration diagram that shows X-direction lateral aberration of the chief ray that traverses the point where X-direction field angle is zero and Y-direction field angle is extreme in positive direction, or 13.1° under the condition where the object distance is infinite at the telephoto end in the zoom optical system according to the first embodiment.

FIG. 14I is an aberration diagram that shows Y-direction lateral aberration of a chief ray that traverses a point where X-direction field angle is extreme in positive direction, or 17.2° and Y-direction field angle is extreme in positive direction, or 13.1° under the condition where the object distance is infinite at the telephoto end in the zoom optical system according to the first embodiment.

FIG. 14J is an aberration diagram that shows X-direction lateral aberration of the chief ray that traverses the point where X-direction field angle is extreme in positive direction, or 17.2° and Y-direction field angle is extreme in positive direction, or 13.1° under the condition where the object distance is infinite at the telephoto end in the zoom optical system according to the first embodiment.

FIG. 14K is an aberration diagram that shows Y-direction lateral aberration of a chief ray that traverses a point where X-direction field angle is extreme in positive direction, or 17.2° and Y-direction field angle is zero under the condition where the object distance is infinite at the telephoto end in the zoom optical system according to the first embodiment.

FIG. 14L is an aberration diagram that shows X-direction lateral aberration of the chief ray that traverses the point where X-direction field angle is extreme in positive direction, or 17.2° and Y-direction field angle is zero under the condition where the object distance is infinite at the telephoto end in the zoom optical system according to the first embodiment.

FIG. 15A is an aberration diagram that shows Y-direction lateral aberration of a chief ray that traverses a point where X-direction field angle is extreme in positive direction, or 24.9° and Y-direction field angle is extreme in negative direction, or −19.3° under the condition where the object distance is 300 mm at the wide-angle end in the zoom optical system according to the first embodiment.

FIG. 15B is an aberration diagram that shows X-direction lateral aberration of the chief ray that traverses the point where X-direction field angle is extreme in positive direction, or 24.9° and Y-direction field angle is extreme in negative direction, or −19.3° under the condition where the object distance is 300 mm at the wide-angle end in the zoom optical system according to the first embodiment.

FIG. 15C is an aberration diagram that shows Y-direction lateral aberration of a chief ray that traverses a point where X-direction field angle is zero and Y-direction field angle is extreme in negative direction, or −19.3° under the condition where the object distance is 300 mm at the wide-angle end in the zoom optical system according to the first embodiment.

FIG. 15D is an aberration diagram that shows X-direction lateral aberration of the chief ray that traverses the point where X-direction field angle is zero and Y-direction field angle is extreme in negative direction, or −19.3° under the condition where the object distance is 300 mm at the wide-angle end in the zoom optical system according to the first embodiment.

FIG. 15E is an aberration diagram that shows Y-direction lateral aberration of a chief ray that traverses a point where X-direction field angle is zero and Y-direction field angle is zero under the condition where the object distance is 300 mm at the wide-angle end in the zoom optical system according to the first embodiment.

FIG. 15F is an aberration diagram that shows X-direction lateral aberration of the chief ray that traverses the point where X-direction field angle is zero and Y-direction field angle is zero under the condition where the object distance is 300 mm at the wide-angle end in the zoom optical system according to the first embodiment.

FIG. 15G is an aberration diagram that shows Y-direction lateral aberration of a chief ray that traverses a point where X-direction field angle is zero and Y-direction field angle is extreme in positive direction, or 19.3° under the condition where the object distance is 300 mm at the wide-angle end in the zoom optical system according to the first embodiment.

FIG. 15H is an aberration diagram that shows X-direction lateral aberration of the chief ray that traverses the point where X-direction field angle is zero and Y-direction field angle is extreme in positive direction, or 19.3° under the condition where the object distance is 300 mm at the wide-angle end in the zoom optical system according to the first embodiment.

FIG. 15I is an aberration diagram that shows Y-direction lateral aberration of a chief ray that traverses a point where X-direction field angle is extreme in positive direction, or 24.9° and Y-direction field angle is extreme in positive direction, or 19.3° under the condition where the object distance is 300 mm at the wide-angle end in the zoom optical system according to the first embodiment.

FIG. 15J is an aberration diagram that shows X-direction lateral aberration of the chief ray that traverses the point where X-direction field angle is extreme in positive direction, or 24.9° and Y-direction field angle is extreme in positive direction, or 19.3° under the condition where the object distance is 300 mm at the wide-angle end in the zoom optical system according to the first embodiment.

FIG. 15K is an aberration diagram that shows Y-direction lateral aberration of a chief ray that traverses a point where X-direction field angle is extreme in positive direction, or 24.9° and Y-direction field angle is zero under the condition where the object distance is 300 mm at the wide-angle end in the zoom optical system according to the first embodiment.

FIG. 15L is an aberration diagram that shows X-direction lateral aberration of the chief ray that traverses the point where X-direction field angle is extreme in positive direction, or 24.9° and Y-direction field angle is zero under the condition where the object distance is 300 mm at the wide-angle end in the zoom optical system according to the first embodiment.

FIG. 16A is an aberration diagram that shows Y-direction lateral aberration of a chief ray that traverses a point where X-direction field angle is extreme in positive direction, or 20.4° and Y-direction field angle is extreme in negative direction, or −15.6° under the condition where the object distance is 300 mm at the intermediate position in the zoom optical system according to the first embodiment.

FIG. 16B is an aberration diagram that shows X-direction lateral aberration of the chief ray that traverses the point where X-direction field angle is extreme in positive direction, or 20.4° and Y-direction field angle is extreme in negative direction, or −15.6° under the condition where the object distance is 300 mm at the intermediate position in the zoom optical system according to the first embodiment.

FIG. 16C is an aberration diagram that shows Y-direction lateral aberration of a chief ray that traverses a point where X-direction field angle is zero and Y-direction field angle is extreme in negative direction, or −15.6° under the condition where the object distance is 300 mm at the intermediate position in the zoom optical system according to the first embodiment.

FIG. 16D is an aberration diagram that shows X-direction lateral aberration of the chief ray that traverses the point where X-direction field angle is zero and Y-direction field angle is extreme in negative direction, or −15.6° under the condition where the object distance is 300 mm at the intermediate position in the zoom optical system according to the first embodiment.

FIG. 16E is an aberration diagram that shows Y-direction lateral aberration of a chief ray that traverses a point where X-direction field angle is zero and Y-direction field angle is zero under the condition where the object distance is 300 mm at the intermediate position in the zoom optical system according to the first embodiment.

FIG. 16F is an aberration diagram that shows X-direction lateral aberration of the chief ray that traverses the point where X-direction field angle is zero and Y-direction field angle is zero under the condition where the object distance is 300 mm at the intermediate position in the zoom optical system according to the first embodiment.

FIG. 16G is an aberration diagram that shows Y-direction lateral aberration of a chief ray that traverses a point where X-direction field angle is zero and Y-direction field angle is extreme in positive direction, or 15.6° under the condition where the object distance is 300 mm at the intermediate position in the zoom optical system according to the first embodiment.

FIG. 16H is an aberration diagram that shows X-direction lateral aberration of the chief ray that traverses the point where X-direction field angle is zero and Y-direction field angle is extreme in positive direction, or 15.6° under the condition where the object distance is 300 mm at the intermediate position in the zoom optical system according to the first embodiment.

FIG. 16I is an aberration diagram that shows Y-direction lateral aberration of a chief ray that traverses a point where X-direction field angle is extreme in positive direction, or 20.4° and Y-direction field angle is extreme in positive direction, or 15.6° under the condition where the object distance is 300 mm at the intermediate position in the zoom optical system according to the first embodiment.

FIG. 16J is an aberration diagram that shows X-direction lateral aberration of the chief ray that traverses the point where X-direction field angle is extreme in positive direction, or 20.4° and Y-direction field angle is extreme in positive direction, or 15.6° under the condition where the object distance is 300 mm at the intermediate position in the zoom optical system according to the first embodiment.

FIG. 16K is an aberration diagram that shows Y-direction lateral aberration of a chief ray that traverses a point where X-direction field angle is extreme in positive direction, or 20.4° and Y-direction field angle is zero under the condition where the object distance is 300 mm at the intermediate position in the zoom optical system according to the first embodiment.

FIG. 16L is an aberration diagram that shows X-direction lateral aberration of the chief ray that traverses the point where X-direction field angle is extreme in positive direction, or 20.4° and Y-direction field angle is zero under the condition where the object distance is 300 mm at the intermediate position in the zoom optical system according to the first embodiment.

FIG. 17A is an aberration diagram that shows Y-direction lateral aberration of a chief ray that traverses a point where X-direction field angle is extreme in positive direction, or 17.2° and Y-direction field angle is extreme in negative direction, or −13.1° under the condition where the object distance is 300 mm at the telephoto end in the zoom optical system according to the first embodiment.

FIG. 17B is an aberration diagram that shows X-direction lateral aberration of the chief ray that traverses the point where X-direction field angle is extreme in positive direction, or 17.2° and Y-direction field angle is extreme in negative direction, or −13.1° under the condition where the object distance is 300 mm at the telephoto end in the zoom optical system according to the first embodiment FIG. 17C is an aberration diagram that shows Y-direction lateral aberration of a chief ray that traverses a point where X-direction field angle is zero and Y-direction field angle is extreme in negative direction, or −13.1° under the condition where the object distance is 300 mm at the telephoto end in the zoom optical system according to the first embodiment.

FIG. 17D is an aberration diagram that shows X-direction lateral aberration of the chief ray that traverses the point where X-direction field angle is zero and Y-direction field angle is extreme in negative direction, or −13.1° under the condition where the object distance is 300 mm at the telephoto end in the zoom optical system according to the first embodiment.

FIG. 17E is an aberration diagram that shows Y-direction lateral aberration of a chief ray that traverses a point where X-direction field angle is zero and Y-direction field angle is zero under the condition where the object distance is 300 mm at the telephoto end in the zoom optical system according to the first embodiment.

FIG. 17F is an aberration diagram that shows X-direction lateral aberration of the chief ray that traverses the point where X-direction field angle is zero and Y-direction field angle is zero under the condition where the object distance is 300 mm at the telephoto end in the zoom optical system according to the first embodiment.

FIG. 17G is an aberration diagram that shows Y-direction lateral aberration of a chief ray that traverses a point where X-direction field angle is zero and Y-direction field angle is extreme in positive direction, or 13.1° under the condition where the object distance is 300 mm at the telephoto end in the zoom optical system according to the first embodiment.

FIG. 17H is an aberration diagram that shows X-direction lateral aberration of the chief ray that traverses the point where X-direction field angle is zero and Y-direction field angle is extreme in positive direction, or 13.1° under the condition where the object distance is 300 mm at the telephoto end in the zoom optical system according to the first embodiment.

FIG. 17I is an aberration diagram that shows Y-direction lateral aberration of a chief ray that traverses a point where X-direction field angle is extreme in positive direction, or 17.2° and Y-direction field angle is extreme in positive direction, or 13.1° under the condition where the object distance is 300 mm at the telephoto end in the zoom optical system according to the first embodiment.

FIG. 17J is an aberration diagram that shows X-direction lateral aberration of the chief ray that traverses the point where X-direction field angle is extreme in positive direction, or 17.2° and Y-direction field angle is extreme in positive direction, or 13.1° under the condition where the object distance is 300 mm at the telephoto end in the zoom optical system according to the first embodiment.

FIG. 17K is an aberration diagram that shows Y-direction lateral aberration of a chief ray that traverses a point where X-direction field angle is extreme in positive direction, or 17.2° and Y-direction field angle is zero under the condition where the object distance is 300 mm at the telephoto end in the zoom optical system according to the first embodiment.

FIG. 17L is an aberration diagram that shows X-direction lateral aberration of the chief ray that traverses the point where X-direction field angle is extreme in positive direction, or 17.2° and Y-direction field angle is zero under the condition where the object distance is 300 mm at the telephoto end in the zoom optical system according to the first embodiment.

FIG. 18A is an aberration diagram that shows Y-direction lateral aberration of a chief ray that traverses a point where X-direction field angle is extreme in positive direction, or 28.8° and Y-direction field angle is extreme in negative direction, or −22.4° under the condition where the object distance is infinite at the wide-angle end in the zoom optical system according to the tenth embodiment.

FIG. 18B is an aberration diagram that shows X-direction lateral aberration of the chief ray that traverses the point where X-direction field angle is extreme in positive direction, or 28.8° and Y-direction field angle is extreme in negative direction, or −22.4° under the condition where the object distance is infinite at the wide-angle end in the zoom optical system according to the tenth embodiment.

FIG. 18C is an aberration diagram that shows Y-direction lateral aberration of a chief ray that traverses a point where X-direction field angle is zero and Y-direction field angle is extreme in negative direction, or −22.4° under the condition where the object distance is infinite at the wide-angle end in the zoom optical system according to the tenth embodiment.

FIG. 18D is an aberration diagram that shows X-direction lateral aberration of the chief ray that traverses the point where X-direction field angle is zero and Y-direction field angle is extreme in negative direction, or −22.4° under the condition where the object distance is infinite at the wide-angle end in the zoom optical system according to the tenth embodiment.

FIG. 18E is an aberration diagram that shows Y-direction lateral aberration of a chief ray that traverses a point where X-direction field angle is zero and Y-direction field angle is zero under the condition where the object distance is infinite at the wide-angle end in the zoom optical system according to the tenth embodiment.

FIG. 18F is an aberration diagram that shows X-direction lateral aberration of the chief ray that traverses the point where X-direction field angle is zero and Y-direction field angle is zero under the condition where the object distance is infinite at the wide-angle end in the zoom optical system according to the tenth embodiment.

FIG. 18G is an aberration diagram that shows Y-direction lateral aberration of a chief ray that traverses a point where X-direction field angle is zero and Y-direction field angle is extreme in positive direction, or 22.4° under the condition where the object distance is infinite at the wide-angle end in the zoom optical system according to the tenth embodiment.

FIG. 18H is an aberration diagram that shows X-direction lateral aberration of the chief ray that traverses the point where X-direction field angle is zero and Y-direction field angle is extreme in positive direction, or 22.4° under the condition where the object distance is infinite at the wide-angle end in the zoom optical system according to the tenth embodiment.

FIG. 18I is an aberration diagram that shows Y-direction lateral aberration of a chief ray that traverses a point where X-direction field angle is extreme in positive direction, or 28.8° and Y-direction field angle is extreme in positive direction, or 22.4° under the condition where the object distance is infinite at the wide-angle end in the zoom optical system according to the tenth embodiment.

FIG. 18J is an aberration diagram that shows X-direction lateral aberration of the chief ray that traverses the point where X-direction field angle is extreme in positive direction, or 28.8° and Y-direction field angle is extreme in positive direction, or 22.4° under the condition where the object distance is infinite at the wide-angle end in the zoom optical system according to the tenth embodiment.

FIG. 18K is an aberration diagram that shows Y-direction lateral aberration of a chief ray that traverses a point where X-direction field angle is extreme in positive direction, or 28.8° and Y-direction field angle is zero under the condition where the object distance is infinite at the wide-angle end in the zoom optical system according to the tenth embodiment.

FIG. 18L is an aberration diagram that shows X-direction lateral aberration of the chief ray that traverses the point where X-direction field angle is extreme in positive direction, or 28.8° and Y-direction field angle is zero tinder the condition where the object distance is infinite at the wide-angle end in the zoom optical system according to the tenth embodiment.

FIG. 19A is an aberration diagram that shows Y-direction lateral aberration of a chief ray that traverses a point where X-direction field angle is extreme in positive direction, or 17.5° and Y-direction field angle is extreme in negative direction, or −13.3° under the condition where the object distance is infinite at the intermediate position in the zoom optical system according to the tenth embodiment.

FIG. 19B is an aberration diagram that shows X-direction lateral aberration of the chief ray that traverses the point where X-direction field angle is extreme in positive direction, or 17.5° and Y-direction field angle is extreme in negative direction, or −13.3° under the condition where the object distance is infinite at the intermediate position in the zoom optical system according to the tenth embodiment.

FIG. 19C is an aberration diagram that shows Y-direction lateral aberration of a chief ray that traverses a point where X-direction field angle is zero and Y-direction field angle is extreme in negative direction, or −13.3° under the condition where the object distance is infinite at the intermediate position in the zoom optical system according to the tenth embodiment.

FIG. 19D is an aberration diagram that shows X-direction lateral aberration of the chief ray that traverses the point where X-direction field angle is zero and Y-direction field angle is extreme in negative direction, or −13.3° under the condition where the object distance is infinite at the intermediate position in the zoom optical system according to the tenth embodiment.

FIG. 19E is an aberration diagram that shows Y-direction lateral aberration of a chief ray that traverses a point where X-direction field angle is zero and Y-direction field angle is zero under the condition where the object distance is infinite at the intermediate position in the zoom optical system according to the tenth embodiment.

FIG. 19F is an aberration diagram that shows X-direction lateral aberration of the chief ray that traverses the point where X-direction field angle is zero and Y-direction field angle is zero under the condition where the object distance is infinite at the intermediate position in the zoom optical system according to the tenth embodiment.

FIG. 19G is an aberration diagram that shows Y-direction lateral aberration of a chief ray that traverses a point where X-direction field angle is zero and Y-direction field angle is extreme in positive direction, or 13.3° under the condition where the object distance is infinite at the intermediate position in the zoom optical system according to the tenth embodiment.

FIG. 19H is an aberration diagram that shows X-direction lateral aberration of the chief ray that traverses the point where X-direction field angle is zero and Y-direction field angle is extreme in positive direction, or 13.3° under the condition where the object distance is infinite at the intermediate position in the zoom optical system according to the tenth embodiment.

Figure 1A:
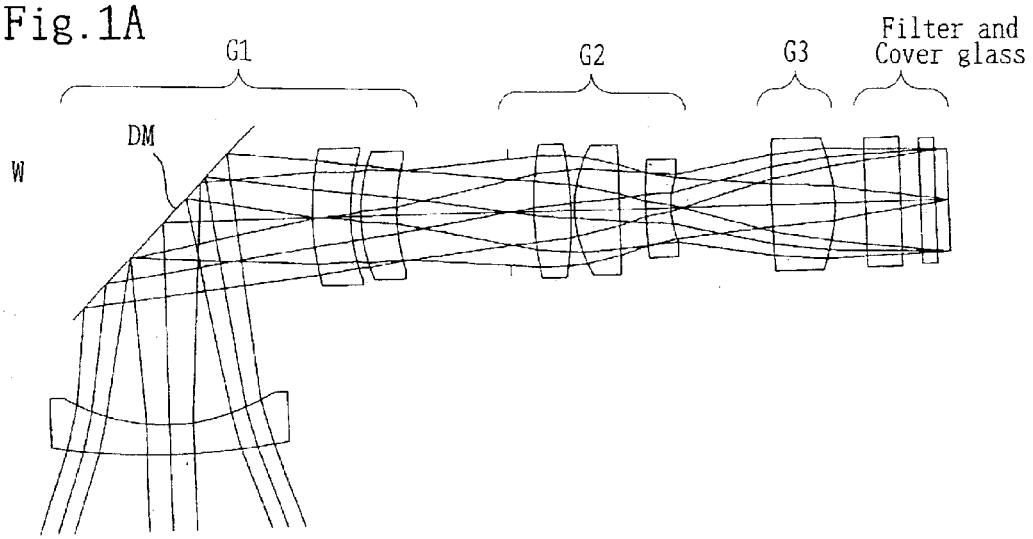
FIG. 1A is a sectional view that shows a lens configuration of a zoom optical system according to the first embodiment of the present invention at the wide-angle end.
Figure 1B:
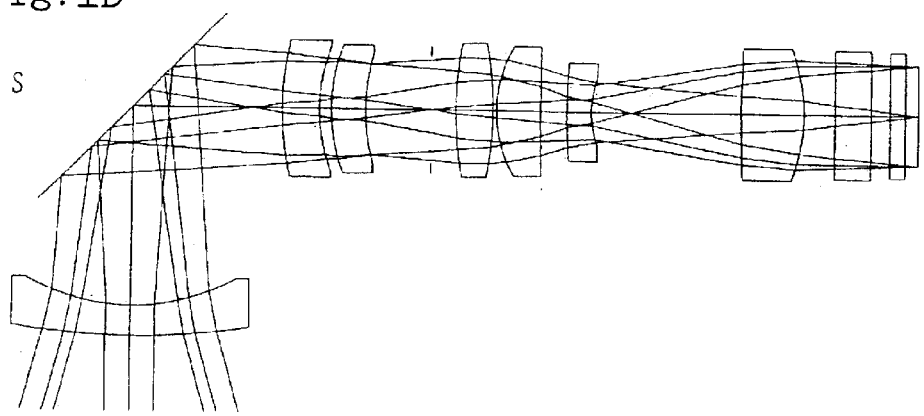
FIG. 1B is a sectional view that shows a lens configuration of the zoom optical system according to the first embodiment of the present invention at the intermediate position.
Figure 1C:
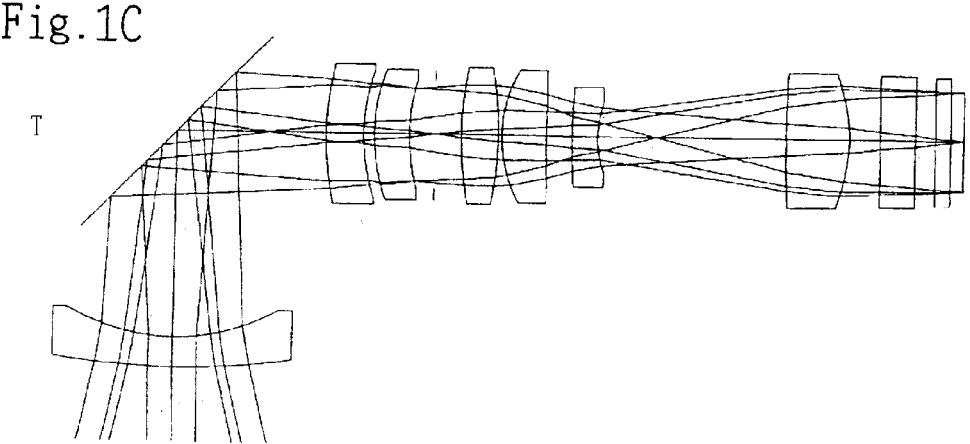
FIG. 1C is a sectional view that shows a lens configuration of the zoom optical system according to the first embodiment of the present invention at the telephoto end.
Figure 2A:
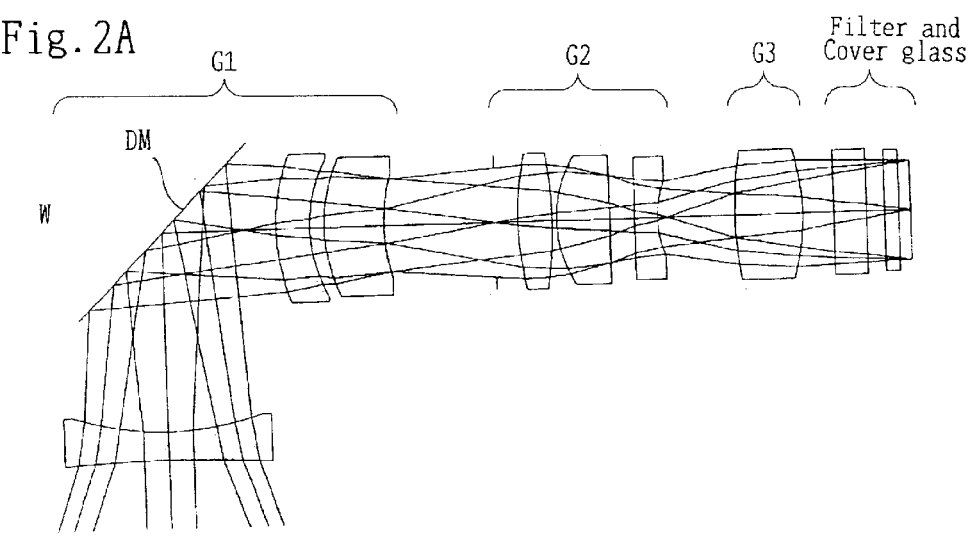
FIG. 2A is a sectional view that shows a lens configuration of a zoom optical system according to the second embodiment of the present invention at the wide-angle end.
Figure 2B:
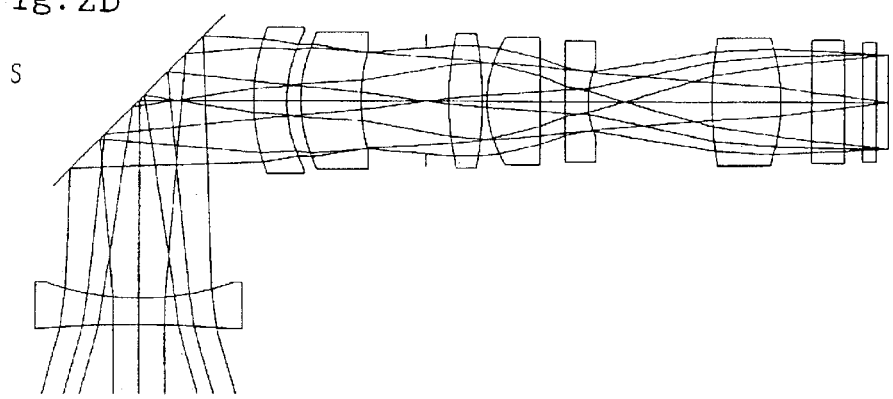
FIG. 2B is a sectional view that shows a lens configuration of the zoom optical system according to the second embodiment of the present invention at the intermediate position.
Figure 2C:
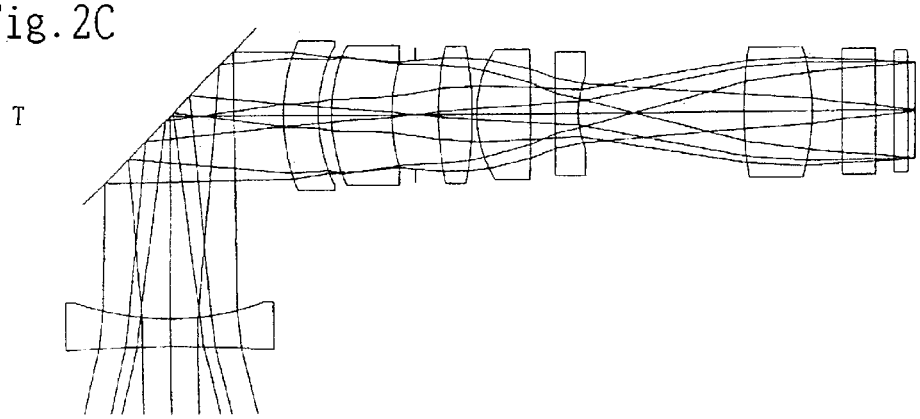
FIG. 2C is a sectional view that shows a lens configuration of the zoom optical system according to the second embodiment of the present invention at the telephoto end.
Figure 3A:
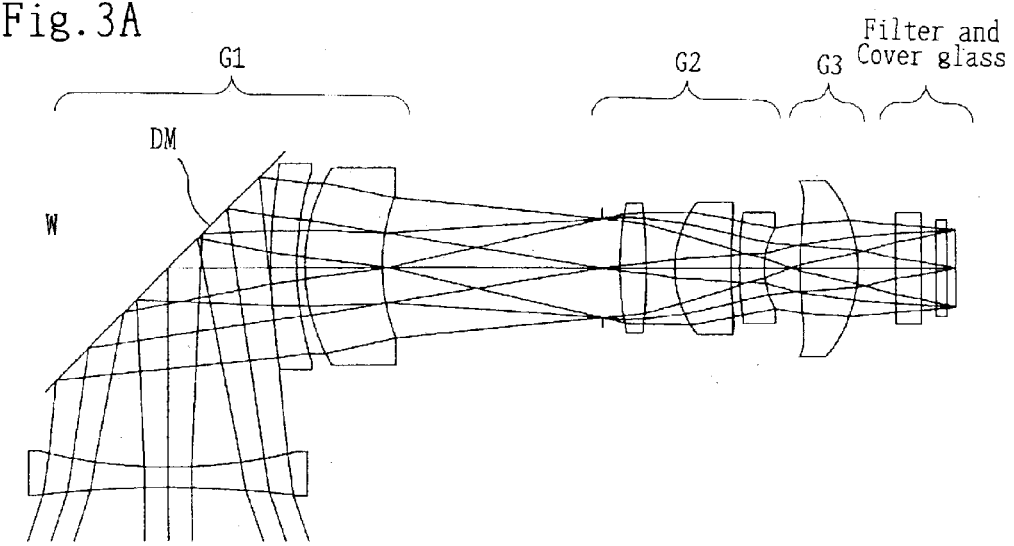
FIG. 3A is a sectional view that shows a lens configuration of a zoom optical system according to the third embodiment of the present invention at the wide-angle end.
Figure 3B:
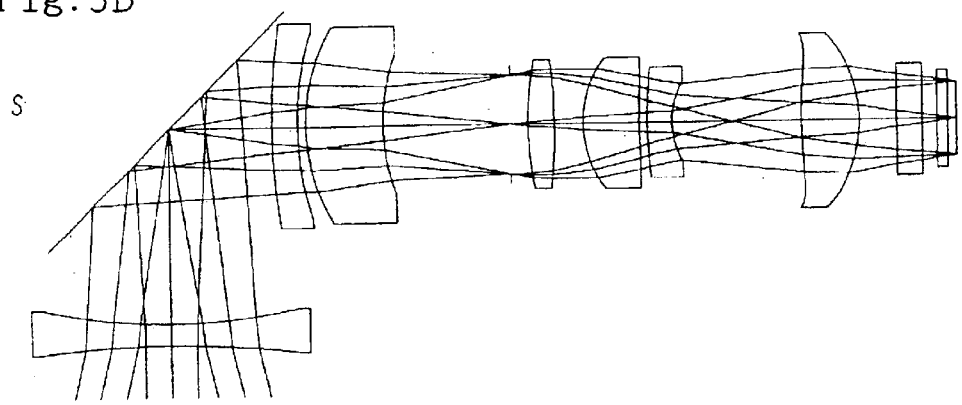
FIG. 3B is a sectional view that shows a lens configuration of the zoom optical system according to the third embodiment of the present invention at the intermediate position.
Figure 3C:
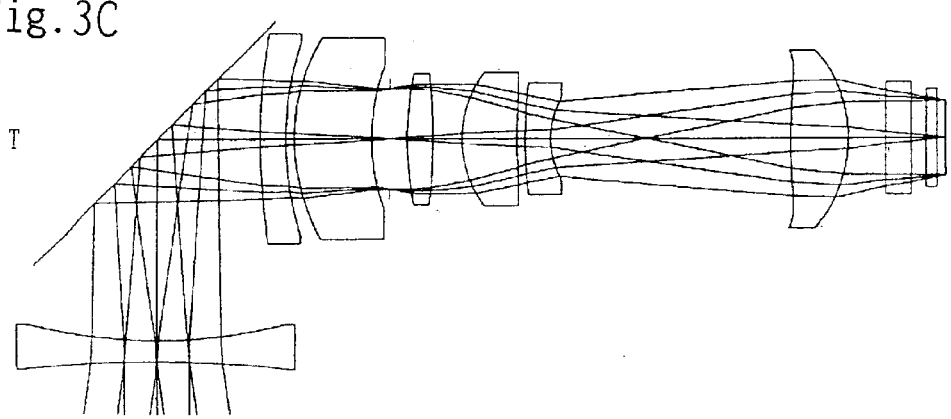
FIG. 3C is a sectional view that shows a lens configuration of the zoom optical system according to the third embodiment of the present invention at the telephoto end.
Figure 5A:
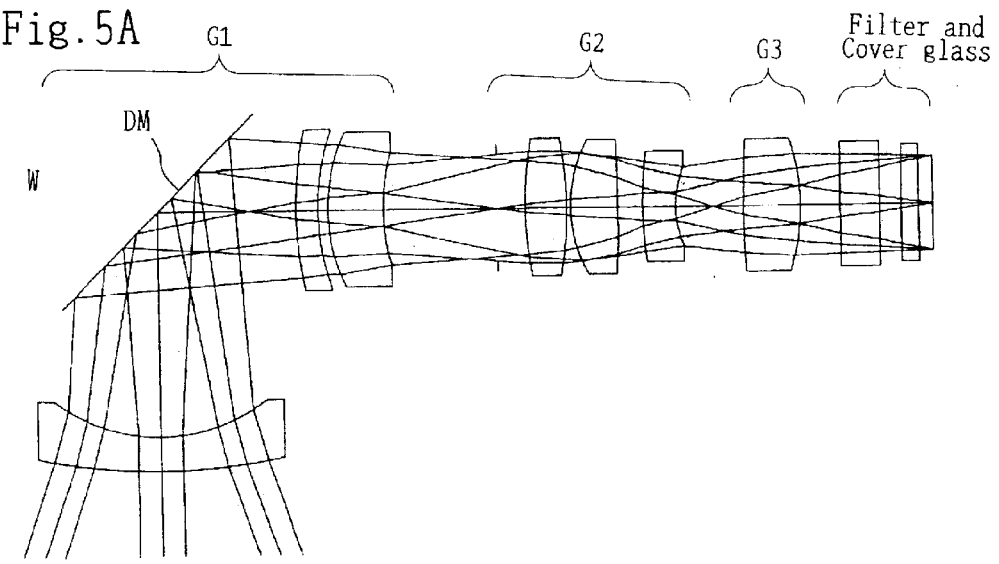
FIG. 5A is a sectional view that shows a lens configuration of a zoom optical system according to the fifth embodiment of the present invention at the wide-angle end.
Figure 5B:
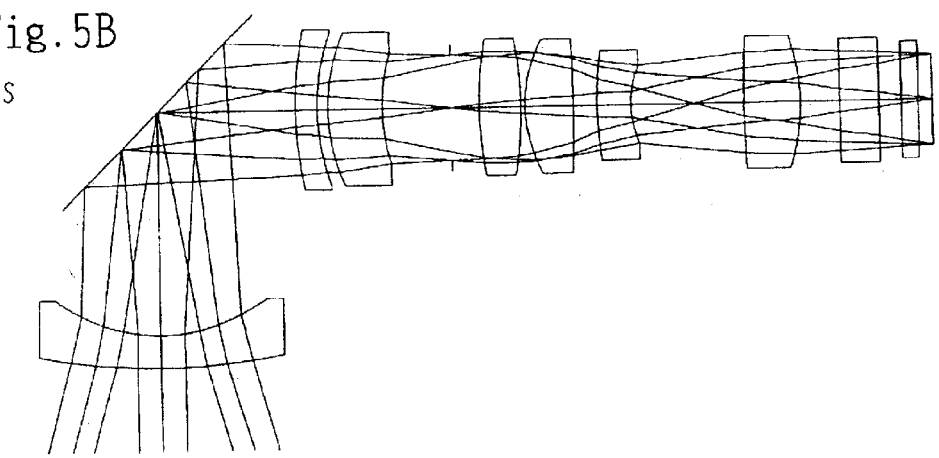
FIG. 5B is a sectional view that shows a lens configuration of the zoom optical system according to the fifth embodiment of the present invention at the intermediate position.
Figure 5C:
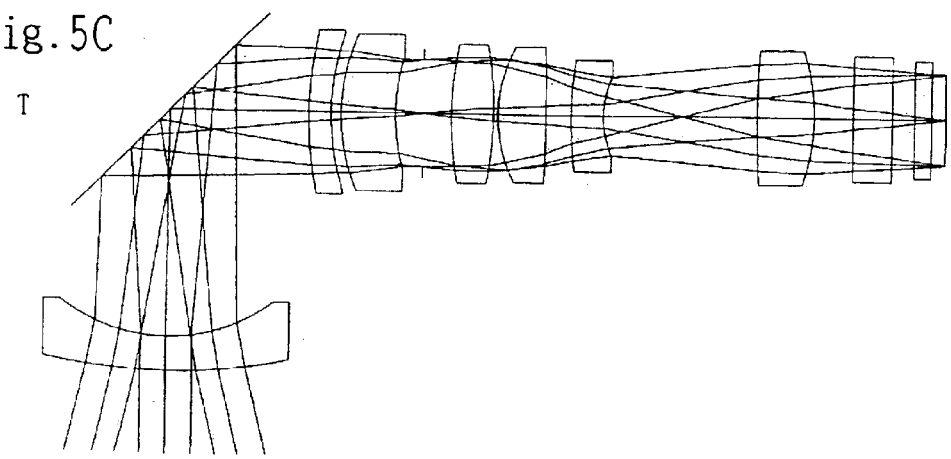
FIG. 5C is a sectional view that shows a lens configuration of the zoom optical system according to the fifth embodiment of the present invention at the telephoto end.
Figure 6A:
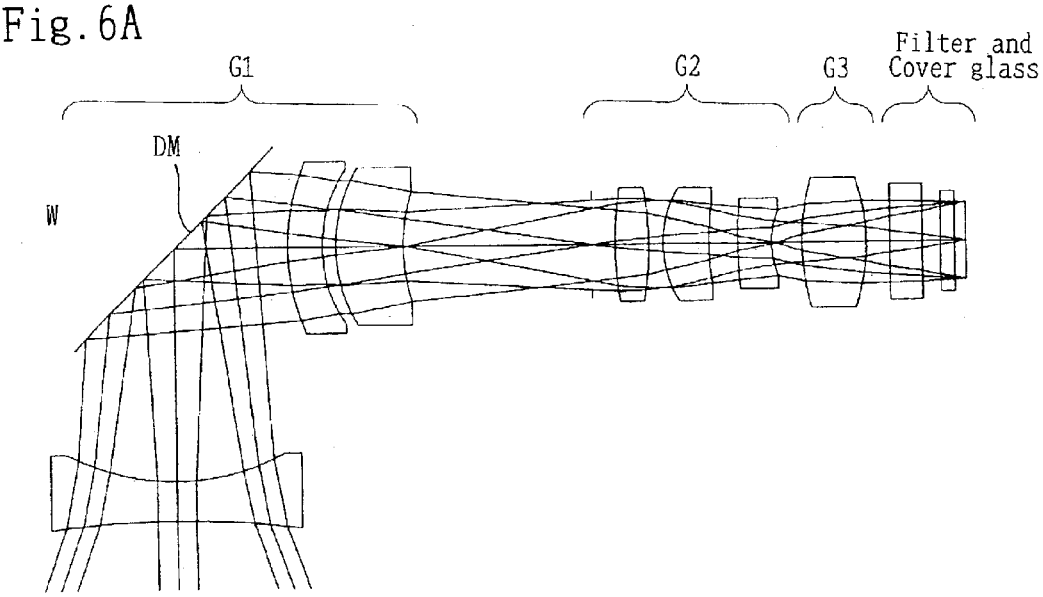
FIG. 6A is a sectional view that shows a lens configuration of a zoom optical system according to the sixth embodiment of the present invention at the wide-angle end.
Figure 6B:
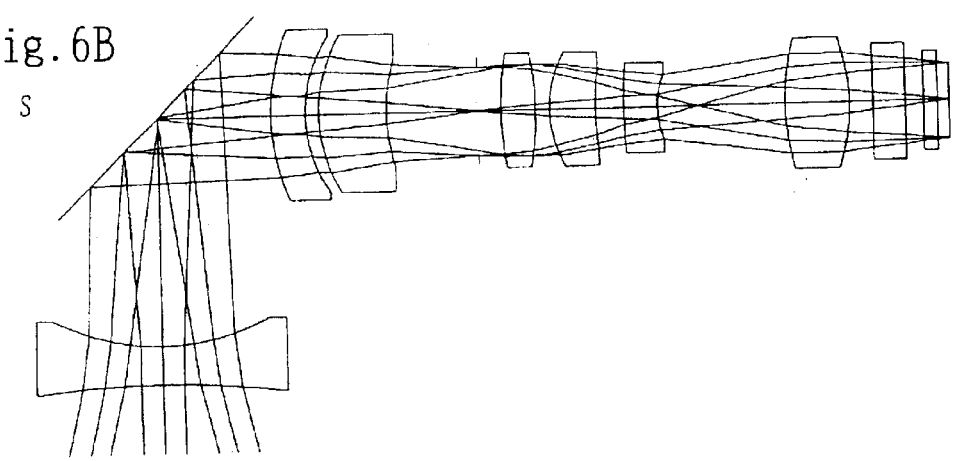
FIG. 6B is a sectional view that shows a lens configuration of the zoom optical system according to the sixth embodiment of the present invention at the intermediate position.
Figure 6C:
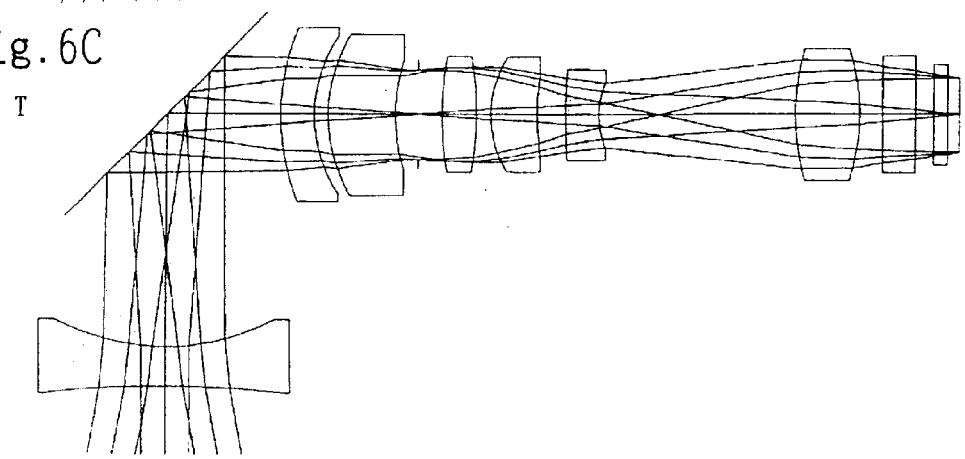
FIG. 6C is a sectional view that shows a lens configuration of the zoom optical system according to the sixth embodiment of the present invention in the telephoto end.
Figure 7A:
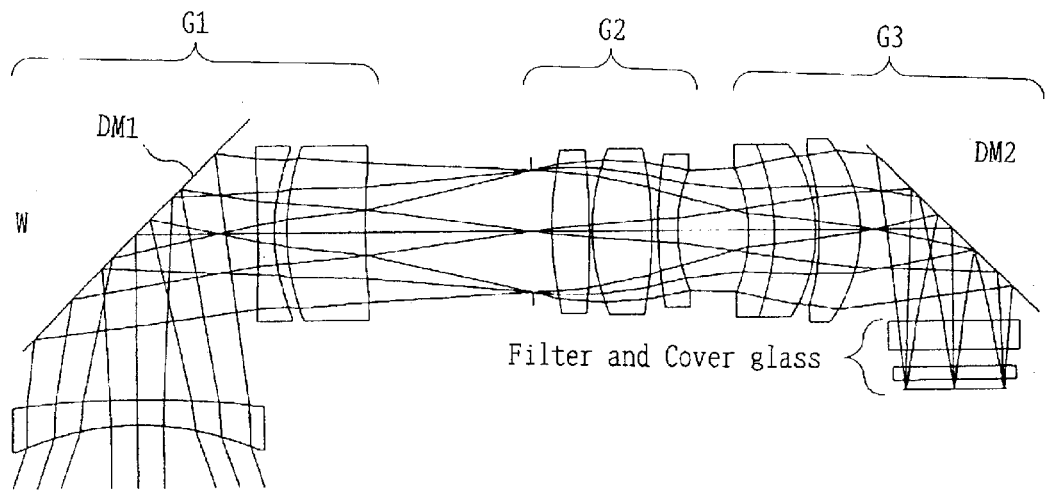
FIG. 7A is a sectional view that shows a lens configuration of a zoom optical system according to the seventh embodiment of the present invention at the wide-angle end.
Figure 7B:
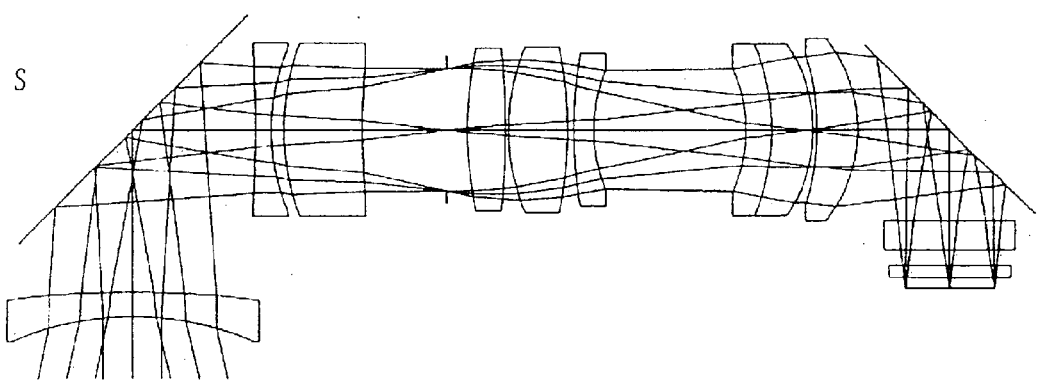
FIG. 7B is a sectional view that shows a lens configuration of the zoom optical system according to the seventh embodiment of the present invention at the intermediate position.
Figure 7C:
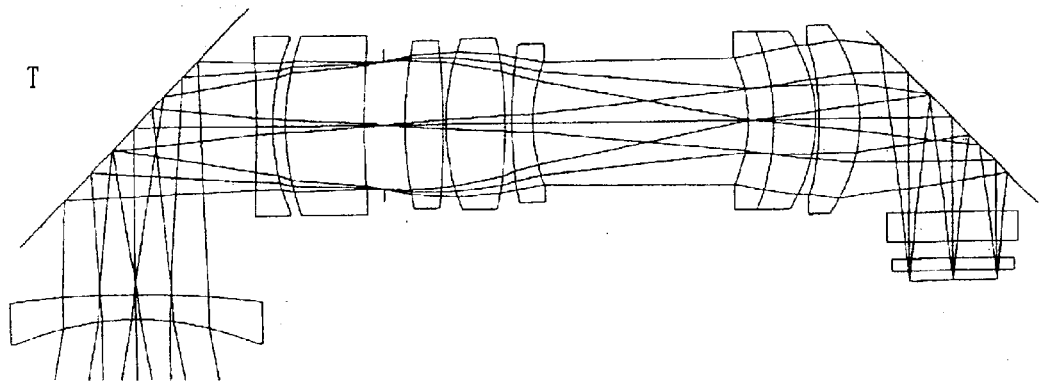
FIG. 7C is a sectional view that shows a lens configuration of the zoom optical system according to the seventh embodiment of the present invention at the telephoto end.
Figure 8A:
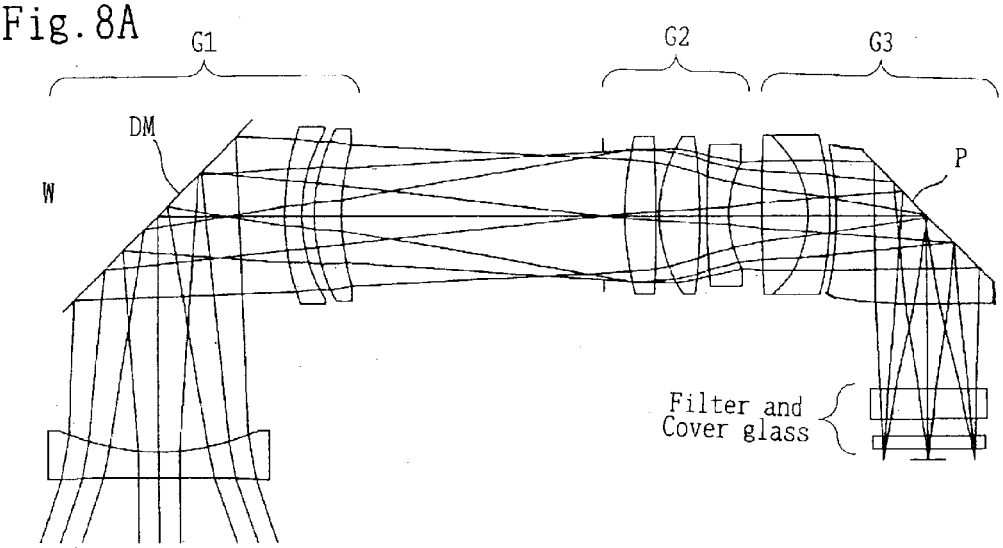
FIG. 8A is a sectional view that shows a lens configuration of a zoom optical system according to the eighth embodiment of the present invention at the wide-angle end.
Figure 8B:
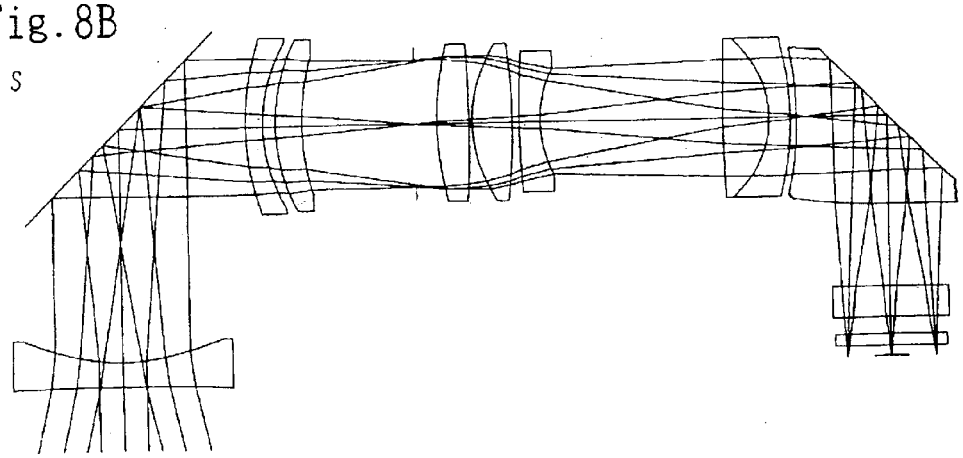
FIG. 8B is a sectional view that shows a lens configuration of the zoom optical system according to the eighth embodiment of the present invention at the intermediate position.
Figure 8C:
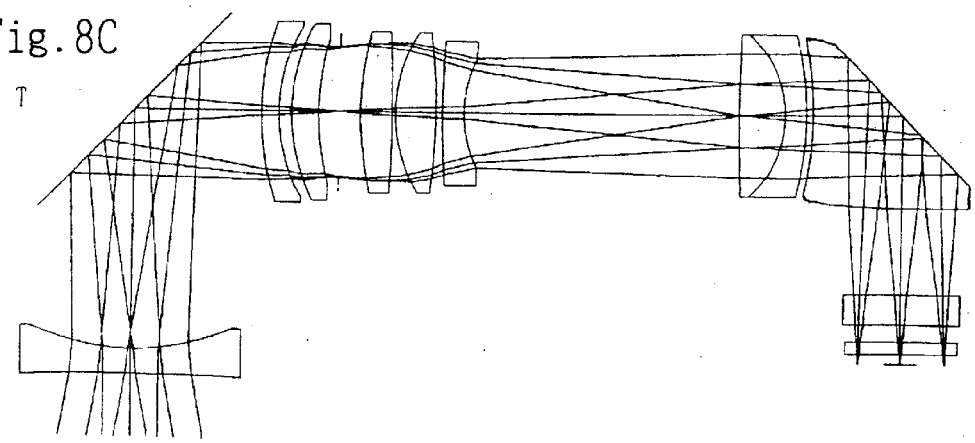
FIG. 8C is a sectional view that shows a lens configuration of the zoom optical system according to the eighth embodiment of the present invention at the telephoto end.
Figure 9A:
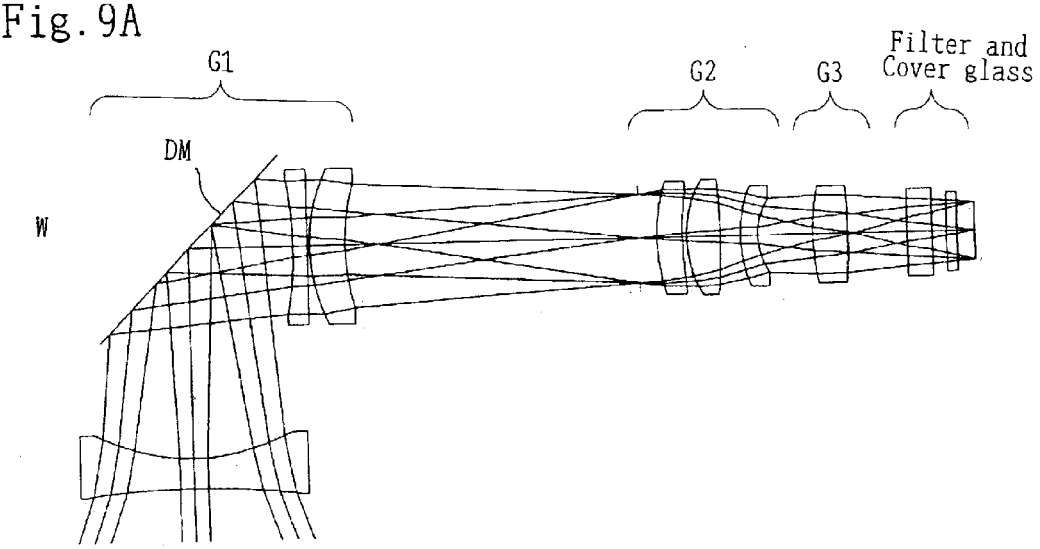
FIG. 9A is a sectional view that shows a lens configuration of a zoom optical system according to the ninth embodiment of the present invention at the wide-angle end.
Figure 9B:
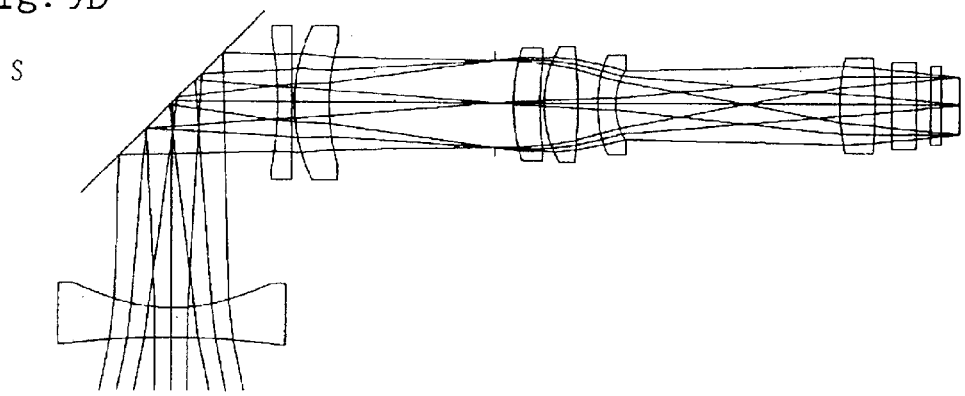
FIG. 9B is a sectional view that shows a lens configuration of the zoom optical system according to the ninth embodiment of the present invention at the intermediate position.
Figure 9C:
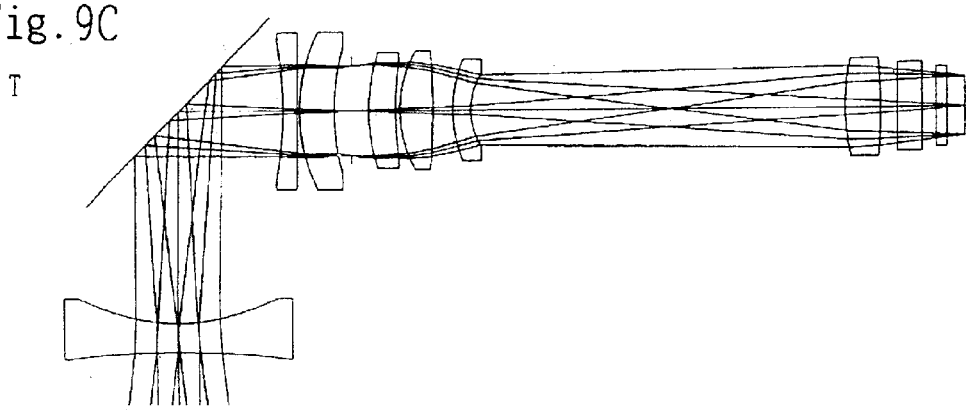
FIG. 9C is a sectional view that shows a lens configuration of the zoom optical system according to the ninth embodiment of the present invention at the telephoto end.
Figure 10A:
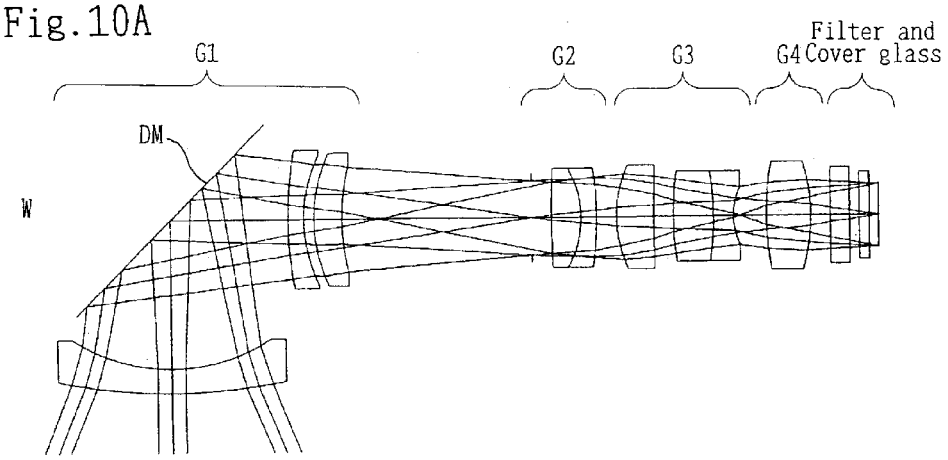
FIG. 10A is a sectional view that shows a lens configuration of a zoom optical system according to the tenth embodiment of the present invention at the wide-angle end.
Figure 10B:
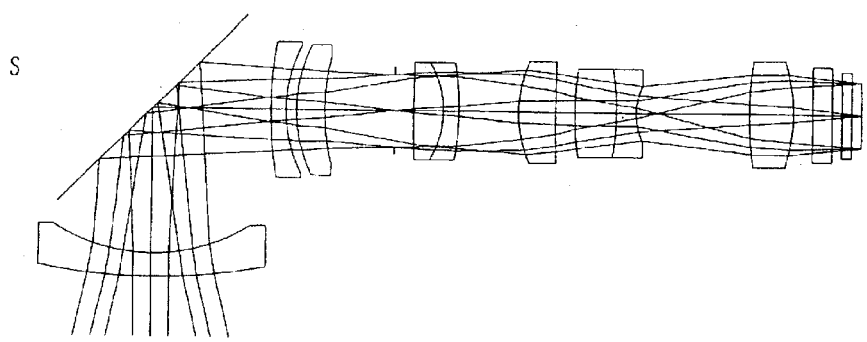
FIG. 10B is a sectional view that shows a lens configuration of the zoom optical system according to the tenth embodiment of the present invention at the intermediate position.
Figure 10C:
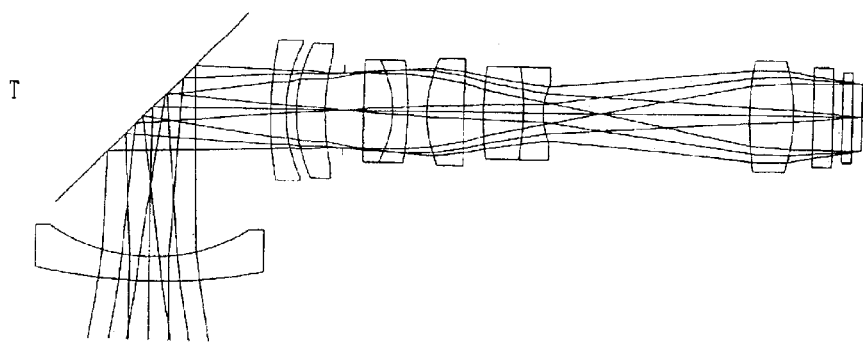
FIG. 10C is a sectional view that shows a lens configuration of the zoom optical system according to the tenth embodiment of the present invention at the telephoto end.

FIG. 19I is an aberration diagram that shows Y-direction lateral aberration of a chief ray that traverses a point where X-direction field angle is extreme in positive direction, or 17.5° and Y-direction field angle is extreme in positive direction, or 13.3° under the condition where the object distance is infinite at the intermediate position in the zoom optical system according to the tenth embodiment.

FIG. 19J is an aberration diagram that shows X-direction lateral aberration of the chief ray that traverses the point where X-direction field angle is extreme in positive direction, or 17.5° and Y-direction field angle is extreme in positive direction, or 13.3° under the condition where the object distance is infinite at the intermediate position in the zoom optical system according to the tenth embodiment.

FIG. 19K is an aberration diagram that shows Y-direction lateral aberration of a chief ray that traverses a point where X-direction field angle is extreme in positive direction, or 17.5° and Y-direction field angle is zero under the condition where the object distance is infinite at the intermediate position in the zoom optical system according to the tenth embodiment.

FIG. 19L is an aberration diagram that shows X-direction lateral aberration of the chief ray that traverses the point where X-direction field angle is extreme in positive direction, or 17.5° and Y-direction field angle is zero under the condition where the object distance is infinite at the intermediate position in the zoom optical system according to the tenth embodiment.

FIG. 20A is an aberration diagram that shows Y-direction lateral aberration of a chief ray that traverses a point where X-direction field angle is extreme in positive direction, or 12.4° and Y-direction field angle is extreme in negative direction, or −9.37° under the condition where the object distance is infinite at the telephoto end in the zoom optical system according to the tenth embodiment.

FIG. 20B is an aberration diagram that shows X-direction lateral aberration of the chief ray that traverses the point where X-direction field angle is extreme in positive direction, or 12.4° and Y-direction field angle is extreme in negative direction, or −9.37° under the condition where the object distance is infinite at the telephoto end in the zoom optical system according to the tenth embodiment.

FIG. 20C is an aberration diagram that shows Y-direction lateral aberration of a chief ray that traverses a point where X-direction field angle is zero and Y-direction field angle is extreme in negative direction, or −9.37° under the condition where the object distance is infinite at the telephoto end in the zoom optical system according to the tenth embodiment.

FIG. 20D is an aberration diagram that shows X-direction lateral aberration of the chief ray that traverses the point where X-direction field angle is zero and Y-direction field angle is extreme in negative direction, or −9.37° under the condition where the object distance is infinite at the telephoto end in the zoom optical system according to the tenth embodiment.

FIG. 20E is an aberration diagram that shows Y-direction lateral aberration of a chief ray that traverses a point where X-direction field angle is zero and Y-direction field angle is zero under the condition where the object distance is infinite at the telephoto end in the zoom optical system according to the tenth embodiment.

FIG. 20F is an aberration diagram that shows X-direction lateral aberration of the chief ray that traverses the point where X-direction field angle is zero and Y-direction field angle is zero under the condition where the object distance is infinite at the telephoto end in the zoom optical system according to the tenth embodiment.

FIG. 20G is an aberration diagram that shows Y-direction lateral aberration of a chief ray that traverses a point where X-direction field angle is zero and Y-direction field angle is extreme in positive direction, or 9.37° under the condition where the object distance is infinite at the telephoto end in the zoom optical system according to the tenth embodiment.

FIG. 20H is an aberration diagram that shows X-direction lateral aberration of the chief ray that traverses the point where X-direction field angle is zero and Y-direction field angle is extreme in positive direction, or 9.37° under the condition where the object distance is infinite at the telephoto end in the zoom optical system according to the tenth embodiment.

FIG. 20I is an aberration diagram that shows Y-direction lateral aberration of a chief ray that traverses a point where X-direction field angle is extreme in positive direction, or 12.4° and Y-direction field angle is extreme in positive direction, or 9.37° under the condition where the object distance is infinite at the telephoto end in the zoom optical system according to the tenth embodiment.

FIG. 20J is an aberration diagram that shows X-direction lateral aberration of the chief ray that traverses the point where X-direction field angle is extreme in positive direction, or 12.4° and Y-direction field angle is extreme in positive direction, or 9.37° under the condition where the object distance is infinite at the telephoto end in the zoom optical system according to the tenth embodiment.

FIG. 20K is an aberration diagram that shows Y-direction lateral aberration of a chief ray that traverses a point where X-direction field angle is extreme in positive direction, or 12.4° and Y-direction field angle is zero under the condition where the object distance is infinite at the telephoto end in the zoom optical system according to the tenth embodiment.

FIG. 20L is an aberration diagram that shows X-direction lateral aberration of the chief ray that traverses the point where X-direction field angle is extreme in positive direction, or 12.4° and Y-direction field angle is zero under the condition where the object distance is infinite at the telephoto end in the zoom optical system according to the tenth embodiment.

FIG. 21A is an aberration diagram that shows Y-direction lateral aberration of a chief ray that traverses a point where X-direction field angle is extreme in positive direction, or 28.8° and Y-direction field angle is extreme in negative direction, or −22.4° under the condition where the object distance is 300 mm at the wide-angle end in the zoom optical system according to the tenth embodiment.

FIG. 21B is an aberration diagram that shows X-direction lateral aberration of the chief ray that traverses the point where X-direction field angle is extreme in positive direction, or 28.8° and Y-direction field angle is extreme in negative direction, or −22.4° under the condition where the object distance is 300 mm at the wide-angle end in the zoom optical system according to the tenth embodiment.

FIG. 21C is an aberration diagram that shows Y-direction lateral aberration of a chief ray that traverses a point where X-direction field angle is zero and Y-direction field angle is extreme in negative direction, or −22.4° under the condition where the object distance is 300 mm at the wide-angle end in the zoom optical system according to the tenth embodiment.

FIG. 21D is an aberration diagram that shows X-direction lateral aberration of the chief ray that traverses the point where X-direction field angle is zero and Y-direction field angle is extreme in negative direction, or −22.4° under the condition where the object distance is 300 mm at the wide-angle end in the zoom optical system according to the tenth embodiment.

FIG. 21E is an aberration diagram that shows Y-direction lateral aberration of a chief ray that traverses a point where X-direction field angle is zero and Y-direction field angle is zero under the condition where the object distance is 300 mm at the wide-angle end in the zoom optical system according to the tenth embodiment.

FIG. 21F is an aberration diagram that shows X-direction lateral aberration of the chief ray that traverses the point where X-direction field angle is zero and Y-direction field angle is zero under the condition where the object distance is 300 mm at the wide-angle end in the zoom optical system according to the tenth embodiment.

FIG. 21G is an aberration diagram that shows Y-direction lateral aberration of a chief ray that traverses a point where X-direction field angle is zero and Y-direction field angle is extreme in positive direction, or 22.4° under the condition where the object distance is 300 mm at the wide-angle end in the zoom optical system according to the tenth embodiment.

FIG. 21H is an aberration diagram that shows X-direction lateral aberration of the chief ray that traverses the point where X-direction field angle is zero and Y-direction field angle is extreme in positive direction, or 22.4° under the condition where the object distance is 300 mm at the wide-angle end in the zoom optical system according to the tenth embodiment.

FIG. 21I is an aberration diagram that shows Y-direction lateral aberration of a chief ray that traverses a point where X-direction field angle is extreme in positive direction, or 28.8° and Y-direction field angle is extreme in positive direction, or 22.4° under the condition where the object distance is 300 mm at the wide-angle end in the zoom optical system according to the tenth embodiment.

FIG. 21J is an aberration diagram that shows X-direction lateral aberration of the chief ray that traverses the point where X-direction field angle is extreme in positive direction, or 28.8° and Y-direction field angle is extreme in positive direction, or 22.4° under the condition where the object distance is 300 mm at the wide-angle end in the zoom optical system according to the tenth embodiment.

FIG. 21K is an aberration diagram that shows Y-direction lateral aberration of a chief ray that traverses a point where X-direction field angle is extreme in positive direction, or 28.8° and Y-direction field angle is zero under the condition where the object distance is 300 mm at the wide-angle end in the zoom optical system according to the tenth embodiment.

FIG. 21L is an aberration diagram that shows X-direction lateral aberration of the chief ray that traverses the point where X-direction field angle is extreme in positive direction, or 28.8° and Y-direction field angle is zero under the condition where the object distance is 300 mm at the wide-angle end in the zoom optical system according to the tenth embodiment.

FIG. 22A is an aberration diagram that shows Y-direction lateral aberration of a chief ray that traverses a point where X-direction field angle is extreme in positive direction, or 17.5° and Y-direction field angle is extreme in negative direction, or −13.3° under the condition where the object distance is 300 mm at the intermediate position in the zoom optical system according to the tenth embodiment.

FIG. 22B is an aberration diagram that shows X-direction lateral aberration of the chief ray that traverses the point where X-direction field angle is extreme in positive direction, or 17.5° and Y-direction field angle is extreme in negative direction, or −13.3° under the condition where the object distance is 300 mm at the intermediate position in the zoom optical system according to the tenth embodiment.

FIG. 22C is an aberration diagram that shows Y-direction lateral aberration of a chief ray that traverses a point where X-direction field angle is zero and Y-direction field angle is extreme in negative direction, or −13.3° under the condition where the object distance is 300 mm at the intermediate position in the zoom optical system according to the tenth embodiment.

FIG. 22D is an aberration diagram that shows X-direction lateral aberration of the chief ray that traverses the point where X-direction field angle is zero and Y-direction field angle is extreme in negative direction, or −13.3° under the condition where the object distance is 300 mm at the intermediate position in the zoom optical system according to the tenth embodiment.

FIG. 22E is an aberration diagram that shows Y-direction lateral aberration of a chief ray that traverses a point where X-direction field angle is zero and Y-direction field angle is zero under the condition where the object distance is 300 mm at the intermediate position in the zoom optical system according to the tenth embodiment.

FIG. 22F is an aberration diagram that shows X-direction lateral aberration of the chief ray that traverses the point where X-direction field angle is zero and Y-direction field angle is zero under the condition where the object distance is 300 mm at the intermediate position in the zoom optical system according to the tenth embodiment.

FIG. 22G is an aberration diagram that shows Y-direction lateral aberration of a chief ray that traverses a point where X-direction field angle is zero and Y-direction field angle is extreme in positive direction, or 13.3° under the condition where the object distance is 300 mm at the intermediate position in the zoom optical system according to the tenth embodiment.

FIG. 22H is an aberration diagram that shows X-direction lateral aberration of the chief ray that traverses the point where X-direction field angle is zero and Y-direction field angle is extreme in positive direction, or 13.3° under the condition where the object distance is 300 mm at the intermediate position in the zoom optical system according to the tenth embodiment.

FIG. 22I is an aberration diagram that shows Y-direction lateral aberration of a chief ray that traverses a point where X-direction field angle is extreme in positive direction, or 17.5° and Y-direction field angle is extreme in positive direction, or 13.3° under the condition where the object distance is 300 mm at the intermediate position in the zoom optical system according to the tenth embodiment.

FIG. 22J is an aberration diagram that shows X-direction lateral aberration of the chief ray that traverses the point where X-direction field angle is extreme in positive direction, or 17.5° and Y-direction field angle is extreme in positive direction, or 13.3° under the condition where the object distance is 300 mm at the intermediate position in the zoom optical system according to the tenth embodiment.

FIG. 22K is an aberration diagram that shows Y-direction lateral aberration of a chief ray that traverses a point where X-direction field angle is extreme in positive direction, or 17.5° and Y-direction field angle is zero under the condition where the object distance is 300 mm at the intermediate position in the zoom optical system according to the tenth embodiment.

FIG. 22L is an aberration diagram that shows X-direction lateral aberration of the chief ray that traverses the point where X-direction field angle is extreme in positive direction, or 17.5° and Y-direction field angle is zero under the condition where the object distance is 300 mm at the intermediate position in the zoom optical system according to the tenth embodiment.

FIG. 23A is an aberration diagram that shows Y-direction lateral aberration of a chief ray that traverses a point where X-direction field angle is extreme in positive direction, or 12.4° and Y-direction field angle is extreme in negative direction, or 9.37° under the condition where the object distance is 300 mm at the telephoto end in the zoom optical system according to the tenth embodiment.

FIG. 23B is an aberration diagram that shows X-direction lateral aberration of the chief ray that traverses the point where X-direction field angle is extreme in positive direction, or 12.4° and Y-direction field angle is extreme in negative direction, or −9.37° under the condition where the object distance is 300 mm at the telephoto end in the zoom optical system according to the tenth embodiment.

FIG. 23C is an aberration diagram that shows Y-direction lateral aberration of a chief ray that traverses a point where X-direction field angle is zero and Y-direction field angle is extreme in negative direction, or −9.37° a under the condition where the object distance is 300 mm at the telephoto end in the zoom optical system according to the tenth embodiment.

FIG. 23D is an aberration diagram that shows X-direction lateral aberration of the chief ray that traverses the point where X-direction field angle is zero and Y-direction field angle is extreme in negative direction, or −9.37° under the condition where the object distance is 300 mm at the telephoto end in the zoom optical system according to the tenth embodiment.

FIG. 23E is an aberration diagram that shows Y-direction lateral aberration of a chief ray that traverses a point where X-direction field angle is zero and Y-direction field angle is zero under the condition where the object distance is 300 mm at the telephoto end in the zoom optical system according to the tenth embodiment.

FIG. 23F is an aberration diagram that shows X-direction lateral aberration of the chief ray that traverses the point where X-direction field angle is zero and Y-direction field angle is zero under the condition where the object distance is 300 mm at the telephoto end in the zoom optical system according to the tenth embodiment.

FIG. 23G is an aberration diagram that shows Y-direction lateral aberration of a chief ray that traverses a point where X-direction field angle is zero and Y-direction field angle is extreme in positive direction, or 9.37° under the condition where the object distance is 300 mm at the telephoto end in the zoom optical system according to the tenth embodiment.

FIG. 23H is an aberration diagram that shows X-direction lateral aberration of the chief ray that traverses the point where X-direction field angle is zero and Y-direction field angle is extreme in positive direction, or 9.37° under the condition where the object distance is 300 mm at the telephoto end in the zoom optical system according to the tenth embodiment.

FIG. 23I is an aberration diagram that shows Y-direction lateral aberration of a chief ray that traverses a point where X-direction field angle is extreme in positive direction, or 12.4° and Y-direction field angle is extreme in positive direction, or 9.37° under the condition where the object distance is 300 mm at the telephoto end in the zoom optical system according to the tenth embodiment.

FIG. 23J is an aberration diagram that shows X-direction lateral aberration of the chief ray that traverses the point where X-direction field angle is extreme in positive direction, or 12.4° and Y-direction field angle is extreme in positive direction, or 9.37° under the condition where the object distance is 300 mm at the telephoto end in the zoom optical system according to the tenth embodiment.

FIG. 23K is an aberration diagram that shows Y-direction lateral aberration of a chief ray that traverses a point where X-direction field angle is extreme in positive direction, or 12.4° and Y-direction field angle is zero under the condition where the object distance is 300 mm at the telephoto end in the zoom optical system according to the tenth embodiment.

FIG. 23L is an aberration diagram that shows X-direction lateral aberration of the chief ray that traverses the point where X-direction field angle is extreme in positive direction, or 12.4° and Y-direction field angle is zero under the condition where the object distance is 300 mm at the telephoto end in the zoom optical system according to the tenth embodiment.

FIG. 24 is a table that shows focal lengths of the deformable mirror according to the first through tenth embodiments, under the respective conditions where the object distance is infinite at the wide-angle end, where the object distance is infinite at the intermediate position, where the at the wide-angle end, where the object distance is infinite at the intermediate position, where the object distance is infinite at the telephoto end, where the object distance is 300 mm at the wide-angle end, where the object distance is 300 mm at the intermediate position, and where the object distance is 300 mm at the telephoto end.

Figure 25:
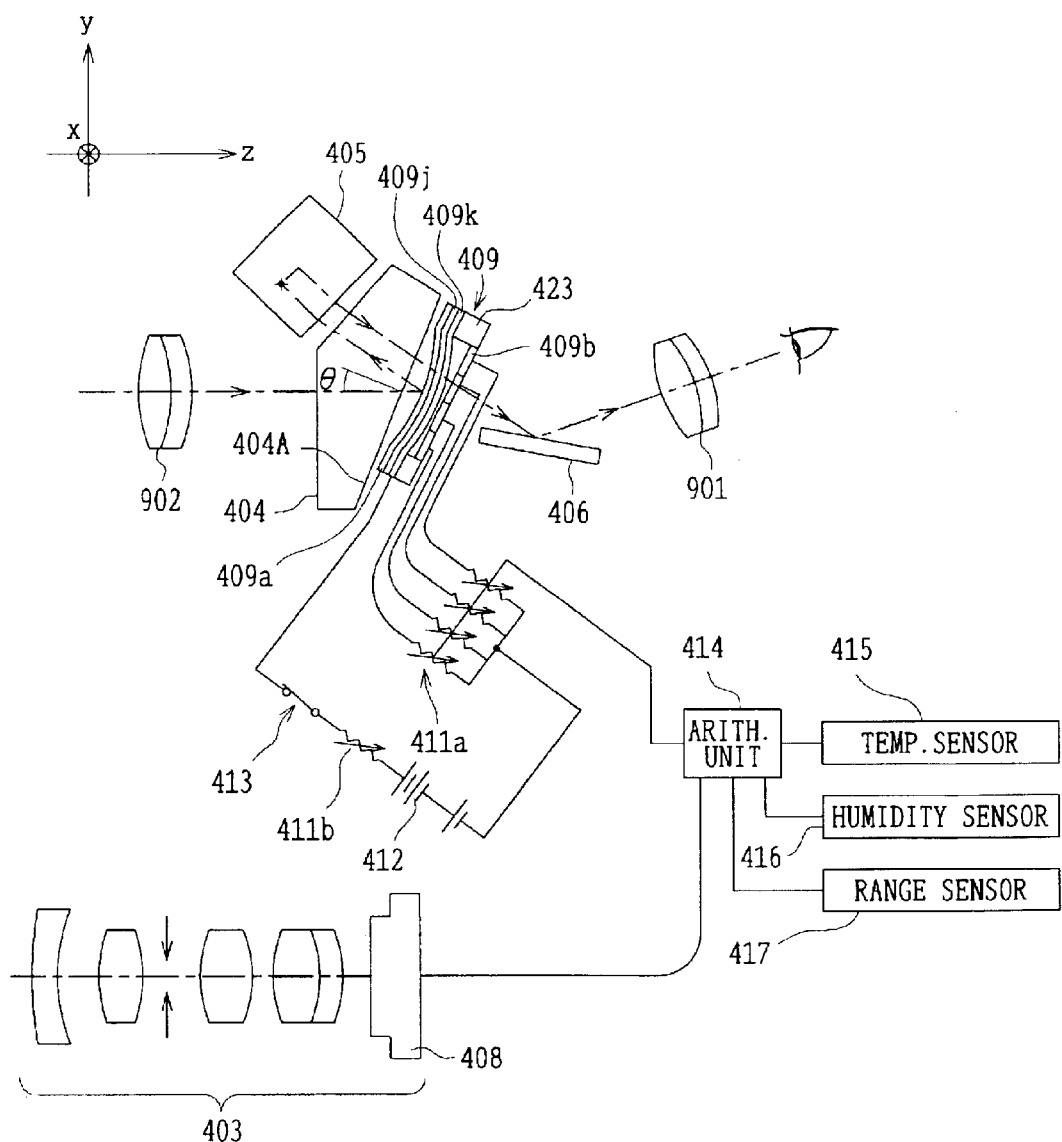

FIG. 25 is a schematic configuration diagram of a digital camera's Keplerian finder using a variable optical-property mirror applicable to the zoom optical system according to the present invention.

Figure 26:
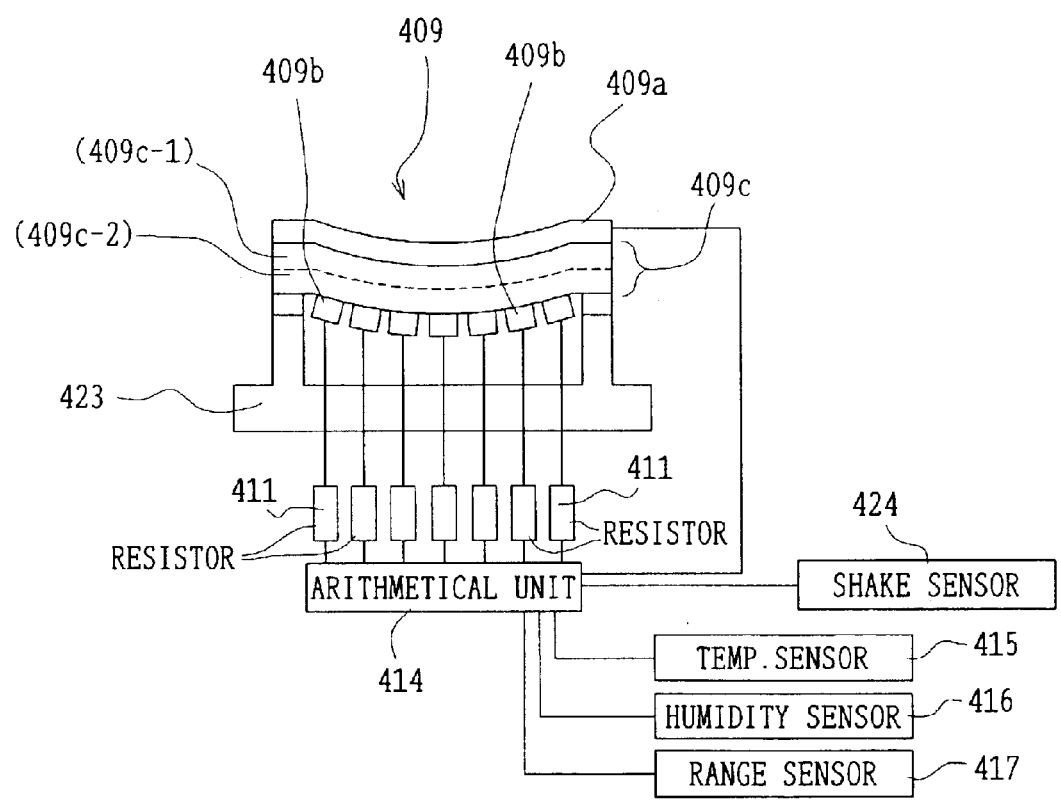

FIG. 26 is a schematic configuration diagram that shows another example of the deformable mirror 409 used in the zoom optical system according to the present invention.

Figure 27:
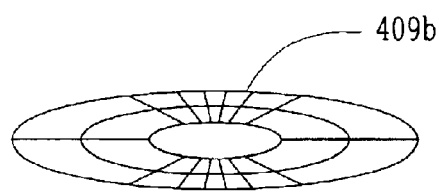

FIG. 27 is an explanatory diagram that shows one aspect of electrodes used in the deformable mirror shown in FIG. 26.

Figure 28:
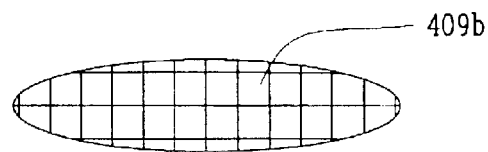

FIG. 28 is an explanatory diagram that shows another aspect of electrodes used in the deformable mirror shown in FIG. 26.

Figure 29:
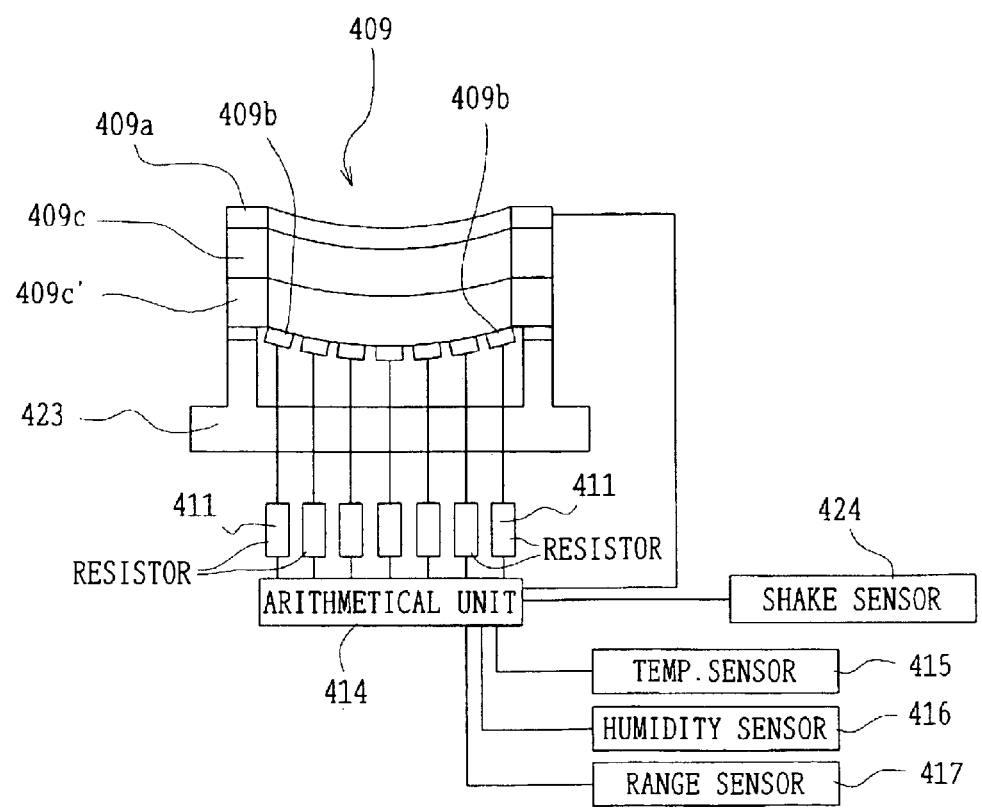

FIG. 29 is a schematic configuration diagram that shows still another example of the deformable mirror 409 used in the zoom optical system according to the present invention.

Figure 30:
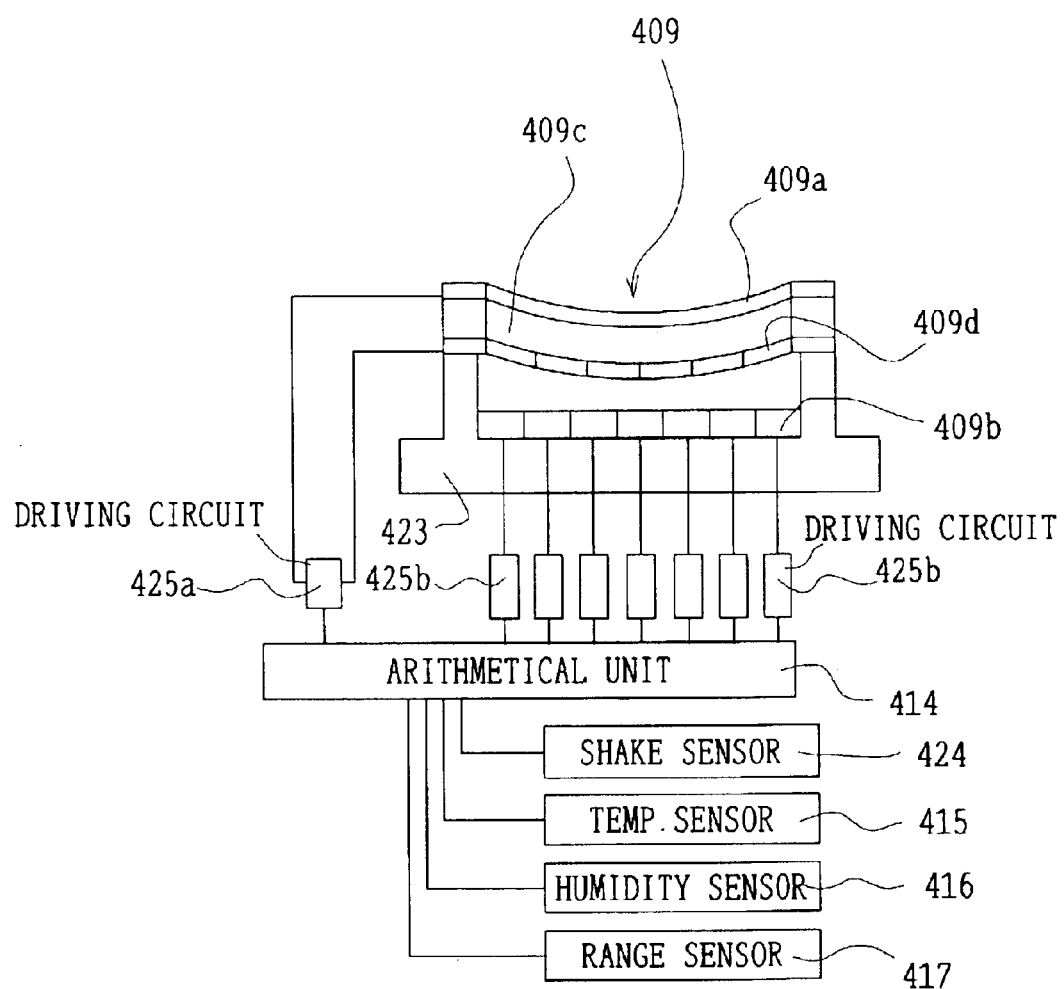

FIG. 30 is a schematic configuration diagram that shows still another example of the deformable mirror 409 used in the zoom optical system according to the present invention.

Figure 31:
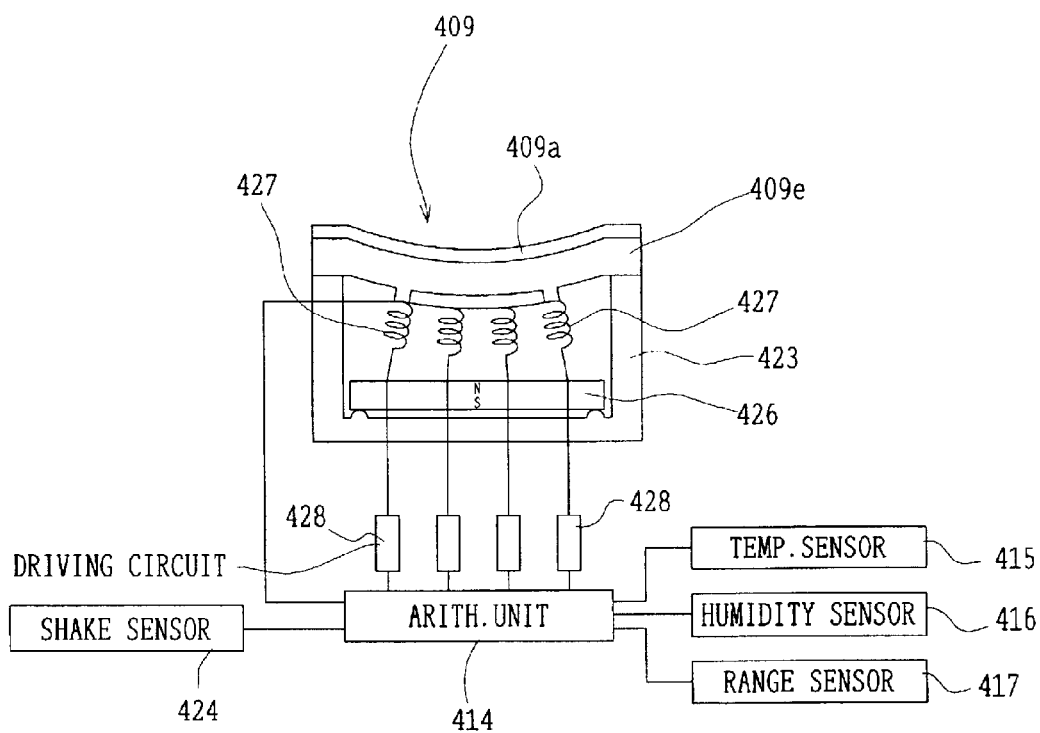

FIG. 31 is a schematic configuration diagram that shows still another example of the deformable mirror 409 used in to the zoom optical system according to the present invention.

Figure 32:
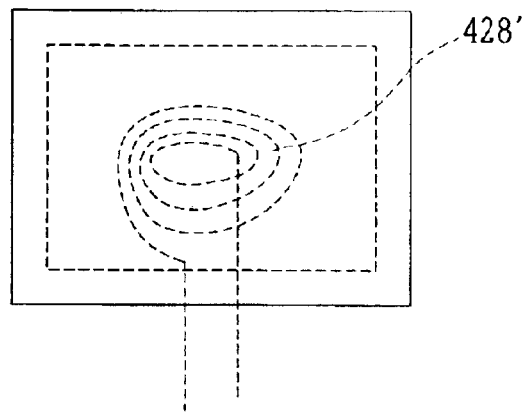

FIG. 32 is an explanatory diagram that shows the winding density of a thin-film coil 427 in the example of FIG. 31.

Figure 33:
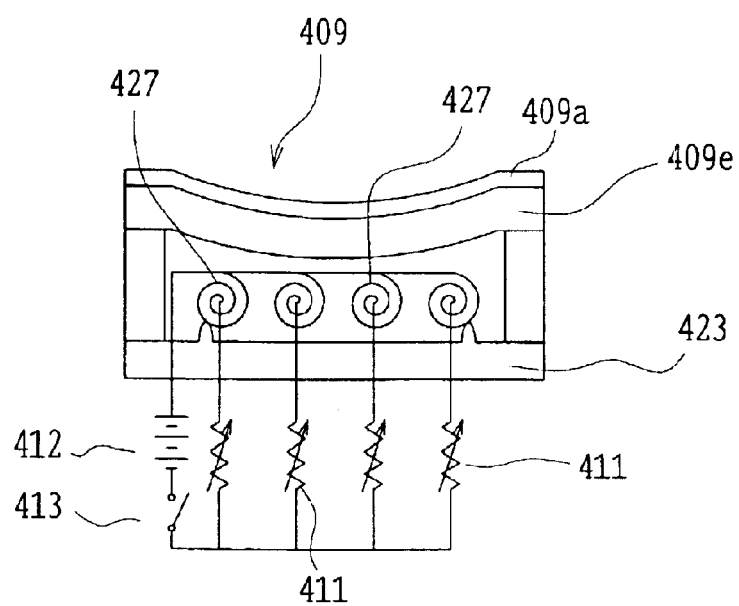

FIG. 33 is a schematic configuration diagram that shows still another example of the deformable mirror 409 used in the zoom optical system according to the present invention.

Figure 34:
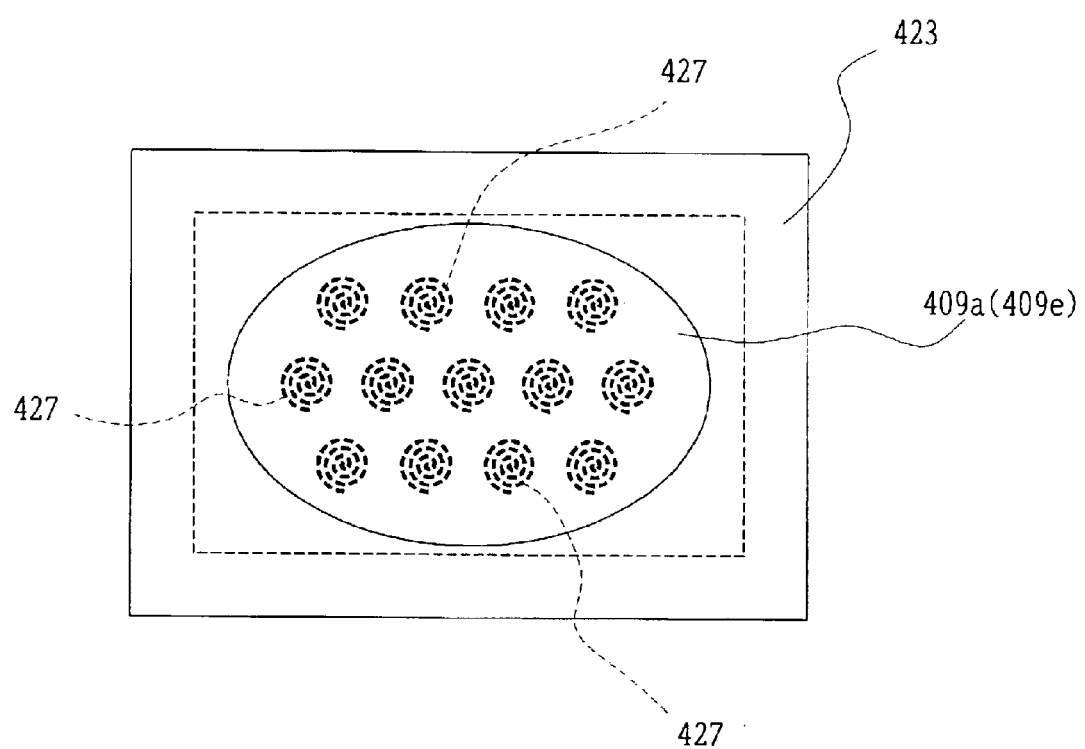

FIG. 34 is an explanatory diagram that shows one arrangement example of the coils 427 in the example of FIG. 33.

Figure 35:
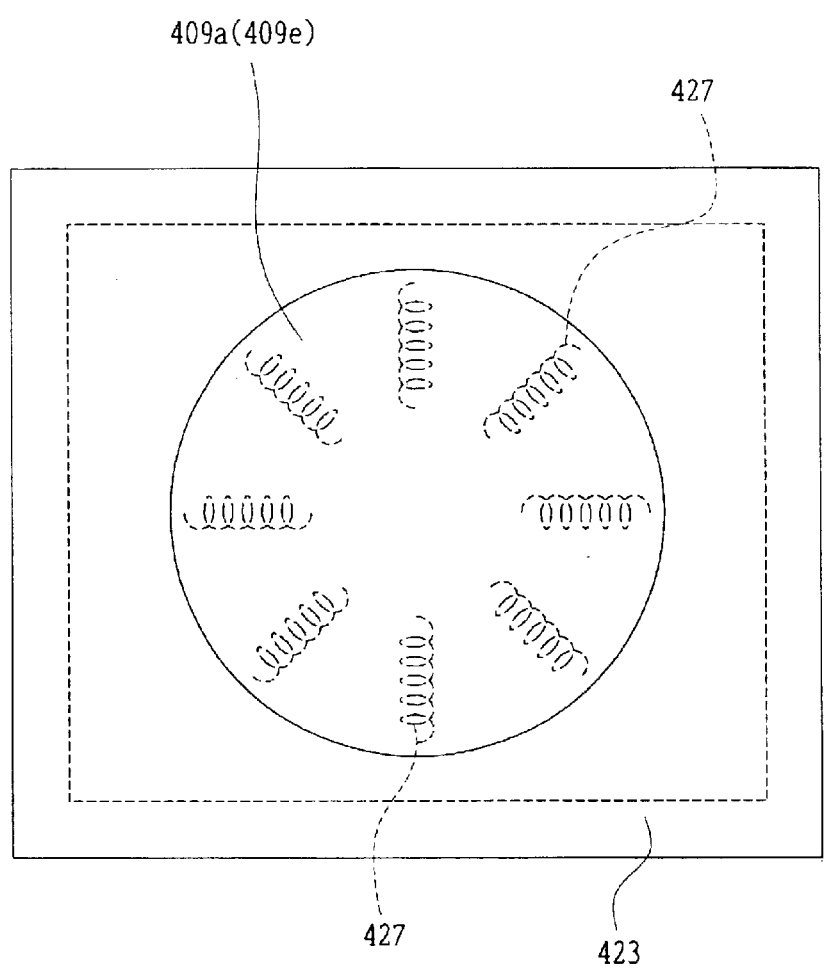

FIG. 35 is an explanatory diagram that shows another arrangement example of the coils 427 in the example of FIG. 33.

Figure 36:
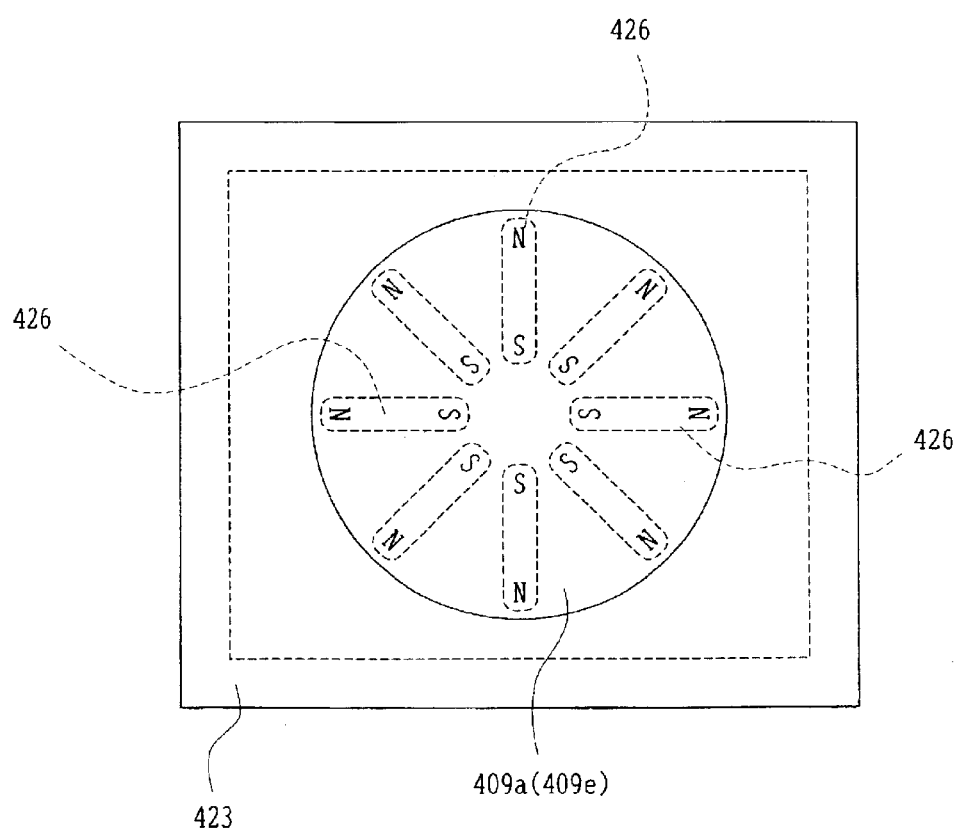

FIG. 36 is an explanatory diagram that shows an arrangement of permanent magnets 426 that is suitable to the case where the coils 427 are arranged as shown in FIG. 35 in the example of FIG. 31.

Figure 37:
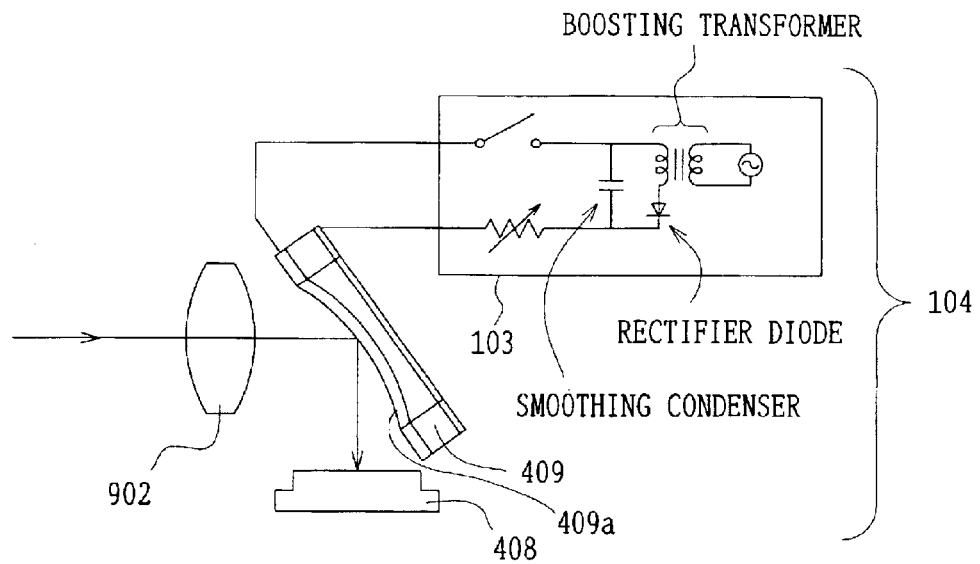

FIG. 37 is a schematic configuration diagram of an imaging system using the deformable mirror 409 applicable to the imaging apparatus using the zoom optical system according to the present invention.

Figure 38:
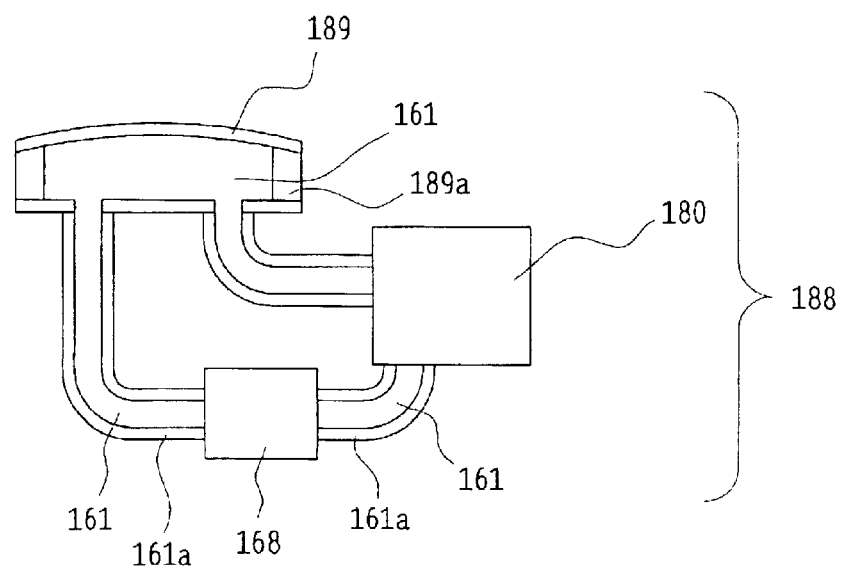

FIG. 38 is a schematic configuration diagram that shows still another example of the deformable mirror used in the zoom optical system according to the present invention.

Figure 39:
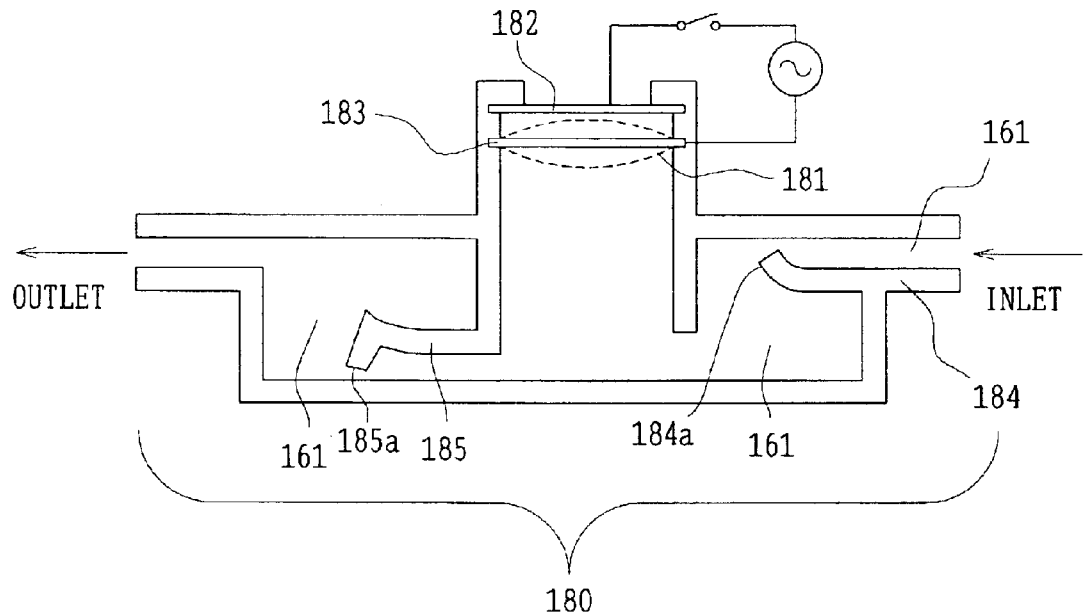

FIG. 39 is a schematic configuration diagram that shows one example of the micropump applicable to the deformable mirror used in the zoom optical system according to the present invention.

Figure 40:
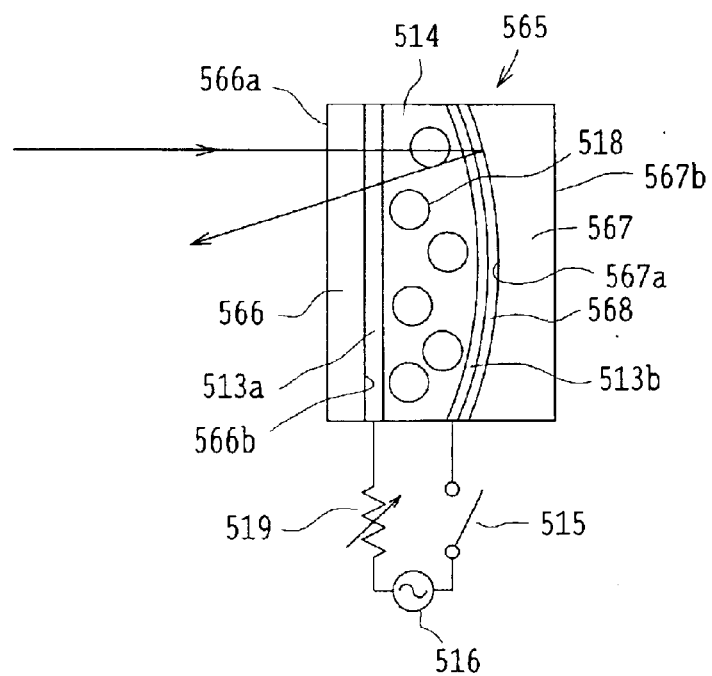

FIG. 40 is a diagram that shows a variable focus mirror, to which the variable focus lens is applied, applicable to the zoom optical system according to the present invention.

Figure 41:
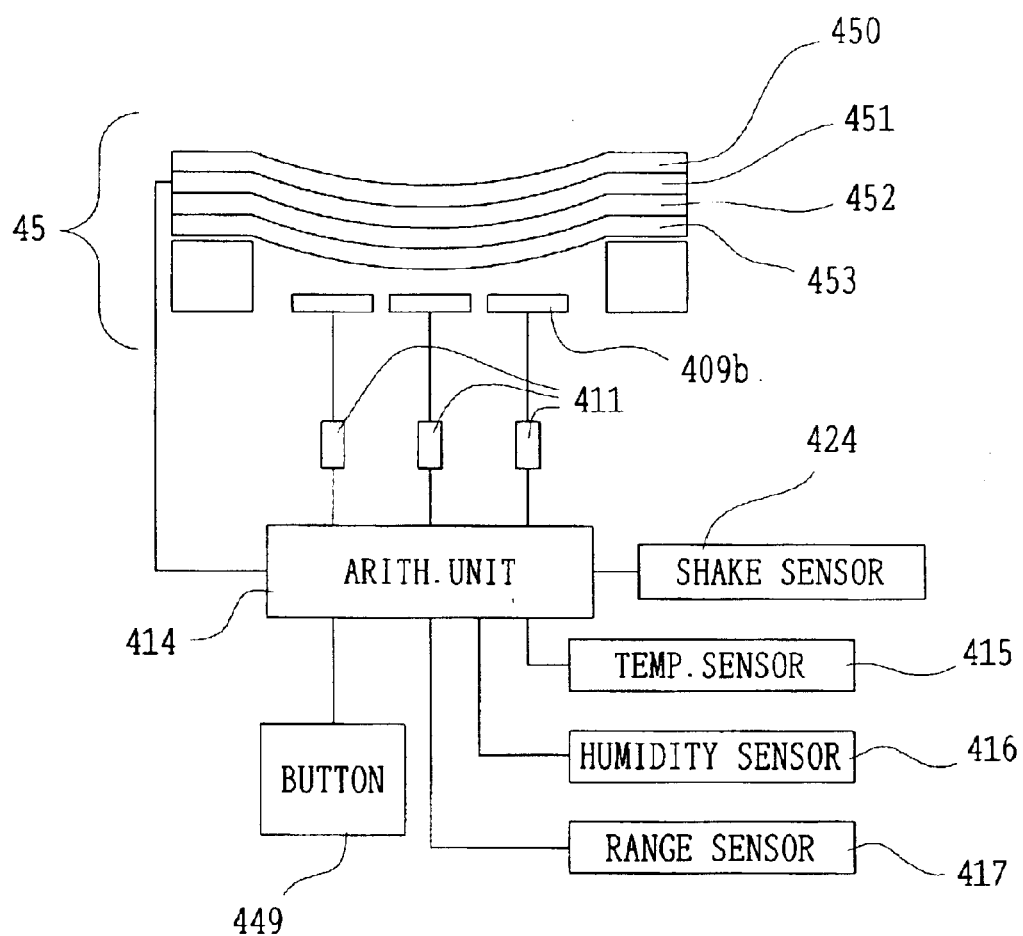

FIG. 41 is a schematic configuration diagram that shows still another example of the deformable mirror used in the zoom optical system according to the present invention.

DETAILED DESCRIPTION OF THE PREFERRED EMBODIMENTS

Preceding the description of the embodiments, the contents of the invention set forth in this specification is summarized below.

According to the present invention, by providing a deformable reflecting surface in a zoom optical system for an electronic imaging apparatus, an imaging apparatus having a compensating function for compensating for defocus or a focusing function can be constructed.

(1) That is, a zoom optical system of the first type according to the present invention has only one optical-element group that is moved in a magnification change and at least one deformable mirror having a compensating function for compensating for a shift of an image surface caused by the magnification change or a focusing function.

If the focusing function and the compensating function are given to the deformable mirror, the mechanical driving system is needed only for a variator lens group. Therefore, it is sufficient to provide only one set of a motor, a driving circuit and so on, with members such as a cam to move other lens groups subordinately being dispensable. Consequently, the lens frame structure becomes very simple, to allow of compact-sizing and cost reduction of the entire imaging apparatus.

(2) Also, a zoom optical system of the second type according to the present invention has at least two lens groups that are movable in a magnification change and have a magnification varying function or a compensating function for compensating for a shift of an image surface caused by the magnification change and a deformable mirror having a focusing function.

If the focusing function is given to the deformable mirror, it is not necessary to provide a lens moving system including a motor, a driving circuit and so on required for focusing, and thus compact and low-cost design can be achieved.

Also, according to the zoom optical system of the first or second type, since the reflecting surface can be instantly deformable, it is possible to realize an imaging apparatus that performs focusing at a very high speed with a low operation noise and a small power consumption.

(3) Also, in the zoom optical system according to the present invention, the deformable mirror in the zoom optical system of the first or second type is preferably provided with a rotationally asymmetric curved surface that has a function for compensating for decentered aberrations.

When the deformable mirror is given a power in accordance with a change of its shape, since its reflecting surface is arranged as decentered, decentered coma is generated. Therefore, for the purpose of obtaining a good optical performance, the deformable mirror desirably has a rotationally asymmetric curved surface having a function for compensating for decentered aberrations.

This configuration makes it possible to obtain a good imaging performance over the full range of magnification change or of focusing.

(4) Furthermore, in the zoom optical system according to the present invention, the deformable mirror preferably satisfies the following conditions (1—1) and (1-2):

$$\phi_{DMW} > \phi_{DMS} \quad (1\text{—}1)$$

$$\phi_{DMT} > \phi_{DMS} \quad (1\text{-}2)$$

where $\phi_{DMW}$ is a power of the deformable mirror at the wide-angle end under the condition where the object distance is infinite, $\phi_{DMS}$ is a power of the deformable mirror at the intermediate position under the condition where the object distance is infinite, and $\phi_{DMT}$ is a power of the deformable mirror at the telephoto end under the condition where the object distance is infinite. Also, each of $\phi_{DMW}$, $\phi_{DMS}$, and $\phi_{DMT}$ is an average value of a power $\phi_{DMiy}$ (i=W, S, T) in a plane of the decentration direction (Y direction) and a power $\phi_{DMix}$ (i=W, S, T) in a plane of the direction perpendicular thereto (X direction) of the deformable mirror, as defined as follows:

$$\phi_{DMW} = (\phi_{DMWx} + \phi_{DMWy})/2$$

$$\phi_{DMS} = (\phi_{DMSx} + \phi_{DMSy})/2$$

$$\phi_{DMT} = (\phi_{DMTx} + \phi_{DMTy})/2$$

Conditions (1—1) and (1-2) are conditions that specify power variation of the deformable mirror, for reducing the amount of deformation of the deformable mirror in a magnification change. It is shown that the power at the wide-angle end is stronger than the power at the intermediate position and that the power at the telephoto end also is stronger than the power at the intermediate position in a deformable mirror that satisfies Conditions (1—1) and (1-2).

Figure 11A:
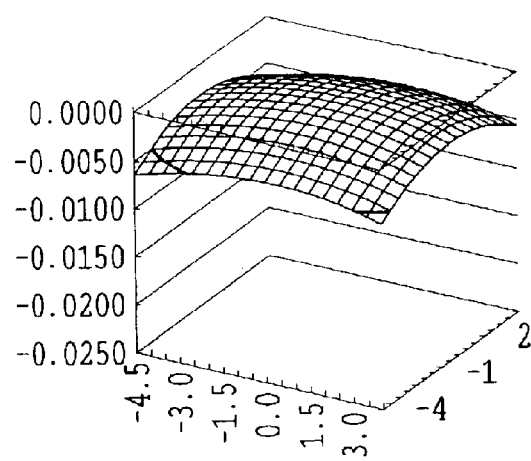
FIG. 11A is an explanatory diagram that shows a deformation state of a deformable mirror used in a zoom optical system according to the present invention at the wide-angle end under the condition where the object distance is infinite.
Figure 11B:
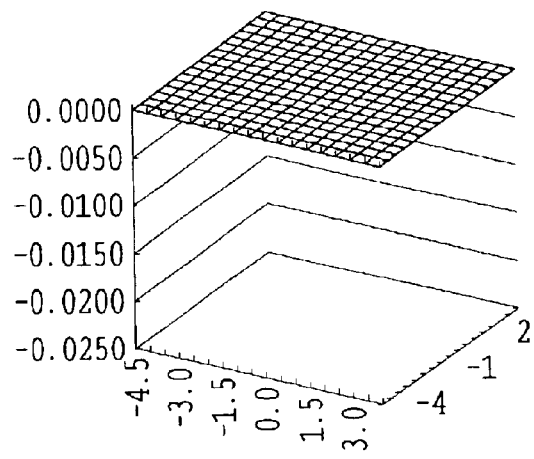
FIG. 11B is an explanatory diagram that shows a deformation state of the deformable mirror used in the zoom optical system according to the present invention at the intermediate position under the condition where the object distance is infinite.
Figure 11C:
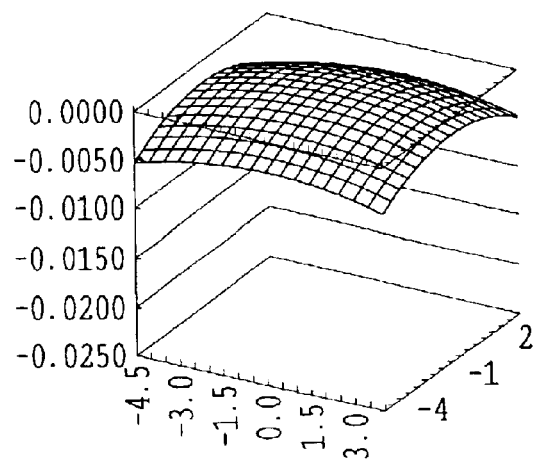
FIG. 11C is an explanatory diagram that shows a deformation state of the deformable mirror used in the zoom optical system according to the present invention at the telephoto end under the condition where the object distance is infinite.

A deformable mirror that satisfies Conditions (1—1) and (1-2) has a minimized power at the intermediate position. Deformation states of the deformable mirror in the zoom optical system according to the present invention under the condition where the object distance is infinite are shown in FIGS. 11A–11C. FIG. 11A shows shapes of the deformable mirror at the wide-angle end, FIG. 11B shows shapes of the deformable mirror at the intermediate position, and FIG. 11C shows shapes of the deformable mirror at the telephoto end. The deformable mirror changes its shape in such a manner that it is a concave surface mirror with a positive power at the wide-angle end, a planner surface at the intermediate position, and again becomes a concave surface mirror with a positive power as the system approaches the telephoto end.

Also, as the power of the deformable mirror increases, decentered aberrations generated at the reflecting surface of the deformable mirror increase. Therefore, if deformation is made in such a manner not to satisfy Conditions (1—1) and (1-2), for example, in such a manner that the power is smallest at the wide-angle end and largest at the telephoto end, the amount of deformation linearly increases, and resultantly, performance of the deformable mirror is extremely degraded in the state where the amount of deformation is maximum.

In contrast, if the deformable mirror incorporated in the zoom optical system according to the present invention is deformed to satisfy Conditions (1—1) and (1-2), the maximum amount of deformation can be designed small, and thus good performance is assured.

In the example of FIG. 11, the deformable mirror is designed to assume a planar shape at the intermediate position under the condition where the object distance is infinite. In practice, however, it is much desirable that the deformable mirror is configured to assume a concave shape over the range from the wide-angle end, via the intermediate position, through the telephoto end upon factors such as manufacture deviation and a margin required in focusing operation being allowing for.

(5) Also, in the zoom optical system according to the present invention, the deformable mirror preferably has both of a state where a power thereof is negative and a state where a power thereof is positive.

For the purpose of making the amount of deformation of the deformable mirror as small as possible, configuration can be made so that the deformable mirror is deformed to have both of a positive power and a negative power, to thereby make the absolute value of the amount of deformation smaller than in the case where the deformable mirror is deformed to have a positive power only, or to be a concave surface mirror. Consequently, it is possible to suppress the amount of generation of decentered aberrations. In this case also, it is much preferable that Conditions (1—1) and (1-2) are satisfied.

(6) Also, in the zoom optical system according to the present invention, the deformable mirror may have a positive power only.

In consideration of manufacturing of the deformable mirror, a deformable mirror that is deformable only into a concave surface mirror can be fabricated with a very simple structure and thus can provide an inexpensive optical system, in comparison with a configuration where the deformable mirror is deformable to have both positive and negative powers.

(7) Also, in the zoom optical system according to the present invention, it is preferable that at least one negative lens is disposed on the object side of the deformable mirror.

In consideration of manufacturing by means of semiconductor process, a deformable mirror with a smaller effective diameter can be produced at a lower cost.

If a negative lens is used on the object side of the deformable mirror, since the height of off-axial rays specifically at the wide-angle end is limited low and accordingly an area for rays incident on the deformable mirror can be made small, the effective diameter of the deformable mirror is allowed to be small. Therefore, cost reduction can be achieved.

(8) Also, in the zoom optical system according to the present invention, it is preferable that at least one refracting surface is formed as a rotationally asymmetric surface.

Whereby, decentered aberrations generated at the deformable mirror can be moderated.

(9) Also, it is preferable that the zoom optical system according to the present invention satisfies the following condition (2-1):

$$0.3 < |\eta_W| \times |\eta_T| < 3.0 \tag{2-1}$$

where $\eta_W$ is a magnification, at the wide-angle end, of a variator group having a magnification varying function, and $\eta_T$ is a magnification, at the wide-angle end, of the variator group having the magnification varying function.

Condition (2-1) multiplies the magnification of the variator group at the wide-angle end by that at the telephoto end, to set a condition for constructing the entire optical system to be small.

If zooming with negative-positive two groups is considered, since the distance IO from the object to the image surface is paraxially given by:

$$IO = f_2(-\eta - (1/\eta) + 2)$$

where the focal length and the magnification of the variator are represented by $f_2$ and $\eta$, respectively, the total length of the zoom optical system can be minimized in the case where $|\eta_W| \times |\eta_T| = 1$. Therefore, a value below the lower limit or above the upper limit of Condition (2-1) renders the entire optical system large and thus is not preferable.

If the zoom lens is configured to satisfy condition (2-1), since a largest power is required for the compensating function of the deformable mirror at the wide-angle end or at the telephoto end while a power at the intermediate position is allowed to be weakest, it is possible to design the configuration so that the amount of deformation of the deformable mirror is small.

(10) Also, it is much preferable that the zoom optical system according to the present invention satisfies the following condition (2—2):

$$0.5 < |\eta_W| \times |\eta_T| < 2.0 \tag{2—2}$$

where $\eta_W$ is a magnification, at the wide-angle end, of a variator group having a magnification varying function, and $\eta_T$ is a magnification, at the telephoto end, of the variator group having the magnification varying function.

Satisfaction of Condition (2—2) in place of Condition (2-1) allows the entire lens to be small, to reduce the amount of deformation of the deformable mirror also.

(11) Also, it is still much preferable that the zoom optical system according to the present invention satisfies the following condition (2-3):

$$0.6 < |\eta_W| \times |\eta_T| < 1.5 \tag{2-3}$$

where $\eta_W$ is a magnification, at the wide-angle end, of a variator group having a magnification varying function, and $\eta_T$ is a magnification, at the telephoto end, of the variator group having the magnification varying function.

Satisfaction of Condition (2-3) in place of Condition (2—2) further enhances the effect set forth above.

(12) Also, in the zoom optical system according to the present invention, the deformable mirror is arranged in the most object-side negative lens group.

In a case where focusing is performed with the deformable mirror, if the configuration is made so that the deformable mirror is inserted in the most object-side negative lens group, fluctuation of aberrations in zooming can be made small. In addition, since the configuration where focusing is performed in the front group allows the amount of deformation at the same object distance to be substantially equal in comparison with the focusing configuration where the entire group is moved outward, it has a merit that defocusing does not occur in magnification change from the wide-angle end through the telephoto end.

(13) Also, it is preferable that the zoom optical system according to the present invention satisfies the following condition (3-1):

$$-8.0 < f_{1a}/f_{WT} < -0.5 \quad (3\text{-}1)$$

where $f_{1a}$ is a focal length of optical elements disposed on the object side of the deformable mirror, and $f_{WT}$ is a value defined by the following equation:

$$f_{WT} = \sqrt{(f_W \times f_T)}$$

where $f_W$ is a focal length of the entire system at the wide-angle end under the condition where the object distance is infinite, and $f_T$ is a focal length of the entire system at the telephoto end under the condition where the object distance is infinite.

If the lower limit of Condition (3-1) is not reached, the power of the negative lens unit becomes very weak, to fail to limit the height of off-axial rays low at the deformable mirror at the wide-angle end. As a result, such a configuration causes bulkiness of the deformable mirror, fails to less generate decentered aberrations at the deformable mirror, and thus is not preferable. On the other hand, if the upper limit of Condition (3-1) is exceeded, the power of the negative lens unit becomes too strong. As a result, although the deformable mirror can be made small, such a configuration makes it difficult to compensate for rotationally symmetric aberrations generated at the negative lens unit, particularly coma and chromatic aberration of magnification, and thus is not preferable.

If Condition (3-1) is satisfied, it is possible to achieve compact and low-cost design and good performance of the deformable mirror.

(14) Also, it is much preferable that the zoom optical system according to the present invention satisfies the following condition (3-2):

$$-6.0 < f_{1a}/f_{WT} < -0.8 \quad (3\text{-}2)$$

where $f_{1a}$ is a focal length of optical elements disposed on the object side of the deformable mirror, and $f_{WT}$ is a value defined by the following equation:

$$f_{WT} = \sqrt{(f_W \times f_T)}$$

where $f_W$ is a focal length of the entire system at the wide-angle end under the condition where the object distance is infinite, and $f_T$ is a focal length of the entire system at the telephoto end under the condition where the object distance is infinite.

Satisfaction of Condition (3-2) in place of Condition (3-1) allows the deformable mirror to be much smaller while assuring good performance.

(15) Also, it is still much preferable that the zoom optical system according to the present invention satisfies the following condition (3—3):

$$-4.0 < f_{1a}/f_{WT} < -1.0 \quad (3\text{—}3)$$

where $f_{1a}$ is a focal length of optical elements disposed on the object side of the deformable mirror, and $f_{WT}$ is a value defined by the following equation:

$$f_{WT} = \sqrt{(f_W \times f_T)}$$

where $f_W$ is a focal length of the entire system at the wide-angle end under the condition where the object distance is infinite, and $f_T$ is a focal length of the entire system at the telephoto end under the condition where the object distance is infinite.

Satisfaction of Condition (3—3) in place of Condition (3-2) further enhances the effect set forth above.

(16) Also, in the zoom optical system according to the present invention, the deformable mirror has a focusing function and is disposed before a variator group.

(17) Also, in the zoom optical system according to the present invention, the optical element group is a variator group having a magnification varying function and the deformable mirror has a focusing function and compensating function, wherein it is preferable that the deformable mirror is disposed before the variator group.

(18) Also, a zoom optical system according to the present invention includes, in order from the object side, a first group with a negative power, a second group with a positive power having a magnification varying function, and a third group with a positive power, wherein it is preferable that a deformable mirror is arranged in the first group with a negative power.

(19) Also, a zoom optical system according to the present invention includes, in order from the object side, a first group with a negative power, a second group with a positive power having a magnification varying function, a third group with a positive power, and a fourth group with a positive power, wherein it is preferable that a deformable mirror is arranged in the first group with a negative power.

Regarding a type of zoom lenses in which a group with a negative power is arranged in front, those configured to move a positive lens as a variator group are in the mainstream. This configuration can realize a wide-angle zoom lens. In addition, arranging the deformable mirror in the negative lens group allows the deformable mirror to be made small, and thus has merits for cost reduction etc.

It is noted that a zoom lens may be configured as a type in which a group with a positive power is arranged in front. In this case, a negative lens group is preferred as a variator group. Such a configuration can achieve a zoom lens with a highly variable magnification.

(20) Also, the zoom optical system according to the present invention has at least two deformable mirrors and at least one of the deformable mirrors is provided with any feature set forth above.

It is impossible to completely prevent decentered aberrations from being generated at the deformable mirror in every zoom condition for every object distance. There, by using another deformable mirror as a compensator element for compensating for the decentered aberrations, decentered aberrations generated at the both can cancel out and, in addition, the amount of deformation can be distributed to these two deformable mirrors, so that good imaging performance can be assured in every photographing condition.

(21) Also, in the zoom optical system according to the present invention, it is preferable that an inner product of vectors that express azimuths of an axial ray incident on the two deformable mirrors has a negative value.

(22) Also, in the zoom optical system according to the present invention, it is preferable that a stop is arranged between the two deformable mirrors.

(23) Also, in the zoom optical system according to the present invention, it is preferable that an angle $\Phi$ of turning of an optical axis caused by the deformable mirror satisfies the following condition:

$$70° \leq \Phi \leq 110°$$

(24) Also, an imaging apparatus according to the present invention using a zoom optical system is preferably provided with any one of the zoom optical system set forth above.

(25) Also, in a zoom optical system and an imaging apparatus provided with a zoom optical system according to the present invention, it is preferable to use a deformable mirror that is driven by an electrostatic force, an electromagnetic force, a piezoelectric effect or fluid.

(26) Also, in a zoom optical system and an imaging apparatus provided with a zoom optical system according to the present invention, an ordinary mirror may be used in place of the deformable mirror.

Also, if the deformable mirror used in the zoom optical system according to the present invention is configured to be deformed into such a shape as to compensate for degradation of optical performance caused by fabrication error of other lenses, the number of defective products can be drastically reduced, to suppress fabrication cost.

Also, in the zoom optical system according to the present invention, a configuration in which the stop surface is independently moved in a zooming operation to be positioned as close to the deformable mirror as possible is preferable because it can reduce the effective diameter for rays of the deformable mirror.

Also, arranging the image pickup element so that its short side is parallel with the direction of decentration of the deformable mirror can reduce the effective diameter for rays of the deformable mirror, as well as is advantageous in view of compensation for aberrations, and thus is desirable. On the other hand, in view of design convenience of digital camera etc, arrangement may be made so that the long side of the image pickup element is parallel with the direction of decentration of the deformable mirror.

In addition, in the zoom optical system according to the present invention, a configuration in which the deformable mirror has a compensator function with pan-focus operation being performed via other lenses facilitates compact and low-cost design and thus is favorable.

A free-formed surface used in the present invention is defined by the following equation (a) where Z axis appearing therein is the axis of the free-formed surface:

$$Z = cr^2 / \left[1 + \sqrt{\{1 - (1+k)c^2 r^2\}}\right] + \sum_{j=2}^{66} C_j X^m Y^n \quad (a)$$

The first term of Equation (a) expresses the spherical surface component. The second term of Equation (a) expresses the free-formed surface component. In the term of the spherical surface component, c is a curvature at the vertex, k is a conic constant, $r = \sqrt{(X^2 + Y^2)}$, and N is an integer equal to or greater than 2.

The term of the free-formed surface component is expanded as shown in the following equation:

$$\sum_{j=2}^{66} C_j X^m Y^n = C_2 X + C_3 Y +$$
$$C_4 X^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 + C_{15} Y^4 +$$
$$C_{16} X^5 + C_{17} X^4 Y + C_{18} X^3 Y^2 + C_{19} X^2 Y^3 +$$
$$C_{20} XY^4 + C_{21} Y^5 +$$
$$C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 +$$
$$C_{29} X^7 + C_{30} X^6 Y + C_{31} X^5 Y^2 + C_{32} X^4 Y^3 +$$
$$C_{33} X^3 Y^4 + C_{34} X^2 Y^5 + C_{35} XY^6 + C_{36} Y^7$$

where $C_j$ (j is integer equal to or greater than 2) is a coefficient.

In general, a free-formed surface as expressed above does not have a plane of symmetry along X-Z plane or along Y-Z plane. However, upon all terms with odd-numbered powers of X being nullified, the free-formed surface can define only one plane of symmetry that is parallel to Y-Z plane.

The free-formed surface, which has a rotationally asymmetric curvature, can be defined in another manner by Zernike polynomial, also. The configuration of the surface is defined by the following equations (b). Z axis appearing in Equations (b) represents the axis of Zernike polynomial. The rotationally asymmetric surface is defined by height in Z axis, in terms of polar coordinate, in reference to X-Y plane, where R is a distance from Z axis in X-Y plane, and A is an azimuth about Z axis expressed by a revolution angle from Z axis:

$$X = R \times \cos(A) \quad (b)$$
$$Y = R \times \sin(A)$$

$$Z = D_2 + D_3 R \cos(A) + D_4 R \sin(A) +$$
$$D_5 R^2 \cos(2A) + D_6 (R^2 - 1) + D_7 R^2 \sin(2A) +$$
$$D_8 R^3 \cos(3A) + D_9 (3R^3 - 2R) \cos(A) +$$
$$D_{10}(3R^3 - 2R)\sin(A) + D_{11} R^3 \sin(3A) +$$
$$D_{12} R^4 \cos(4A) + D_{13}(4R^4 - 3R^2)\cos(2A) +$$
$$D_{14}(6R^4 - 6R^2 + 1) +$$
$$D_{15}(4R^4 - 3R^2)\sin(2A) + D_{16} R^4 \sin(4A) +$$
$$D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) + D_{21}(5R^5 - 4R^3)\sin(3A) +$$
$$D_{22} R^5 \sin(5A) +$$
$$D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A)$$

It is noted that $D_m$ (m is integer equal to or greater than 2) is a coefficient. In order to design the surface as an optical system that is symmetric in X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

The above equations for definition are set forth as an example for expressing a rotationally asymmetric curved surface. The same effect can be obtained by application of any other definition, as a matter of course; the configuration of a curvature can be expressed by another definition as long as it is mathematically equivalent.

According to the present invention, upon all terms with odd-numbered powers of X in Equations (a) being nullified, the free-formed surface can define only one plane of symmetry that is parallel to Y-Z plane.

A surface decentration is given by an amount of decentration (expressed by X, Y, and Z for components in X-axis direction, Y-axis direction, and Z-axis direction, respectively) of the vertex position of the surface from the center of the reference surface of the optical system and a tilt angle (expressed by α, β, and γ in degrees) of the center axis of the surface (in the case of a free-formed surface, Z axis in Equation (a)). In this case, a positive value of α, β or γ means counterclockwise rotation in reference to the positive direction of the corresponding axis.

Regarding the order of decentration operation, after decentration in X, Y and Z directions is operated, the coordinate system is tilted in the order of α, β, and γ, to define the definition coordinate system.

Also, in a case where only the tilt of a reflecting surface is to be expressed, the tilt angles of the center axis of the surface are given as the amount of decentration.

Also, an aspherical surface is defined by the following equation:

$$z=(y^2/r)/[1+\{1-(1+k)\cdot(y/r)^2\}^{1/2}]+ay^4+by^6+cy^8+dy^{10} \quad (c)$$

where z is taken along the optical axis, y is taken along a direction perpendicular to the optical axis, k is a conical coefficient, and a, b, c, and d are aspherical coefficients.

The explanation above regarding the numerical data is commonly applicable to the later presented numerical data of each embodiment according to the present invention.

Here, in reference to the drawings, description is made of the embodiments of the zoom optical system according to the present invention.

A zoom optical system and an optical apparatus according to the present invention use a variable optical-property optical element (for example, deformable mirror, liquid crystal lens, etc). In each of the zoom optical systems according to the first through eighth embodiments, a deformable mirror is used as a variable optical-property optical element. There, the deformable mirror is given both of a compensating function for compensating for defocus caused by a magnification change and a focusing function. Usually, a zoom optical system is required to mechanically drive a lens in compensation and focusing. In contrast, in each of the zoom optical systems according to the first through eighth embodiments, it is not necessary to drive the lens. This is because a zooming operation can be accomplished only with a deformation of the deformable mirror. Consequently, the lens frame structure can be considerably simplified, to give merit for saving power consumption, etc.

Each of the zoom optical systems according to the ninth and tenth embodiments gives the deformable mirror a focusing function only. In each of the zoom optical systems of the ninth and tenth embodiments also, it is possible to save power consumption in comparison with a configuration of a usual zoom optical system in which focusing is performed via a mechanical structure. In addition, since the mechanical structure for focusing is dispensable, the lens frame structure can be simplified.

Lens sectional views of the zoom optical systems according to the first through tenth embodiments are shown in FIG. 1 through FIG. 10, respectively. FIG. 1A is a sectional view that shows a lens configuration at the wide-angle end, FIG. 1B is a sectional view that shows a lens configuration at the intermediate position, and FIG. 1C is a sectional view that shows a lens configuration at the telephoto end. FIG. 2 through FIG. 10 also show lens configurations at the wide-angle end, at the intermediate position, and at the telephoto end, in the manner similar to FIG. 1.

Also, FIG. 12 through FIG. 17 show aberration diagrams of the zoom optical system according to the first embodiment, under the respective conditions where the object distance is infinite at the wide-angle end, where the object distance is infinite at the intermediate position, where the object distance is infinite at the telephoto end, where the object distance is 300 mm at the wide-angle end, where the object distance is 300 mm at the intermediate position, and where the object distance is 300 mm at the telephoto end. FIG. 18 through FIG. 23 show aberration diagrams of the zoom optical system according to the tenth embodiment, under the respective conditions where the object distance is infinite at the wide-angle end, where the object distance is infinite at the intermediate position, where the object distance is infinite at the telephoto end, where the object distance is 300 mm at the wide-angle end, where the object distance is 300 mm at the intermediate position, and where the object distance is 300 mm at the telephoto end. FIG. 12A shows a Y-direction lateral aberration of a chief ray that traverses a point where X-direction field angle is extreme in positive direction, or 24.9° and Y-direction field angle is extreme in negative direction, or −19.3°; FIG. 12B is an aberration diagram that shows X-direction lateral aberration of the chief ray that traverses the point where X-direction field angle is extreme in positive direction, or 24.9° and Y-direction field angle is extreme in negative direction, or −19.3°; FIG. 12C is an aberration diagram that shows Y-direction lateral aberration of a chief ray that traverses a point where X-direction field angle is zero and Y-direction field angle is extreme in negative direction, or −19.3°; FIG. 12D is an aberration diagram that shows X-direction lateral aberration of the chief ray that traverses the point where X-direction field angle is zero and Y-direction field angle is extreme in negative direction, or −19.3°; FIG. 12E is an aberration diagram that shows Y-direction lateral aberration of a chief ray that traverses a point where X-direction field angle is zero and Y-direction field angle is zero; FIG. 12F is an aberration diagram that shows X-direction lateral aberration of the chief ray that traverses the point where X-direction field angle is zero and Y-direction field angle is zero; FIG. 12G is an aberration diagram that shows Y-direction lateral aberration of a chief ray that traverses a point where X-direction field angle is zero and Y-direction field angle is extreme in positive direction, or 19.3°; FIG. 12H is an aberration diagram that shows X-direction lateral aberration of the chief ray that traverses the point where X-direction field angle is zero and Y-direction field angle is extreme in positive direction, or 19.3°; FIG. 12I is an aberration diagram that shows Y-direction lateral aberration of a chief ray that traverses a point where X-direction field angle is extreme in positive direction, or 24.9° and Y-direction field angle is extreme in positive direction, or 19.3°; FIG. 12J is an aberration diagram that shows X-direction lateral aberration of the chief ray that traverses the point where X-direction field angle is extreme in positive direction, or 24.9° and Y-direction field angle is extreme in positive direction, or 19.3°; FIG. 12K is an aberration diagram that shows Y-direction lateral aberration of a chief ray that traverses a point where X-direction field angle is extreme in positive direction, or 24.9° and Y-direction field angle is zero; and FIG. 12L is an aberration diagram that shows X-direction lateral aberration of the chief ray that traverses the point where X-direction field angle is extreme in positive direction, or 24.9° and Y-direction field angle is zero. FIG. 13 through FIG. 23 also show lateral aberrations in the manner similar to FIG. 12.

Also, FIG. 24 is a table that shows focal lengths of the deformable mirror according to the first through tenth embodiments, under the respective conditions where the object distance is infinite at the wide-angle end, where the object distance is infinite at the intermediate position, where the object distance is infinite at the telephoto end, where the object distance is 300 mm at the wide-angle end, where the object distance is 300 mm at the intermediate position, and where the object distance is 300 mm at the telephoto end. In the table, Y signifies a value in a direction of decentration of the deformable mirror, and X signifies a value in a direction perpendicular to Y.

In the lens data of the first through tenth embodiments, "ASP" signifies aspherical surface, "FFS" signifies free-formed surface, "DM" signifies deformable mirror, and "OB" signifies object distance. Regarding refractive index and Abbe's number, values for d-line rays are listed. Regarding a variable space $D_i$ (i=1, 2, 3), values at the wide-angle end, at the intermediate position, and at the telephoto end are listed in this order. In addition, in the zoom optical system according to each embodiment, two plane parallel plates are inserted on the most image side. These are a cover glass of an image pickup element, an infrared cutoff filter, and a lowpass filter.

First Embodiment

Focal length: 5.5 mm~7.7 mm, Open F-number: 2.8~3.4
Dimensions of image pickup surface: 5.3 mm×4.0 mm
Values in Conditions:

$\phi_{DMW}=0.00080$, $\phi_{DMS}=0$, $\phi_{DMT}=0.00059$
$f_W=5.48$, $f_T=7.74$, $|\eta_W|\times|\eta_T|=1.00$, $f_{1a}/f_{WT}=-2.33$

| Surface Number | Radius of Curvature | Surface Separation | Decentration | Refractive Index | Abbe's Number |
|---|---|---|---|---|---|
| object surface | ∞ | ∞ | | | |
| 1 | ∞ | 0.00 | | | |
| 2 | 30.47 | 1.20 | | 1.7433 | 49.3 |
| 3 | ASP [1] | 8.00 | | | |
| 4 | FFS [1] (DM) | 6.00 | decentration[1] | | |
| 5 | 11.43 | 1.50 | | 1.7433 | 49.3 |
| 6 | 7.24 | 0.45 | | | |
| 7 | 6.66 | 1.41 | | 1.8467 | 23.8 |
| 8 | 7.94 | D1 = 4.51~2.56~1.00 | | | |
| 9 | stop surface | 1.00 | | | |
| 10 | ASP [2] | 1.50 | | 1.5891 | 61.1 |
| 11 | −14.44 | 0.15 | | | |
| 12 | 5.11 | 1.81 | | 1.4970 | 81.5 |
| 13 | 100.34 | 1.05 | | | |
| 14 | 21.76 | 1.00 | | 1.8467 | 23.8 |
| 15 | 3.87 | D2 = 4.01~5.96~7.52 | | | |
| 16 | 45.00 | 2.53 | | 1.5891 | 61.1 |
| 17 | ASP [3] | 1.21 | | | |
| 18 | ∞ | 1.44 | | 1.5477 | 62.8 |
| 19 | ∞ | 0.80 | | | |
| 20 | ∞ | 0.60 | | 1.5163 | 64.1 |
| 21 | ∞ | 0.50 | | | |
| image surface | ∞ | | | | |

ASP [1]
Radius of curvature 8.10 k 0.0000
a −2.1273×10$^{-4}$ b 1.9957×10$^{-6}$ c −4.6450×10$^{-8}$ d −2.1118×10$^{-10}$ ASP [2]
Radius of curvature 12.64 k 0.0000
a −4.1455×10$^{-4}$ b 4.3395×10$^{-6}$ c −1.4426×10$^{-6}$ d 9.2669×10$^{-8}$ ASP [3]
Radius of curvature −5.91 k 0.0000
a 2.5869×10$^{-3}$ b −5.1567×10$^{-5}$ c 1.6963×10$^{-6}$ d −1.7320×10$^{-8}$

| | W OB = ∞ | S OB = ∞ | T OB = ∞ | W OB = 300 | S OB = 300 | T OB = 300 |
|---|---|---|---|---|---|---|
| | | FFS [1] | | | | |
| $C_4$ | −0.2620 × 10$^{-3}$ | 0.00000 | −0.1983 × 10$^{-3}$ | −0.7545 × 10$^{-3}$ | −0.4217 × 10$^{-3}$ | 0.6827 × 10$^{-3}$ |
| $C_6$ | −0.1499 × 10$^{-3}$ | 0.00000 | −0.1084 × 10$^{-3}$ | −0.4058 × 10$^{-3}$ | −0.2221 × 10$^{-3}$ | −0.3547 × 10$^{-3}$ |
| $C_8$ | 0.2868 × 10$^{-5}$ | 0.00000 | 0.1210 × 10$^{-5}$ | −0.1345 × 10$^{-5}$ | 0.7816 × 10$^{-6}$ | 0.2216 × 10$^{-6}$ |
| $C_{10}$ | −0.4234 × 10$^{-6}$ | 0.00000 | −0.6980 × 10$^{-6}$ | −0.3000 × 10$^{-5}$ | −0.1264 × 10$^{-5}$ | −0.2467 × 10$^{-5}$ |
| $C_{11}$ | 0.5954 × 10$^{-6}$ | 0.00000 | −0.5001 × 10$^{-7}$ | −0.6658 × 10$^{-6}$ | −0.1622 × 10$^{-5}$ | −0.2540 × 10$^{-5}$ |
| $C_{13}$ | 0.2226 × 10$^{-5}$ | 0.00000 | 0.1603 × 10$^{-7}$ | 0.9280 × 10$^{-6}$ | −0.3729 × 10$^{-6}$ | −0.7070 × 10$^{-6}$ |
| $C_{15}$ | 0.1669 × 10$^{-6}$ | 0.00000 | 0.1154 × 10$^{-6}$ | −0.2434 × 10$^{-6}$ | −0.4477 × 10$^{-6}$ | −0.6478 × 10$^{-6}$ |

| Decentration [1] | | | | | |
|---|---|---|---|---|---|
| X | 0.00 | Y | 0.00 | Z | 0.00 |
| α | 45.00 | β | 0.00 | γ | 0.00 |

Values in Conditions:

$\phi_{DMW}=0.00082$, $\phi_{DMS}=0$, $\phi_{DMT}=0.00033$ $f_W=6.15$, $f_T=8.69$, $|\eta_W|\times|\eta_T|=0.96$, $f_{1a}/f_{WT}=-1.86$

Second Embodiment

Focal length: 6.2 mm~8.7 mm, Open F-number: 2.8~3.4
Dimensions of image pickup surface: 5.3 mm×4.0 mm

| Surface Number | Radius of Curvature | Surface Separation | Decentration | Refractive Index | Abbe's Number |
|---|---|---|---|---|---|
| object surface | ∞ | ∞ | | | |
| 1 | ∞ | 0.00 | | | |
| 2 | ASP [1] | 1.20 | | 1.7433 | 49.3 |
| 3 | ASP [2] | 8.63 | | | |
| 4 | FFS [1](DM) | 5.00 | decentration [1] | | |
| 5 | 8.67 | 1.49 | | 1.6584 | 50.9 |
| 6 | 6.29 | 0.61 | | | |
| 7 | 6.92 | 2.61 | | 1.8010 | 35.0 |
| 8 | 8.21 | D1 = 4.88~2.81~1.00 | | | |
| 9 | stop surface | 1.00 | | | |
| 10 | ASP [3] | 1.50 | | 1.5891 | 61.1 |
| 11 | −16.62 | 0.21 | | | |
| 12 | 5.26 | 2.34 | | 1.4970 | 81.5 |
| 13 | −161.25 | 1.10 | | | |
| 14 | −669.86 | 1.01 | | 1.8052 | 25.4 |
| 15 | 3.94 | D2 = 3.40~5.46~7.28 | | | |
| 16 | 17.47 | 2.94 | | 1.5891 | 61.1 |
| 17 | ASP [4] | 1.34 | | | |
| 18 | ∞ | 1.44 | | 1.5477 | 62.8 |
| 19 | ∞ | 0.80 | | | |
| 20 | ∞ | 0.60 | | 1.5163 | 64.1 |
| 21 | ∞ | 0.50 | | | |
| image surface | ∞ | | | | |

ASP [1]
Radius of curvature −58.50 k 0.0000
a −6.6247×10$^{-6}$ b 9.8071×10$^{-7}$
ASP [2]
Radius of curvature 12.32 k 0.0000
a −1.1146×10$^{-4}$ b 3.8680×10$^{-6}$ c −6.2088×10$^{-8}$ d 1.1297× 10$^{-9}$
ASP [3]
Radius of curvature 12.82 k 0.0000
a −3.1136×10$^{-4}$ b 7.1143×10$^{-6}$ c −1.3002×10$^{-6}$ d 6.8836× 10$^{-8}$
ASP [4]
Radius of curvature −8.27 k 0.0000
a 1.2234×10$^{-3}$ b −4.9830×10$^{-5}$ c 2.5374×10$^{-6}$ d −6.1373× 10$^{-8}$

| | FFS [1] | | | | | |
|---|---|---|---|---|---|---|
| | W OB = ∞ | S OB = ∞ | T OB = ∞ | W OB = 300 | S OB = 300 | T OB = 300 |
| $C_4$ | −0.2855 × 10$^{-3}$ | 0.00000 | −0.1077 × 10$^{-3}$ | −0.6917 × 10$^{-3}$ | −0.3795 × 10$^{-3}$ | −0.5224 × 10$^{-3}$ |
| $C_6$ | −0.1484 × 10$^{-3}$ | 0.00000 | −0.5770 × 10$^{-4}$ | −0.3592 × 10$^{-3}$ | −0.1942 × 10$^{-3}$ | −0.2658 × 10$^{-3}$ |
| $C_8$ | −0.4089 × 10$^{-5}$ | 0.00000 | −0.1369 × 10$^{-5}$ | −0.8687 × 10$^{-5}$ | −0.4097 × 10$^{-5}$ | −0.6243 × 10$^{-5}$ |
| $C_{10}$ | −0.2060 × 10$^{-5}$ | 0.00000 | −0.8674 × 10$^{-6}$ | −0.5115 × 10$^{-5}$ | −0.2677 × 10$^{-5}$ | −0.3812 × 10$^{-5}$ |
| $C_{11}$ | 0.3563 × 10$^{-5}$ | 0.00000 | −0.1528 × 10$^{-5}$ | 0.4427 × 10$^{-5}$ | 0.9609 × 10$^{-6}$ | −0.5822 × 10$^{-6}$ |
| $C_{13}$ | 0.4478 × 10$^{-5}$ | 0.00000 | −0.1256 × 10$^{-5}$ | 0.5425 × 10$^{-5}$ | 0.1665 × 10$^{-5}$ | 0.2475 × 10$^{-6}$ |
| $C_{15}$ | 0.8594 × 10$^{-6}$ | 0.00000 | −0.3041 × 10$^{-6}$ | 0.1000 × 10$^{-5}$ | −0.1291 × 10$^{-6}$ | 0.2954 × 10$^{-6}$ |

| Decentration [1] | | | | | |
|---|---|---|---|---|---|
| X | 0.00 | Y | 0.00 | Z | 0.00 |
| α | 45.00 | β | 0.00 | γ | 0.00 |

Third Embodiment
Focal length: 6.3 mm~14.3 mm, Open F-number: 2.8~4.9
Dimensions of image pickup surface: 5.3 mm×4.0 mm Values in Conditions:

$\phi_{DMW}=0.00221$, $\phi_{DMS}=-0.00007$, $\phi_{DMT}=0.00277$ $f_W=6.28$, $f_T=14.24$, $|\eta_W|\times|\eta_T|=1.39$, $f_{1a}/f_{WT}=-3.03$

| Surface Number | Radius of Curvature | Surface Separation | Decentration | Refractive Index | Abbe's Number |
|---|---|---|---|---|---|
| object surface | ∞ | ∞ | | | |
| 1 | ∞ | 0.00 | | | |
| 2 | ASP [1] | 1.20 | decentration [1] | 1.7017 | 43.4 |
| 3 | ASP [2] | 10.99 | decentration [1] | | |
| 4 | FFS [1] (DM) | 6.00 | decentration [2] | | |
| 6 | 35.09 | 1.50 | decentration [3] | 1.7775 | 50.1 |
| 7 | 17.63 | 0.48 | decentration [3] | | |
| 8 | 11.06 | 4.40 | decentration [3] | 1.8467 | 23.8 |
| 9 | 11.62 | D1 = 12.56~7.28~1.00 | decentration [3] | | |
| 10 | stop surface | 1.00 | decentration [4] | | |
| 11 | ASP [3] | 1.50 | | 1.7433 | 49.3 |
| 12 | −32.15 | 1.63 | | | |
| 13 | 6.17 | 3.19 | | 1.4970 | 81.5 |
| 14 | 43.62 | 0.45 | | | |
| 15 | 23.97 | 1.43 | | 1.8467 | 23.8 |
| 16 | 4.56 | D2 = 2.03~7.31~13.59 | | | |
| 17 | ASP [4] | 3.38 | | 1.5891 | 61.1 |
| 18 | ASP [5] | 2.09 | | | |
| 19 | ∞ | 1.44 | | 1.5477 | 62.8 |
| 20 | ∞ | 0.80 | | | |
| 21 | ∞ | 0.60 | | 1.5163 | 64.1 |
| 22 | ∞ | 0.50 | | | |
| image surface | ∞ | | | | |

ASP [1]
Radius of curvature −61.10 k 0.0000
a $2.3291\times10^{-8}$ b $3.1336\times10^{-9}$ c $8.2212\times10^{-11}$ d $7.3824\times10^{-13}$ ASP [2]
Radius of curvature 30.19 k 0.0000
a $-3.6882\times10^{-5}$ b $4.9180\times10^{-7}$ c $-4.8873\times10^{-9}$ d $2.5287\times10^{-11}$ ASP [3]
Radius of curvature 17.23 k 0.0000
a $-1.1355\times10^{-4}$ b $2.8904\times10^{-6}$ c $-4.2581\times10^{-7}$ d $1.8353\times10^{-8}$ ASP [4]
Radius of curvature 27.79 k 0.0000
a $4.4055\times10^{-6}$ b $-2.5690\times10^{-5}$ c $9.2414\times10^{-7}$ d $-3.7156\times10^{-8}$ ASP [5]
Radius of curvature −6.99 k 0.0000
a $1.2820\times10^{-3}$ b $-4.1317\times10^{-5}$ c $8.7857\times10^{-7}$ d $-1.7395\times10^{-8}$

| FFS [1] | | | | | |
|---|---|---|---|---|---|
| W OB = ∞ | S OB = ∞ | T OB = ∞ | W OB = 300 | S OB = 300 | T OB = 300 |

$C_4$ $-0.7887\times10^{-3}$  $-0.8674\times10^{-18}$  $-0.9872\times10^{-3}$  $-0.1077\times10^{-2}$  $-0.2094\times10^{-3}$  $-0.1278\times10^{-2}$ -continued

FFS [1]

| W OB = ∞ | S OB = ∞ | T OB = ∞ | W OB = 300 | S OB = 300 | T OB = 300 |
|---|---|---|---|---|---|
| $C_6$ | | | | | |
| $-0.4141 \times 10^{-3}$ | $-0.5421 \times 10^{-18}$ | $-0.5039 \times 10^{-3}$ | $-0.5685 \times 10^{-3}$ | $-0.1046 \times 10^{-3}$ | $-0.6487 \times 10^{-3}$ |
| $C_8$ | | | | | |
| $-0.1014 \times 10^{-4}$ | $0.1814 \times 10^{-5}$ | $0.6911 \times 10^{-5}$ | $0.1518 \times 10^{-5}$ | $0.6295 \times 10^{-5}$ | $0.3752 \times 10^{-5}$ |
| $C_{10}$ | | | | | |
| $0.4536 \times 10^{-5}$ | $0.1772 \times 10^{-5}$ | $0.2476 \times 10^{-6}$ | $0.1183 \times 10^{-5}$ | $0.1966 \times 10^{-5}$ | $-0.7993 \times 10^{-6}$ |
| $C_{11}$ | | | | | |
| $0.8289 \times 10^{-5}$ | $0.9446 \times 10^{-5}$ | $0.9715 \times 10^{-5}$ | $0.8847 \times 10^{-5}$ | $0.8051 \times 10^{-5}$ | $0.9628 \times 10^{-5}$ |
| $C_{13}$ | | | | | |
| $0.7933 \times 10^{-5}$ | $0.7783 \times 10^{-5}$ | $0.9975 \times 10^{-5}$ | $0.8228 \times 10^{-5}$ | $0.7237 \times 10^{-5}$ | $0.1024 \times 10^{-4}$ |
| $C_{15}$ | | | | | |
| $0.2279 \times 10^{-5}$ | $0.2452 \times 10^{-5}$ | $0.2712 \times 10^{-5}$ | $0.2289 \times 10^{-5}$ | $0.1930 \times 10^{-5}$ | $0.2641 \times 10^{-5}$ |
| $C_{17}$ | | | | | |
| $-0.2938 \times 10^{-6}$ | $0.1623 \times 10^{-6}$ | $-0.5628 \times 10^{-6}$ | $-0.4227 \times 10^{-6}$ | $-0.2783 \times 10^{-6}$ | $-0.4702 \times 10^{-6}$ |
| $C_{19}$ | | | | | |
| $0.7544 \times 10^{-7}$ | $-0.2348 \times 10^{-6}$ | $0.4162 \times 10^{-6}$ | $0.2028 \times 10^{-7}$ | $0.2833 \times 10^{-7}$ | $0.3645 \times 10^{-6}$ |
| $C_{21}$ | | | | | |
| $-0.7082 \times 10^{-7}$ | $0.4064 \times 10^{-7}$ | $0.4552 \times 10^{-7}$ | $-0.2609 \times 10^{-7}$ | $-0.1019 \times 10^{-7}$ | $-0.5763 \times 10^{-8}$ |

| Decentration [1] | | | | | |
|---|---|---|---|---|---|
| X | 0.00 | Y | −0.14 | Z | 0.00 |
| α | 0.00 | β | 0.00 | γ | 0.00 |
| Decentration [2] | | | | | |
| X | 0.00 | Y | 0.00 | Z | 0.00 |
| α | 45.00 | β | 0.00 | γ | 0.00 |
| Decentration [3] | | | | | |
| X | 0.00 | Y | −0.29 | Z | 0.00 |
| α | 0.00 | β | 0.00 | γ | 0.00 |
| Decentration [4] | | | | | |
| X | 0.00 | Y | −0.20 | Z | 0.00 |
| α | 0.00 | β | 0.00 | γ | 0.00 |

Each of the zoom optical systems according to the first to third embodiments includes, in order from the object side, a first group G1 having a negative power, a second group G2 having a positive power, and a third group G3 having a positive power. A magnification change is made by moving the second group G2. That is, the second group is given a magnification varying function. Defocused condition caused by the magnification change is compensated for by the reflecting surface of the deformable mirror DM disposed in the first group G1. At the same time, configuration is made so that focusing is performed by the deformable mirror DM disposed in the first group G1.

Also, the deformable mirror is designed to be shaped as follows under the condition where the object distance is infinite; first, at the intermediate position in the magnification varying range, it takes a planar shape, then, as the magnification is varied from the intermediate position to the wide-angle end, and from the intermediate position to the telephoto end, it is deformed into a concave mirror having a positive power. Such a manner of deformation can minimize the amount of deformation.

Also, as the deformable mirror is deformed, a decentered coma is generated, though slightly. The decentered coma increases as the amount of deformation of the deformable mirror increases. In particular, where the object distance is proximate, the amount of deformation of the deformable mirror is maximized, in comparison with the case where the object distance is infinite. Therefore, in the zoom optical system according to the third embodiment, configuration is made so that the balance of performance is kept between the infinite object distance and the proximate object distance, to keep a good performance over the entire range. To be specific, arrangement is made so that the most object-side negative lens in the first group G1, the image-side lenses in the first group G1, and the lens system from the second group G2 through the image surface are decentered from each another. Whereby, generation of decentered coma in focusing can be averaged, and accordingly good performance can be assured over the entire range.

Fourth Embodiment

Focal length: 4.8 mm~6.7 mm, Open F-number: 2.8~3.5
Dimensions of image pickup surface: 4.0 mm×3.0 mm
Values in Conditions:

$\phi_{DMW}=0.00058, \phi_{DMS}=0, \phi_{DMT}=0.00054$ $f_W=4.78, f_T=6.65, |\eta_W|=|\eta_T|=0.99, f_{1a}/f_{WT}=-2.11$

| Surface Number | Radius of Curvature | Surface Separation | Decentration | Refractive Index | Abbe's Number |
|---|---|---|---|---|---|
| object surface | ∞ | ∞ | | | |
| 1 | ∞ | 0.00 | | | |
| 2 | −28.79 | 1.20 | | 1.6864 | 31.4 |
| 3 | ASP [1] | 8.00 | | | |
| 4 | FFS [1] (DM) | 5.00 | decentration [1] | | |
| 5 | 6.59 | 0.80 | | 1.7260 | 51.8 |
| 6 | 5.06 | 0.58 | | | |
| 7 | 5.50 | 2.00 | | 1.8500 | 24.0 |
| 8 | 5.99 | D1 = 4.04~2.46~1.00 | | | |
| 9 | stop surface | 1.00 | | | |
| 10 | ASP [2] | 1.50 | | 1.5891 | 61.1 |
| 11 | −16.32 | 0.96 | | | |
| 12 | 5.93 | 2.11 | | 1.4970 | 81.5 |
| 13 | −8.29 | 0.83 | | | |
| 14 | −16.16 | 1.00 | | 1.8467 | 23.8 |
| 15 | 3.69 | D2 = 1.83~3.42~4.87 | | | |
| 16 | 20.45 | 2.00 | | 1.5891 | 61.1 |
| 17 | ASP [3] | 1.00 | | | |
| 18 | ∞ | 1.44 | | 1.5477 | 62.8 |
| 19 | ∞ | 0.80 | | | |
| 20 | ∞ | 0.60 | | 1.5163 | 64.1 |
| 21 | ∞ | 0.50 | | | |
| image surface | ∞ | | | | |

ASP [1]
Radius of curvature 11.58  k 0.0000
a 2.3084×10$^{-4}$  b 4.7641×10$^{-6}$  c −1.6028×10$^{-7}$  d 1.7944×10$^{-9}$ ASP [2]
Radius of curvature 8.86  k 0.0000
a −1.0073×10$^{-3}$  b −2.7489×10$^{-6}$  c −4.5129×10$^{-6}$  d 1.8575×10$^{-7}$ ASP [3]
Radius of curvature −5.89  k 0.0000
a 2.2698×10$^{-3}$  b −6.3017×10$^{-5}$  c 2.4640×10$^{-6}$  d −6.2419×10$^{-8}$

FFS [1]

| | W OB = ∞ | S OB = ∞ | T OB = ∞ | W OB = 300 | S OB = 300 | T OB = 300 |
|---|---|---|---|---|---|---|
| $C_4$  | −0.2092 × 10$^{-3}$ | 0.00000 | −0.1768 × 10$^{-3}$ | −0.5943 × 10$^{-3}$ | −0.3505 × 10$^{-3}$ | −0.5650 × 10$^{-3}$ |
| $C_6$  | −0.1097 × 10$^{-3}$ | 0.00000 | −0.9391 × 10$^{-4}$ | −0.3104 × 10$^{-3}$ | −0.1794 × 10$^{-3}$ | −0.2866 × 10$^{-3}$ |
| $C_8$  | −0.4827 × 10$^{-5}$ | 0.00000 | −0.8284 × 10$^{-6}$ | −0.8890 × 10$^{-5}$ | −0.2404 × 10$^{-5}$ | −0.4196 × 10$^{-5}$ |
| $C_{10}$ | −0.1774 × 10$^{-5}$ | 0.00000 | −0.1194 × 10$^{-5}$ | −0.4818 × 10$^{-5}$ | −0.2137 × 10$^{-5}$ | −0.4316 × 10$^{-5}$ |
| $C_{11}$ | 0.7025 × 10$^{-5}$  | 0.00000 | −0.2567 × 10$^{-5}$ | 0.9087 × 10$^{-5}$  | 0.1360 × 10$^{-5}$  | −0.1341 × 10$^{-5}$ |
| $C_{13}$ | 0.7642 × 10$^{-5}$  | 0.00000 | −0.1743 × 10$^{-5}$ | 0.1067 × 10$^{-4}$  | 0.3101 × 10$^{-5}$  | 0.1004 × 10$^{-5}$ |
| $C_{15}$ | 0.1833 × 10$^{-5}$  | 0.00000 | −0.5602 × 10$^{-6}$ | 0.2189 × 10$^{-5}$  | 0.7518 × 10$^{-7}$  | −0.6562 × 10$^{-6}$ |

Decentration [1]

| X | 0.00 | Y | 0.00 | Z | 0.00 |
|---|---|---|---|---|---|
| α | 45.00 | β | 0.00 | γ | 0.00 |

Fifth Embodiment
Focal length: 4.7 mm~6.7 mm, Open F-number: 2.8~3.5
Dimensions of image pickup surface: 4.0 mm×3.0 mm
Values in Conditions:

$\phi_{DMW}$=−0.00009, $\phi_{DMS}$=−0.00131, $\phi_{DMT}$=−0.00022

$f_W$=4.68, $f_T$=6.70, $|\eta_W|\times|\eta_T|$=0.95, $f_{1a}/f_{WT}$=−2.22

| Surface Number | Radius of Curvature | Surface Separation | Decentration | Refractive Index | Abbe's Number |
|---|---|---|---|---|---|
| object surface | ∞ | ∞ | | | |
| 1 | ∞ | 0.00 | | | |
| 2 | 22.53 | 1.20 | | 1.6860 | 51.4 |
| 3 | ASP[1] | 8.00 | | | |
| 4 | FFS[1] (DM) | 5.00 | decentration[1] | | |
| 6 | 13.17 | 0.80 | | 1.7433 | 49.3 |
| 7 | 8.43 | 0.37 | | | |
| 8 | 6.61 | 2.00 | | 1.8467 | 23.8 |
| 9 | 7.19 | D1 = 4.09~2.46~1.00 | | | |
| 10 | stop surface | 1.00 | | | |
| 11 | ASP[2] | 1.50 | | 1.5891 | 61.1 |
| 12 | −13.83 | 0.15 | | | |
| 13 | 4.99 | 1.74 | | 1.4970 | 81.5 |
| 14 | −53.88 | 0.90 | | | |
| 15 | 14.76 | 1.20 | | 1.8467 | 23.8 |
| 16 | 3.35 | D2 = 2.50~4.14~5.59 | | | |
| 17 | 42.69 | 2.00 | | 1.5891 | 61.1 |
| 18 | ASP[3] | 1.40 | | | |
| 19 | ∞ | 1.44 | | 1.5477 | 62.8 |
| 20 | ∞ | 0.80 | | | |
| 21 | ∞ | 0.60 | | 1.5163 | 64.1 |
| 22 | ∞ | 0.50 | | | |
| image surface | ∞ | | | | |

ASP [1]

Radius of curvature 6.12 k 0.0000
a −2.4900×10$^{-4}$ b −3.3204×10$^{-6}$ c 2.5404×10$^{-8}$ d −8.6523×10$^{-9}$

ASP [2]

Radius of curvature 12.14 k 0.0000
a −7.1556×10$^{-4}$ b 1.4336×10$^{-5}$ c −4.3692×10$^{-6}$ d 3.0318×10$^{-7}$

ASP [3]

Radius of curvature −7.33 k 0.0000
a 1.0166×10$^{-3}$ b −3.4308×10$^{-5}$ c 6.4571×10$^{-7}$ d −1.4614×10$^{-8}$

FFS [1]

| | W OB = ∞ | S OB = ∞ | T OB = ∞ | W OB = 300 | S OB = 300 | T OB = 300 |
|---|---|---|---|---|---|---|
| $C_4$ | 0.2333 × 10$^{-4}$ | 0.4534 × 10$^{-3}$ | 0.8940 × 10$^{-4}$ | −0.3912 × 10$^{-3}$ | 0.3594 × 10$^{-4}$ | −0.3351 × 10$^{-3}$ |
| $C_6$ | 0.1189 × 10$^{-4}$ | 0.2352 × 10$^{-3}$ | 0.4308 × 10$^{-4}$ | −0.2068 × 10$^{-3}$ | 0.1760 × 10$^{-4}$ | −0.1717 × 10$^{-3}$ |
| $C_8$ | −0.3877 × 10$^{-5}$ | −0.1534 × 10$^{-5}$ | 0.1511 × 10$^{-5}$ | −0.4828 × 10$^{-5}$ | 0.1810 × 10$^{-5}$ | −0.1177 × 10$^{-5}$ |
| $C_{10}$ | −0.1190 × 10$^{-5}$ | 0.1910 × 10$^{-5}$ | 0.5476 × 10$^{-6}$ | −0.3362 × 10$^{-5}$ | 0.6621 × 10$^{-6}$ | −0.2459 × 10$^{-5}$ |
| $C_{11}$ | 0.5844 × 10$^{-5}$ | −0.1311 × 10$^{-5}$ | −0.5379 × 10$^{-5}$ | 0.3679 × 10$^{-5}$ | −0.3500 × 10$^{-5}$ | −0.7348 × 10$^{-5}$ |
| $C_{13}$ | 0.5814 × 10$^{-5}$ | −0.2703 × 10$^{-5}$ | −0.5762 × 10$^{-5}$ | 0.3846 × 10$^{-5}$ | −0.3642 × 10$^{-5}$ | −0.6718 × 10$^{-5}$ |
| $C_{15}$ | 0.1397 × 10$^{-5}$ | −0.4743 × 10$^{-6}$ | −0.1374 × 10$^{-5}$ | 0.9066 × 10$^{-6}$ | −0.9087 × 10$^{-6}$ | −0.1891 × 10$^{-5}$ |

Decentration [1]

| X | 0.00 | Y | 0.00 | Z | 0.00 |
|---|---|---|---|---|---|
| α | 45.00 | β | 0.00 | γ | 0.00 |

Sixth Embodiment

Focal length: 4.8 mm~8.9 mm, Open F-number: 2.8~4.2
Dimensions of image pickup surface: 4.0 mm×3.0 mm
Values in Conditions:

$\phi_{DMW}=-0.00028$, $\phi_{DMS}=-0.00152$, $\phi_{DMT}=0.00009$ $f_W=4.80$, $f_T=8.89$, $|\eta_W\times|_T|=0.97$, $f_{1a}/f_{WT}=-2.43$

| Surface Number | Radius of Curvature | Surface Separation | Decentration | Refractive Index | Abbe's Number |
|---|---|---|---|---|---|
| object surface | ∞ | ∞ | | | |
| 1 | ∞ | 0.00 | | | |
| 2 | −41.63 | 1.70 | | 1.4900 | 70.0 |
| 3 | ASP[1] | 10.00 | | | |
| 4 | FFS[1] (DM) | 5.00 | decentration[1] | | |
| 6 | 9.66 | 1.50 | | 1.5483 | 43.7 |
| 7 | 5.92 | 0.61 | | | |
| 8 | 6.40 | 3.00 | | 1.7875 | 44.4 |
| 9 | 7.74 | D1 = 8.25~3.99~1.00 | | | |
| 10 | stop surface | 1.00 | | | |
| 11 | ASP[2] | 1.50 | | 1.5891 | 61.1 |
| 12 | −13.89 | 0.63 | | | |
| 13 | 4.94 | 2.01 | | 1.4970 | 81.5 |
| 14 | 12.09 | 1.25 | | | |
| 15 | 22.64 | 1.47 | | 1.8467 | 23.8 |
| 16 | 3.82 | D2 = 1.32~5.58~8.57 | | | |
| 17 | 10.15 | 2.78 | | 1.5891 | 61.1 |
| 18 | ASP[3] | 1.00 | | | |
| 19 | ∞ | 1.44 | | 1.5477 | 62.8 |
| 20 | ∞ | 0.80 | | | |
| 21 | ∞ | 0.60 | | 1.5163 | 64.1 |
| 22 | ∞ | 0.50 | | | |
| image surface | ∞ | | | | |

ASP [1]
Radius of curvature 9.69 k 0.0000
−1.8247×10$^{-4}$ b 1.4614×10$^{-6}$ c −5.5828×10$^{-8}$ d 2.9088×10$^{-10}$ ASP [2]
Radius of curvature 13.85 k 0.0000
−2.8799×10$^{-4}$ b 2.4557×10$^{-5}$ c −6.0817×10$^{-6}$ d 5.1231×10$^{-7}$ ASP [3]
Radius of curvature −7.90 k 0.0000
a −1.4751×10$^{-3}$ b −4.1539×10$^{-5}$ c 1.2881×10$^{-6}$ d −1.9277×10$^{-8}$

| | FFS [1] | | | | | |
|---|---|---|---|---|---|---|
| | W OB = ∞ | S OB = ∞ | T OB = ∞ | W OB = 300 | S OB = 300 | T OB = 300 |
| $C_4$ | −0.1050 × 10$^{-3}$ | 0.5382 × 10$^{-3}$ | −0.1525 × 10$^{-4}$ | −0.5104 × 10$^{-3}$ | 0.1341 × 10$^{-3}$ | −0.4302 × 10$^{-3}$ |
| $C_6$ | −0.5252 × 10$^{-4}$ | 0.2787 × 10$^{-3}$ | −0.8943 × 10$^{-5}$ | −0.2672 × 10$^{-3}$ | 0.6889 × 10$^{-4}$ | −0.2167 × 10$^{-3}$ |
| $C_8$ | −0.5658 × 10$^{-5}$ | −0.5258 × 10$^{-5}$ | 0.4209 × 10$^{-6}$ | −0.7952 × 10$^{-5}$ | 0.3004 × 10$^{-5}$ | −0.2887 × 10$^{-5}$ |
| $C_{10}$ | −0.1924 × 10$^{-5}$ | 0.6389 × 10$^{-6}$ | −0.1642 × 10$^{-6}$ | −0.4258 × 10$^{-5}$ | 0.1262 × 10$^{-5}$ | −0.2989 × 10$^{-5}$ |
| $C_{11}$ | 0.5585 × 10$^{-5}$ | −0.6362 × 10$^{-5}$ | −0.7457 × 10$^{-5}$ | 0.5948 × 10$^{-5}$ | −0.6452 × 10$^{-5}$ | −0.7643 × 10$^{-5}$ |
| $C_{13}$ | 0.6128 × 10$^{-5}$ | −0.7801 × 10$^{-5}$ | −0.7828 × 10$^{-5}$ | 0.6799 × 10$^{-5}$ | −0.6266 × 10$^{-5}$ | −0.7248 × 10$^{-5}$ |
| $C_{15}$ | 0.1364 × 10$^{-5}$ | −0.1718 × 10$^{-5}$ | −0.1832 × 10$^{-5}$ | 0.1400 × 10$^{-5}$ | −0.1735 × 10$^{-5}$ | −0.2027 × 10$^{-5}$ |

| Decentration [1] | | | | | |
|---|---|---|---|---|---|
| X | 0.00 | Y | 0.00 | Z | 0.00 |
| α | 45.00 | β | 0.00 | γ | 0.00 |

Regarding each of the zoom optical systems according to the fourth to sixth embodiments, the configuration is similar to that of the first embodiment. Also, regarding each of the zoom optical systems according to the fifth and sixth embodiments, the deformable mirror DM is designed to be deformed into both of a concave surface and a convex surface. As described above, the condition for not generating so large coma is that not so large a power is given to the deformable mirror. Deformation of the deformable mirror into both of the concave and convex surfaces renders the absolute value of power small, to assure good performance.

Seventh Embodiment

Focal length: 7.1 mm~11.9 mm, Open F-number: 2.8~3.5
Dimensions of image pickup surface: 5.3 mm×4.0 mm
Values in Conditions:

(DM1) $\phi_{DMW}$=0.00105, $\phi_{DMS}$=0, $\phi_{DMT}$=0.00220

(DM2) $\phi_{DMW}$=0.00062, $\phi_{DMS}$=−0.00114, $\phi_{DMT}$=0.00129

$f_W$=7.14, $f_T$=11.93, $|\eta W|\times|\eta_T|$=1.12, $f_{1a}/f_{WT}$=−2.74

| Surface Number | Radius of Curvature | Surface Separation | Decentration | Refractive Index | Abbe's Number |
|---|---|---|---|---|---|
| object surface | ∞ | ∞ | | | |
| 1 | ∞ | 0.00 | | | |
| 2 | ASP[1] | 1.20 | | 1.7433 | 49.3 |
| 3 | ASP[2] | 8.00 | | | |
| 4 | FFS[1] (DM1) | 6.00 | decentration[1] | | |
| 5 | −82.61 | 0.80 | | 1.6622 | 49.9 |
| 6 | 10.47 | 0.61 | | | |
| 7 | 11.89 | 3.86 | | 1.8467 | 23.8 |
| 8 | 36.83 | D1 = 8.11~4.12~1.00 | | | |
| 9 | stop surface | 1.00 | | | |
| 10 | ASP[3] | 1.86 | | 1.5891 | 61.1 |
| 11 | −39.40 | 0.15 | | | |
| 12 | 10.81 | 2.88 | | 1.4970 | 81.5 |
| 13 | −20.54 | 0.33 | | | |
| 14 | 21.28 | 1.00 | | 1.8467 | 23.8 |
| 15 | 7.85 | D2 = 3.44~7.43~10.55 | | | |
| 16 | −7.55 | 1.27 | | 1.8467 | 23.8 |
| 17 | −10.92 | 2.00 | | 1.4901 | 70.0 |
| 18 | −7.75 | 0.20 | | | |
| 19 | ASP[4] | 2.00 | | 1.5891 | 61.1 |
| 20 | −7.38 | 4.50 | | | |
| 21 | FFS[2] (DM2) | 4.50 | decentration[2] | | |
| 22 | ∞ | 1.44 | | 1.5477 | 62.8 |
| 23 | ∞ | 0.80 | | | |
| 24 | ∞ | 0.60 | | 1.5163 | 64.1 |
| 25 | ∞ | 0.50 | | | |
| image surface | ∞ | | | | |

ASP [1]
Radius of curvature −14.83 k 0.0000
a −9.0525×10$^{-6}$ b 2.3540×10$^{-7}$ c 2.1197×10$^{-8}$ d −2.0309×10$^{-10}$ ASP [2]
Radius of curvature −72.56 k 0.0000
a −1.2376×10$^{-4}$ b 4.4288×10$^{-7}$ c 2.0938×10$^{-8}$ d −2.1987×10$^{-10}$ ASP [3]
Radius of curvature 16.54 k 0.0000
a −2.4802×10$^{-4}$ b −1.7093×10$^{-7}$ c −5.2350×10$^{-8}$ d 7.2794×10$^{-10}$ ASP [4]
Radius of curvature −15.04 k 0.0000
a −5.5003×10$^{-4}$ b −3.4369×10$^{-6}$ c 3.3520×10$^{-8}$ d −2.9237×10$^{-9}$

| | FFS [1] | | | | | |
|---|---|---|---|---|---|---|
| | W OB = ∞ | S OB = ∞ | T OB = ∞ | W OB = 300 | S OB = 300 | T OB = 300 |
| $C_4$ | −0.2959 × 10$^{-3}$ | 0.00000 | −0.6792 × 10$^{-3}$ | −0.6866 × 10$^{-3}$ | −0.2944 × 10$^{-3}$ | −0.9251 × 10$^{-3}$ |
| $C_6$ | −0.2344 × 10$^{-3}$ | 0.00000 | −0.4345 × 10$^{-3}$ | −0.3704 × 10$^{-3}$ | −0.1585 × 10$^{-17}$ | −0.6659 × 10$^{-3}$ |
| $C_8$ | −0.5887 × 10$^{-6}$ | 0.00000 | −0.1672 × 10$^{-5}$ | −0.1159 × 10$^{-4}$ | −0.4107 × 10$^{-5}$ | −0.1242 × 10$^{-4}$ |
| $C_{10}$ | 0.5270 × 10$^{-5}$ | 0.00000 | −0.1217 × 10$^{-5}$ | −0.7552 × 10$^{-5}$ | −0.2805 × 10$^{-5}$ | −0.9175 × 10$^{-5}$ |
| $C_{11}$ | 0.1004 × 10$^{-5}$ | 0.00000 | −0.3657 × 10$^{-6}$ | 0.3098 × 10$^{-5}$ | 0.4024 × 10$^{-6}$ | −0.4411 × 10$^{-6}$ |
| $C_{13}$ | 0.1695 × 10$^{-5}$ | 0.00000 | −0.9645 × 10$^{-6}$ | 0.3139 × 10$^{-5}$ | −0.8054 × 10$^{-7}$ | 0.1925 × 10$^{-6}$ |
| $C_{15}$ | 0.1377 × 10$^{-6}$ | 0.00000 | 0.1810 × 10$^{-6}$ | 0.8728 × 10$^{-6}$ | −0.6982 × 10$^{-7}$ | 0.4317 × 10$^{-6}$ |

| | FFS [2] | | | | | |
|---|---|---|---|---|---|---|
| | W OB = ∞ | S OB = ∞ | T OB = ∞ | W OB = 300 | S OB = 300 | T OB = 300 |
| $C_4$ | 0.4127 × 10$^{-3}$ | −0.3113 × 10$^{-3}$ | 0.7130 × 10$^{-4}$ | 0.9262 × 10$^{-3}$ | 0.6530 × 10$^{-3}$ | 0.2059 × 10$^{-2}$ |
| $C_6$ | 0.6767 × 10$^{-4}$ | −0.2188 × 10$^{-3}$ | −0.3914 × 10$^{-3}$ | 0.4102 × 10$^{-3}$ | 0.7690 × 10$^{-3}$ | 0.4400 × 10$^{-4}$ |
| $C_8$ | 0.1751 × 10$^{-4}$ | −0.6127 × 10$^{-5}$ | 0.7527 × 10$^{-5}$ | 0.7257 × 10$^{-4}$ | 0.4556 × 10$^{-4}$ | 0.2088 × 10$^{-3}$ |

-continued

FFS [2]

| W OB = ∞ | S OB = ∞ | T OB = ∞ | W OB = 300 | S OB = 300 | T OB = 300 |
|---|---|---|---|---|---|
| $C_{10}$ | | | | | |
| $-0.1996 \times 10^{-4}$ | $-0.8252 \times 10^{-5}$ | $-0.3782 \times 10^{-4}$ | $0.4337 \times 10^{-4}$ | $0.6140 \times 10^{-4}$ | $0.5172 \times 10^{-4}$ |
| $C_{11}$ | | | | | |
| $-0.1706 \times 10^{-5}$ | $-0.5449 \times 10^{-5}$ | $0.2091 \times 10^{-5}$ | $-0.5018 \times 10^{-5}$ | $-0.7665 \times 10^{-5}$ | $0.3725 \times 10^{-5}$ |
| $C_{13}$ | | | | | |
| $-0.8451 \times 10^{-6}$ | $-0.3821 \times 10^{-5}$ | $-0.6043 \times 10^{-5}$ | $-0.1267 \times 10^{-5}$ | $-0.2409 \times 10^{-5}$ | $0.1117 \times 10^{-4}$ |
| $C_{15}$ | | | | | |
| $-0.3113 \times 10^{-5}$ | $-0.9084 \times 10^{-6}$ | $-0.5430 \times 10^{-5}$ | $0.1344 \times 10^{-5}$ | $0.2986 \times 10^{-5}$ | $0.1691 \times 10^{-5}$ |

| Decentration [1] | | | | | | |
|---|---|---|---|---|---|---|
| X | 0.00 | Y | 0.00 | Z | 0.00 | |
| α | 45.00 | β | 0.00 | γ | 0.00 | |
| Decentration [2] | | | | | | |
| X | 0.00 | Y | 0.00 | Z | 0.00 | |
| α | -45.00 | β | 0.00 | γ | 0.00 | |

Eighth Embodiment
Focal length: 6.2 mm~11.3 mm, Open F-number: 2.8~3.5
Dimensions of image pickup surface: 5.3 mm×4.0 mm
Values in Conditions:

$\phi_{DMW}=0.00230$, $\phi_{DMS}=0$, $\phi_{DMT}=0.00214$ $f_W=6.24$, $f_T=11.30$, $|\eta_W|\times|\eta_T|=1.19$, $f_{1a}/f_{WT}=-1.58$ ASP [1]
Radius of curvature ∞ k 0.0000
a $-2.2144\times10^{-4}$ b $3.5125\times10^{-6}$ c $-6.7064\times10^{-9}$ d $-4.5346\times10^{-10}$ ASP [2]
Radius of curvature 9.78 k 0.0000
a $-4.5914\times10^{-4}$ b $3.2493\times10^{-6}$ c $2.3687\times10^{-8}$ d $-1.8362\times10^{-9}$ ASP [3]
Radius of curvature 13.09 k 0.0000
$-2.5917\times10^{-4}$ b $-1.1577\times10^{-6}$ c $-1.5219\times10^{-7}$ d $3.0646\times10^{-9}$ ASP [4]
Radius of curvature -15.63 k 0.0000
a $-4.8761\times10^{-4}$ b $1.9793\times10^{-5}$ c $-1.1371\times10^{-7}$ d $4.9099\times10^{-8}$

| Surface Number | Radius of Curvature | Surface Separation | Decentration | Refractive Index | Abbe's Number |
|---|---|---|---|---|---|
| object surface | ∞ | ∞ | | | |
| 1 | ∞ | 0.00 | | | |
| 2 | ASP [1] | 1.20 | | 1.7349 | 51.5 |
| 3 | ASP [2] | 11.00 | | | |
| 4 | FFS [1] (DM) | 6.00 | decentration [1] | | |
| 6 | 12.58 | 0.80 | | 1.5189 | 50.5 |
| 7 | 7.52 | 0.60 | | | |
| 8 | 8.40 | 1.27 | | 1.8500 | 24.0 |
| 9 | 11.32 | D1 = 12.40~5.38~1.00 | | | |
| 10 | stop surface | 1.00 | | | |
| 11 | ASP [3] | 1.50 | | 1.5891 | 61.1 |
| 12 | -60.60 | 0.15 | | | |
| 13 | 6.66 | 1.92 | | 1.4970 | 81.5 |
| 14 | -27.73 | 0.32 | | | |
| 15 | 42.57 | 1.00 | | 1.8010 | 35.0 |
| 16 | 5.43 | D2 = 1.56~8.58~12.96 | | | |
| 17 | 84.56 | 2.17 | | 1.7800 | 50.0 |
| 18 | -4.89 | 1.00 | | 1.8010 | 35.0 |
| 19 | ASP [4] | 0.30 | | | |
| 20 | FFS [2] | 4.30 | | 1.5254 | 55.8 |
| 21 | FFS [3] | 4.20 | decentration [2] | 1.5254 | 55.8 |
| 22 | FFS [4] | 3.91 | | | |
| 23 | ∞ | 1.44 | | 1.5477 | 62.8 |
| 24 | ∞ | 0.80 | | | |
| 25 | ∞ | 0.60 | | 1.5163 | 64.1 |
| 26 | ∞ | 0.50 | | | |
| image surface | ∞ | | | | |

| | FFS [1] | | | | | |
|---|---|---|---|---|---|---|
| | W OB = ∞ | S OB = ∞ | T OB = ∞ | W OB = 300 | S OB = 300 | T OB = 300 |
| $C_4$ | $-0.8174 \times 10^{-3}$ | 0.00000 | $-0.7192 \times 10^{-3}$ | $-0.1173 \times 10^{-2}$ | $-0.3175 \times 10^{-3}$ | $-0.1056 \times 10^{-2}$ |
| $C_6$ | $-0.4262 \times 10^{-3}$ | 0.00000 | $-0.3696 \times 10^{-3}$ | $-0.6119 \times 10^{-3}$ | $-0.1663 \times 10^{-3}$ | $-0.5365 \times 10^{-3}$ |
| $C_8$ | $-0.2325 \times 10^{-4}$ | 0.00000 | $-0.1557 \times 10^{-4}$ | $-0.2680 \times 10^{-4}$ | $-0.1139 \times 10^{-4}$ | $-0.2410 \times 10^{-4}$ |
| $C_{10}$ | $-0.3381 \times 10^{-5}$ | 0.00000 | $-0.7205 \times 10^{-5}$ | $-0.6975 \times 10^{-5}$ | $-0.1887 \times 10^{-5}$ | $-0.1138 \times 10^{-4}$ |
| $C_{11}$ | $0.1363 \times 10^{-4}$ | 0.00000 | $-0.5743 \times 10^{-5}$ | $0.1389 \times 10^{-4}$ | $-0.1325 \times 10^{-5}$ | $-0.6598 \times 10^{-5}$ |
| $C_{13}$ | $0.1273 \times 10^{-4}$ | 0.00000 | $-0.5205 \times 10^{-5}$ | $0.1298 \times 10^{-4}$ | $-0.1293 \times 10^{-5}$ | $-0.6364 \times 10^{-5}$ |
| $C_{15}$ | $0.4293 \times 10^{-5}$ | 0.00000 | $-0.1173 \times 10^{-5}$ | $0.4170 \times 10^{-5}$ | $-0.6192 \times 10^{-7}$ | $-0.1577 \times 10^{-5}$ |

FFS [2]
$C_4$ $-1.3509 \times 10^{-1}$ $C_6$ $-1.3447 \times 10^{-1}$ $C_8$ $8.8280 \times 10^{-5}$ $C_{10}$ $-4.4253 \times 10^{-4}$
$C_{11}$ $-2.0610 \times 10^{-3}$ $C_{13}$ $-4.0152 \times 10^{-3}$ $C_{15}$ $-1.9202 \times 10^{-3}$ $C_{68}$ 1.0000

FFS [3]
$C_4$ $-8.4640 \times 10^{-4}$ $C_6$ $-3.0023 \times 10^{-4}$ $C_8$ $-1.9366 \times 10^{-5}$ $C_{10}$ $-1.7860 \times 10^{-4}$
$C_{11}$ $-8.8384 \times 10^{-6}$ $C_{13}$ $2.5759 \times 10^{-5}$ $C_{15}$ $1.2823 \times 10^{-5}$ $C_{68}$ 1.0000

FFS [4]
$C_4$ $-6.0302 \times 10^{-3}$ $C_6$ $-5.6802 \times 10^{-3}$ $C_8$ $7.8972 \times 10^{-5}$ $C_{10}$ $2.2703 \times 10^{-3}$
$C_{11}$ $2.8357 \times 10^{-4}$ $C_{13}$ $3.8813 \times 10^{-4}$ $C_{15}$ $7.4152 \times 10^{-5}$

| Decentration [1] | | | | | |
|---|---|---|---|---|---|
| X | 0.00 | Y | 0.00 | Z | 0.00 |
| α | 45.00 | β | 0.00 | γ | 0.00 |
| Decentration [2] | | | | | |
| X | 0.00 | Y | 0.00 | Z | 0.00 |
| α | −45.00 | β | 0.00 | γ | 0.00 |

Regarding each of the zoom optical systems according to the seventh and eighth embodiments, the configuration is similar to that of the first embodiment. It is noted that the zoom optical system according to the seventh embodiment is designed to have a small amount of deformation of the deformable mirror. In addition, for the purpose of compensating for decentered coma in good condition, compensating and focusing functions are given to two deformable mirrors DM1 and DM2 arranged in the first group G1 and the third group G3, respectively. That is, in the seventh embodiment, compensation and focusing are performed using two deformable mirrors DM1 and DM2 arranged in the first group G1 and in the third group G3. Regarding the zoom optical system according to the eighth embodiment in particular, for the purpose of keeping a good balance of performance between the infinite object distance and the proximate object distance, a prism having a free-formed surface is used in the third group G3.

In each of the zoom optical systems according to the seventh and eighth embodiments, regarding the two deformable mirrors, the direction of axial rays incident on the first deformable mirror and the direction of the axial rays emergent from the second deformable mirror are opposite to each other and are parallel to each other (opposite-parallel). This arrangement, in a case where a stop is disposed between the two deformable mirrors, causes the height of upper-side rays and the height of lower-side rays from an off-axial object to be exchanged for each other on the two deformable mirrors, and thus is favorable in that it facilitates compensation for coma. This layout of the two deformable mirrors can be rephrased as follows: an inner product of vectors that express azimuths of an axial ray incident on the two deformable mirrors has a negative value.

Also, an angle Φ of turning of an optical axis caused by a deformable mirror preferably satisfies the following condition:

$$70° \leq \Phi \leq 110°$$

If the angle Φ falls below 70°, optical devices, electronic devices, etc. are liable to compete with each other for a space. On this other hand, if 110° is exceeded, though it is easy to secure a space for device arrangement, aberrations increase. This Condition is applicable to any embodiment in which a single deformable mirror is used, also.

In addition, it is much preferable that the angle Φ of turning of the optical axis caused by the deformable mirror satisfies the following condition:

$$80° \leq \Phi \leq 100°$$

Ninth Embodiment
Focal length: 4.6 mm~13.8 mm, Open F-number: 2.8~5.7
Dimensions of image pickup surface: 4.0 mm×3.0 mm
Values in Conditions:

$\Phi_{DMW}=0, \Phi_{DMS}=0, \Phi_{DMT}=0$ $f_W=4.60, f_T=13.80, |\eta_W \times \eta_T|=0.74, f_{1a}/f_{WT}=-2.27$

| Surface Number | Radius of Curvature | Surface Separation | Decentration | Refractive Index | Abbe's Number |
|---|---|---|---|---|---|
| object surface | ∞ | ∞ | | | |
| 1 | ∞ | 0.00 | | | |
| 2 | −50.02 | 1.70 | | 1.4900 | 70.0 |

-continued

| Surface Number | Radius of Curvature | Surface Separation | Decentration | Refractive Index | Abbe's Number |
|---|---|---|---|---|---|
| 3 | ASP [1] | 11.74 | | | |
| 4 | FFS [1](DM) | 6.00 | decentration [1] | | |
| 5 | −20.68 | 0.80 | | 1.5704 | 46.9 |
| 6 | 446.69 | 0.15 | | | |
| 7 | 10.08 | 2.00 | | 1.8467 | 23.8 |
| 8 | ASP [2] | D1 = 16.81~9.51~1.00 | | | |
| 9 | stop surface | 1.00 | | | |
| 10 | ASP [3] | 1.50 | | 1.5891 | 61.1 |
| 11 | 19.75 | 0.25 | | | |
| 12 | 6.60 | 1.92 | | 1.4970 | 81.5 |
| 13 | −36.65 | 1.16 | | | |
| 14 | 7.51 | 1.01 | | 1.8467 | 23.8 |
| 15 | 3.85 | D2 = 3.17~12.87~21.38 | | | |
| 16 | 12.90 | 2.00 | | 1.5891 | 61.1 |
| 17 | ASP [4] | D3 = 3.39~1.00~1.00 | | | |
| 18 | ∞ | 1.44 | | 1.5477 | 62.8 |
| 19 | ∞ | 0.80 | | | |
| 20 | ∞ | 0.60 | | 1.5163 | 64.1 |
| 21 | ∞ | 1.00 | | | |
| image surface | ∞ | | | | |

ASP [1]
Radius of curvature 10.89 k 0.0000
a −2.3904×10$^{-4}$ b 3.0098×10$^{-7}$ c −1.5230×10$^{-8}$ d 4.5277×10$^{-11}$ ASP [2]
Radius of curvature 13.37 k 0.0000
a 1.4368×10$^{-4}$ b 3.3526×10$^{-7}$ c 9.1518×10$^{-8}$ d −2.0296×10$^{-9}$ ASP [3]
Radius of curvature 9.68 k 0.0000
a 1.4369×10$^{-4}$ b −4.1559×10$^{-6}$ c 8.7325×10$^{-8}$ d −1.4374×10$^{-8}$ ASP [4]
Radius of curvature −36.59 k 0.0000
a −2.0596×10$^{-5}$ b −1.2193×10$^{-5}$ c 3.1267×10$^{-7}$ d 7.1790×10$^{-10}$

| | FFS [1] | | | | | |
|---|---|---|---|---|---|---|
| | W OB = ∞ | S OB = ∞ | T OB = ∞ | W OB = 300 | S OB = 300 | T OB = 300 |
| $C_4$ | 0.00000 | 0.00000 | 0.00000 | −0.4232 × 10$^{-3}$ | −0.3731 × 10$^{-3}$ | −0.4111 × 10$^{-3}$ |
| $C_6$ | 0.00000 | 0.00000 | 0.00000 | −0.2309 × 10$^{-3}$ | −0.1878 × 10$^{-3}$ | −0.2065 × 10$^{-3}$ |
| $C_8$ | 0.00000 | 0.00000 | 0.00000 | 0.1430 × 10$^{-5}$ | 0.6384 × 10$^{-6}$ | −0.6522 × 10$^{-5}$ |
| $C_{10}$ | 0.00000 | 0.00000 | 0.00000 | −0.1198 × 10$^{-5}$ | −0.8587 × 10$^{-6}$ | −0.3864 × 10$^{-5}$ |
| $C_{11}$ | 0.00000 | 0.00000 | 0.00000 | −0.3293 × 10$^{-6}$ | −0.4582 × 10$^{-5}$ | −0.8385 × 10$^{-6}$ |
| $C_{13}$ | 0.00000 | 0.00000 | 0.00000 | −0.4014 × 10$^{-6}$ | −0.4615 × 10$^{-5}$ | −0.2660 × 10$^{-6}$ |
| $C_{15}$ | 0.00000 | 0.00000 | 0.00000 | 0.1126 × 10$^{-6}$ | −0.1249 × 10$^{-5}$ | −0.2518 × 10$^{-6}$ |

| Decentration [1] | | | | | | |
|---|---|---|---|---|---|---|
| X | 0.00 | Y | 0.00 | Z | 0.00 |
| α | 45.00 | β | 0.00 | γ | 0.00 |

The zoom optical system according to the ninth embodiment includes, in order from the object side, a first group G1 having a negative power, a second group G2 having a positive power, and a third group G3 having a positive power. A magnification change is made by moving the second group G2. That is, the second group is given a magnification varying function. Defocused condition caused by the magnification change is compensated for by movement of the third group G3. In addition, configuration is made so that focusing is performed by the reflecting surface of the deformable mirror DM disposed in the first group G1.

Tenth Embodiment
Focal length: 4.0 mm~10.0 mm, Open F-number: 2.8~4.9
Dimensions of image pickup surface: 4.0 mm×3.0 mm
Values in Conditions:

$\phi_{DMW}=0, \phi_{DMS}=0, \phi_{DMT}=0$ $f_W=4.00, f_T=10.00, |\eta_W|\times|\eta_T|=0.98, f_{1a}/f_{WT}=-1.93$ It is noted that values of $\eta_W$ and $\eta_T$ here are magnifications of a subsystem from the second group thorough the third group at the wide-angle end and at the telephoto end, respectively.

| Surface Number | Radius of Curvature | Surface Separation | Decentration | Refractive Index | Abbe's Number |
|---|---|---|---|---|---|
| object surface | ∞ | ∞ | | | |
| 1 | 31.03 | 1.20 | | 1.7725 | 49.6 |
| 2 | 9.43 | 7.50 | | | |
| 3 | ∞ | 0.00 | | | |
| 4 | FFS [1] (DM) | 6.00 | decentration [1] | | |
| 5 | 18.86 | 0.80 | | 1.7433 | 49.3 |
| 6 | ASP [1] | 0.51 | | | |
| 7 | 7.54 | 1.50 | | 1.8467 | 23.8 |
| 8 | 11.20 | D1 = 9.79~3.62~1.00 | | | |
| 9 | stop surface | 1.00 | | | |
| 10 | 67.49 | 1.50 | | 1.7292 | 54.7 |
| 11 | −5.08 | 0.80 | | 1.7627 | 37.4 |
| 12 | −15.76 | D2 = 1.00~3.09~1.00 | | | |
| 13 | ASP [2] | 1.87 | | 1.7433 | 49.3 |
| 14 | 63.70 | 0.99 | | | |
| 15 | 16.87 | 2.09 | | 1.6667 | 54.4 |
| 16 | −14.77 | 1.01 | | 1.7666 | 27.2 |
| 17 | 3.41 | D3 = 1.71~5.79~10.50 | | | |
| 18 | 16.41 | 2.23 | | 1.6935 | 53.2 |
| 19 | ASP [3] | 1.00 | | | |
| 20 | ∞ | 1.00 | | 1.5477 | 62.8 |
| 21 | ∞ | 0.50 | | | |
| 22 | ∞ | 0.50 | | 1.5163 | 64.1 |
| 23 | ∞ | 0.50 | | | |
| image surface | ∞ | | | | |

ASP [1]
Radius of curvature 7.44 k −7.4873×10$^{-1}$
a 1.1872×10$^{-4}$ b 9.9022×10$^{-6}$ c −5.5493×10$^{-7}$ d 1.7399×10$^{-8}$ ASP [2]
Radius of curvature 6.41 k 3.3506×10$^{-1}$
a −3.5713×10$^{-4}$ b 5.7439×10$^{-6}$ c −2.4704×10$^{-6}$ d 1.4017×10$^{-7}$ ASP [3]
Radius of curvature −8.22 k −4.2108×10$^{-1}$
a 1.4533×10$^{3}$ b −1.0326×10$^{-4}$ c 4.4853×10$^{-6}$ d −7 −3043×10$^{-8}$

| | FFS [1] | | | | | |
|---|---|---|---|---|---|---|
| | W OB = ∞ | S OB = ∞ | T OB = ∞ | W OB = 300 | S OB = 300 | T OB = 300 |
| $C_4$ | 0.00000 | 0.00000 | 0.00000 | −0.5787 × 10$^{-3}$ | −0.5394 × 10$^{-3}$ | −0.5774 × 10$^{-3}$ |
| $C_6$ | 0.00000 | 0.00000 | 0.00000 | −0.3101 × 10$^{-3}$ | −0.2755 × 10$^{-3}$ | −0.2875 × 10$^{-3}$ |
| $C_8$ | 0.00000 | 0.00000 | 0.00000 | −0.1000 × 10$^{-4}$ | −0.3985 × 10$^{-5}$ | −0.4936 × 10$^{-5}$ |
| $C_{10}$ | 0.00000 | 0.00000 | 0.00000 | −0.5066 × 10$^{-5}$ | −0.1636 × 10$^{-5}$ | −0.2879 × 10$^{-5}$ |
| $C_{11}$ | 0.00000 | 0.00000 | 0.00000 | 0.2234 × 10$^{-5}$ | −0.3496 × 10$^{-5}$ | −0.2316 × 10$^{-6}$ |
| $C_{13}$ | 0.00000 | 0.00000 | 0.00000 | 0.3180 × 10$^{-5}$ | 0.7594 × 10$^{-6}$ | 0.5011 × 10$^{-5}$ |
| $C_{15}$ | 0.00000 | 0.00000 | 0.00000 | 0.6290 × 10$^{-6}$ | −0.7623 × 10$^{-6}$ | −0.4072 × 10$^{-6}$ |

| Decentration [1] | | | | | |
|---|---|---|---|---|---|
| X | 0.00 | Y | 0.00 | Z | 0.00 |
| α | 45.00 | β | 0.00 | γ | 0.00 |

The zoom optical system according to the tenth embodiment includes, in order from the object side, a first group G1 having a negative power, a second group G2 having a positive power, a third group G3 having a positive power, and a fourth group G4 having a positive power. A magnification change is made by moving the second group G2 and the third group G3. That is, the second group and the third group are given a magnification varying function. At the same time, the second group G2 and the third group G3 compensate for defocus also. In addition, configuration is made so that focusing is performed by the reflecting surface of the deformable mirror DM disposed in the first group G1.

As stated above, the zoom optical system according to the present invention uses a variable optical-property optical element. Consequently, zooming action is smoother than a magnification change by a motor. In addition, operation noise is small and power consumption is small. Furthermore, it is not necessary to provide a motor or a driving circuit to activate the motor. Also, since the mechanical structure for moving lenses is simple, a space for providing the mechanical structure is allowed to be small. As a result, even if a zoom optical system is used, bulkiness of the apparatus is avoidable.

All of the descriptions above relate to the optical system using a deformable mirror. However, in a case where an ordinary (non-deformable) mirror is used in place of the deformable mirror, also, the conditional expressions and limitations set forth above may be applied unless they specifically cause inconvenience.

This is because the merit of compactness contributed by the folded design of the optical system using a mirror remains as it is in this case also.

The zoom optical system according to the present invention as described above is applicable to a film camera, a digital camera, a TV camera, a camera for a personal data assistant, a monitor camera, robot eyes, an electronic endoscope, etc.

Regarding the zoom optical system set forth above, the description has been made of the type configured to have a reflecting surface in a lens group. However, regarding a zoom optical system having no reflecting surface also, use of an optical element having a deformable surface, for example, a variable focus lens can achieve effects such as size reduction, cost reduction, power saving, and operation noise reduction. Moreover, a variable focus mirror that has no deformable surface is applicable to the embodiments set forth above.

Regarding the variable focus mirror, one example is explained in reference FIG. 40, later.

Hereafter, explanation is made of configuration examples of the deformable mirror applicable to the zoom optical system according to the present invention.

FIG. 25 is a schematic configuration diagram that shows a digital camera's Keplerian finder using a variable optical-property mirror, as a variable mirror that is applicable to the zoom optical system according to the present invention. This configuration example is applicable to a silver halide film camera, as a matter of course. Reference is first made to a variable optical-property deformable mirror 409.

The variable optical-property deformable mirror 409 is a variable optical-property deformable mirror (hereafter simply called a deformable mirror) in which the periphery of a deformable three-layer structure composed of an electrode 409$k$, a deformable substrate 409$j$, and a thin film (reflecting surface) 409$a$, which is an aluminum coating formed on the substrate 409$j$ and functions as a reflecting surface, is fixed on a support 423, and a plurality of electrodes 409$b$ provided in a spaced relation with the electrode 409$k$ are fixed on the lower side of the support 423. The reference numeral 411$a$ denotes a plurality of variable resistors connected with the electrodes 409$b$, respectively. The reference numeral 412 denotes a power supply connected, as interposed between, with the electrode 409$k$ and the electrodes 409$b$ through variable resistors 411$b$ and a power switch 413. The reference numeral 414 denotes an arithmetical unit for controlling resistance values of the plurality of variable resistors 411$a$. The reference numerals 415, 416, and 417 denote a temperature sensor, a humidity sensor, and a range sensor, respectively, connected with the arithmetical unit 414. These members and elements are arranged as shown in the figure, to constitute an optical apparatus.

Each of surfaces of an objective lens 902, an eyepiece 901, a prism 404, a rectangular isosceles prism 405, a mirror 406 and the deformable mirror 409 may have, not necessarily limited to planer surfaces, any shape such as a spherical or rotationally symmetric aspherical surface, a spherical, planar or rotationally symmetric aspherical surface that has a decentration in reference to the optical axis, an aspherical surface that defines planes of symmetry, only one plane of symmetry or no plane of symmetry, a free-formed surface, and a surface having a nondifferentiable point or line. In addition, irrespective of whether it is a reflecting surface or a refracting surface, any surface is applicable as long as it can exert some effect on light. Hereafter, such a surface is generally referred to as an expanded curved surface. It is noted that decentration implies either one or both of displacement (shift) and tilt.

Also, it is designed so that, when a voltage is applied between the plurality of electrodes 409$b$ and the electrode 409$k$, the thin film 409$a$ is deformed by electrostatic force to change its surface shape, as in the case of the membrane mirror referred to, for example, in "Handbook of Microlithography, Micromachining and Microfabriation", edited by P. Rai-Choudhury, Vol. 2: Micromachining and Microfabriation, p. 495, FIG. 8.58, SPIE PRESS or "Optics Communication", Vol. 140, pp. 187–190, 1997. Whereby, not only can focus adjustment be made in conformance with diopter of an observer, but also it is possible to suppress degradation of image forming performance, which results from deformation or change of refractive indices of the lenses 901 and 902 and/or the prism 404, the rectangular isosceles prism 405 and the mirror 406 caused by temperature change or humidity change, from expansion/contraction and deformation of lens frames, or from assembling errors of parts such as optical elements and frames. In this way, focus adjustment and compensation for aberrations caused by the focus adjustment can always be performed appropriately.

Also, the profile of the electrodes 409$b$ has a concentric or rectangular division pattern as shown in FIGS. 17 and 18, and may be selected in accordance with deformation pattern of the thin film 409$a$ In the case where the deformable mirror 409 is used, light from the object is refracted at each of entrance surfaces and exit surfaces of the objective lens 902 and the prism 404, is reflected at the deformable mirror 409, is transmitted through the prism 404, is further reflected at the rectangular isosceles prism 405 (in FIG. 25, the mark "+" on the path of rays indicates that rays travel toward the rear side of the figure), is reflected at the mirror 406, and enters the observer's eye via the eyepiece 901. In this way, the lenses 901 and 902, the prisms 404 and 405, and the deformable mirror 409 constitute an observation optical system of the optical apparatus. Optimizing the surface shape and thickness of each of these optical elements can minimize aberrations on the object surface.

In other words, the shape of the thin film 409*a*, which functions as a reflecting surface, is controlled in such a manner that resistance values of the variable resistors 411*a* are changed by signals from the arithmetical unit 414, to optimize image forming performance. Signals that have intensities according to ambient temperature, humidity and distance to the object are input into the arithmetical unit 414 from the temperature sensor 415, the humidity sensor 416, and the range sensor 417. In order to compensate for degradation of image forming performance caused by the ambient temperature and humidity and the distance to the object, the arithmetical unit 414 outputs signals for determining resistance values of the variable resistors 411*a* upon taking into account these input signals, so that voltages which determine the shape of the thin film 409*a* are applied to the electrodes 409*b*. In this way, since the thin film 409*a* is deformed by voltages applied to the electrodes 409*b*, or electrostatic force, it can assume various shapes including aspherical surfaces in accordance with conditions.

It is noted that the range sensor 417 is dispensable. In this case, it is only necessary to move the imaging lens 403, which is provided as the imaging optical system of the digital camera, to the position where high-frequency components of an image signal from a solid-state image sensor 408 are substantially maximized, to calculate the object distance on the basis of this position, and to deform the deformable mirror 409 so that an observer's eye is focused on the object image.

Also, if the deformable substrate 409*j* is made of synthetic resin such as polyimide, it is favorable in that the thin film could be considerably deformed even at a low voltage. Also, to integrally form the prism 404 and the deformable mirror 409 into a unit is convenient for assembly.

In the example of FIG. 25, since the reflecting surface 409*a* and the deformable electrode 409*k* are integrally formed as spaced via the deformable substrate 409*j* sandwiched between, there is a merit of choice from several manufacturing methods. Also, the reflecting surface 409*a* may be designed to be used as the electrode 409*k* also. In this case, since these two are configured into one, the structure is simplified, which is a merit.

Although not shown in the figure, the solid-state image sensor 408 may be integrally formed on the substrate of the deformable mirror 409 by a lithography process.

Also, if the lenses 901 and 902, the prisms 404 and 405, and the mirror 406 are formed with plastic molds, curved surfaces with any desirable shapes can be easily formed and the fabrication also is simple. In the above description, the lenses 901 and 902 are arranged separately from the prism 404. However, if the prisms 404 and 405, the mirror 406, and the deformable mirror 409 can be designed to eliminate aberrations without the lenses 902 and 901, the prisms 404 and 405 and the deformable mirror 409 will form one optical block, to facilitate assembling. A part or all of the lenses 901 and 902, the prisms 404 and 405, and the mirror 406 may be made of glass. Such a configuration would assure an imaging system having a better accuracy. The reflecting surface of the deformable mirror preferably is shaped as a free-formed surface, because thereby compensation for aberration is facilitated and thus is advantageous.

In the example of FIG. 25, although the arithmetical unit 404, the temperature sensor 415, the humidity sensor 416, and the range sensor 417 are provided so that temperature change, humidity change, and change of the object distance are compensated for by the deformable mirror 409, the system configuration is not necessarily limited to this specific one. That is, the arithmetical unit 414, the temperature sensor 415, the humidity sensor 416 and the range sensor 417 may be removed from the configuration so that the deformable mirror 409 compensates for change of the observer's diopter alone.

FIG. 26 is a schematic configuration diagram that shows another example of the deformable mirror 409 applicable as a variable mirror used in the zoom optical system according to the present invention.

In the deformable mirror 409 of this example, a piezoelectric element 409*c* is interposed between the thin film 409*a* and the electrodes 409*b*, and these elements are mounted on a support 423. By changing voltages applied to the piezoelectric element 409*c* for individual electrodes 409*b* to cause different expansion or contraction in the piezoelectric element 409*c* portion by portion, the configuration allows the shape of the thin film 409*a* to be changed. Arrangement of the electrodes 409*b* may be chosen from a concentric division pattern as illustrated in FIG. 27, a rectangular division pattern as illustrated in FIG. 28, and any other appropriate pattern.

In FIG. 26, the reference numeral 424 denotes a shake sensor connected with the arithmetical unit 414. The shake sensor 424 detects, for example, shake of a digital camera in photographing and changes voltages applied to the electrodes 409*b* via the arithmetical unit 414 and the variable resistors 411 so as to deform the thin film (reflecting surface) 409*a* for compensation for disturbance of the image by the shake. In this situation, focusing and compensation for temperature and humidity are performed upon signals from the temperature sensor 415, the humidity sensor 416, and the range sensor 417 also being taken into account simultaneously. In this case, since a stress that derives from the deformation of the piezoelectric element 409*c* is applied to the thin film 409*a*, it is good practice to give the thin film 409*a* a considerable thickness to have an appropriate strength. It is noted that the piezoelectric element 409*c* may have, as described later, a two-layer structure denoted by 409*c*-1 and 409*c*-2, depending on materials used.

FIG. 29 is a schematic configuration diagram that shows still another example of the deformable mirror 409 applicable as a variable mirror used in the zoom optical system according to the present invention.

The deformable mirror of this example differs from the deformable mirror shown in FIG. 26 in that the piezoelectric element interposed between the thin film 409*a* and the plurality of electrodes 409*b* is composed of two piezoelectric elements 409*c* and 409*c*' made of substances having piezoelectric characteristics of opposite directionalities. Specifically, if the piezoelectric elements 409*c* and 409*c*' are made of ferroelectric crystals, they are arranged so that the crystal axes thereof are directed opposite to each other. In this case, when voltages are applied, since the piezoelectric elements 409*c* and 409*c*' expand or contract in opposite directions, the force to deform the thin film (reflecting surface) 409*a* becomes stronger than in the example of FIG. 26, to result in an advantage that the mirror surface can be considerably deformed. Other reference numerals in FIG. 29 are the same as those in FIG. 26.

Substances usable to construct the piezoelectric elements 409*c* and 409*c*' are, for example, piezoelectric substances or polycrystals or crystals thereof such as barium titanate, Rochelle salt, quartz crystal, tourmaline, KDP, ADP and lithium niobite; piezoelectric ceramics such as solid solution of $PbZrO_3$ and $PbTiO_3$; organic piezoelectric substances such as PVDF; and other ferroelectrics. In particular, the organic piezoelectric substance is preferable because it has a small value of Young's modulus and brings about a considerable deformation at a low voltage. In application of these piezoelectric elements, if they are made to have uneven thickness, it also is possible to properly deform the thin film 409a in each of the examples set forth above.

Also, as materials of the piezoelectric elements 409c and 409c', macromolecular piezoelectric such as polyurethane, silicon rubber, acrylic elastomer, PZT, PLZT, and PVDF; vinylidene cyanide copolymer, copolymer of vinylidene fluoride and trifluoroethylene; etc. are usable.

Use of the organic substance having a piezoelectric property, the synthetic resin having a piezoelectric property, or the elastomer having a piezoelectric property is favorable because a considerable deformation of the surface of the deformable mirror can be achieved.

In the case where an electrostrictive substance such as acrylic elastomer or silicon rubber is used for the piezoelectric element 409c shown in FIGS. 26 and 30, the piezoelectric element 409c may have the structure in which another substrate 409c-1 and the electrostrictive substance 409c-2 are cemented together.

FIG. 30 is a schematic configuration diagram that shows still another example of the deformable mirror 409 applicable as a variable mirror used in the zoom optical system according to the present invention.

The deformable mirror of this example is designed so that the piezoelectric element 409c is sandwiched between the thin film 409a and a plurality of electrodes 409d, and these are placed on the support 423. A voltage is applied to the piezoelectric element, which is placed between the thin film 409a and the electrodes 409d, via a driving circuit 425a controlled by the arithmetical unit 414. Furthermore, apart from this, voltages are applied to the plurality of electrodes 409b also, which are formed on a bottom surface inside the support 423, via driving circuits 425b controlled by the arithmetical unit 414. Resultantly, the thin film 409a can be doubly deformed by electrostatic forces derived from the voltage applied between the thin film 409a and the electrodes 409d and from the voltages applied to the electrodes 409b. Therefore, this example has a merit that a larger number of deformation patterns are possible and a faster response is achieved than in the case of any examples previously set forth. Other reference numerals in FIG. 30 are the same as those in FIG. 26.

Also, the thin film 409a of the deformable mirror can be deformed into either a convex surface or a concave surface upon the sign of the voltages applied between the thin film 409a and the electrodes 409d being changed. In this case, it may be designed so that piezoelectric effect causes a considerable amount of deformation while electrostatic force causes a fine shape change. Alternatively, it may be designed so that piezoelectric effect is mainly used for deformation of a convex surface while electrostatic force is mainly used for deformation of a concave surface. It is noted that the electrodes 409d may be constructed of a single electrode or a plurality of electrodes like the electrodes 409b. The configuration of the electrodes 409d composed of a plurality of electrodes is illustrated in FIG. 30. In this description, piezoelectric effect, electrostrictive effect, and electrostriction are generally referred to as "piezoelectric effect". Thus, electrostrictive substance also is classified into piezoelectric substance.

FIG. 31 is a schematic configuration diagram that shows still another example of the deformable mirror 409 applicable as a deformable mirror used in the zoom optical system according to the present invention.

The deformable mirror of this example is designed to change the shape of the reflecting surface utilizing electromagnetic force. A permanent magnet 426 is fixed on the bottom surface inside of the support 423, and the periphery of the substrate 409e made of silicon nitride, polyimide or the like is mounted and fixed on the top face of the support 423. The surface of the substrate 409e is provided with the thin film 409a made of metal coating such as aluminum, to form the deformable mirror 409.

A plurality of coils 427 are fixedly mounted on the back surface of the substrate 409e, and are connected with the arithmetical unit 414 via the driving circuits 428, respectively. Other reference numerals in FIG. 31 are the same as those in FIG. 26. When appropriate currents are supplied to the individual coils 427 from the individual driving circuits 428 based on output signals from the arithmetical unit 414, which depend on a required change of the optical system determined by the arithmetical unit 414 on the basis of signals from the respective sensors 415, 416, 417, and 424, the coils 427 are repelled or attracted by the electromagnetic force acting with the permanent magnet 426, to deform the substrate 409e and the thin film 409a.

In this case, it can be designed so that different amounts of electric current flow through the respective coils 427. Also, the coils 427 may be provided as a single coil. Alternatively, it may be designed so that the permanent magnet 426 is mounted on the back surface of the substrate 409e and the coils 427 are arranged on the bottom surface inside the support 423. Also, fabricating the coils 427 as thin film coils by lithography process is preferable. In addition, a ferromagnetic iron core may be encased in each coil 427.

In the case where thin film coils are used, it can be designed so that coil density of the thin-film coils 427 varies position by position on the back surface of the substrate 409e, as illustrated in FIG. 32 as a coil 428', thereby to give the substrate 409e and the thin film 409a a desirable deformation. Also, the coils 427 may be provided as a single coil, or may encase ferromagnetic iron cores inserted therein.

FIG. 33 is a schematic configuration diagram that shows still another example of the deformable mirror 409 applicable as a variable mirror used in the zoom optical system according to the present invention.

According to this example, the substrate 409e is made of a ferromagnetic such as iron and the thin film 409a as a reflecting film is made of aluminum or the like. The periphery of the substrate 409e is mounted and fixed on the top face of the support 423. The coils 427 are fixed on the bottom surface inside the support 423. In this case, since thin-film coils need not be provided on the back surface of the substrate 409e, the structure can be made simple, to reduce manufacture cost. Also, if the power switch 413 is replaced by an alternation and power on-off switch, directions of currents flowing through the coils 427 are changeable, and accordingly the substrate 409e and the thin film 409a are freely deformable.

FIG. 34 shows an arrangement example of the coils 427 arranged in reference to the thin film 409a and the substrate 409e. FIG. 35 shows another arrangement example of the coils 427. These arrangements are applicable to the examples shown in FIG. 31, also. It is noted that FIG. 36 shows an arrangement of permanent magnets 426 that is suitable to the case where the coils 427 are arranged in a radial pattern as shown in FIG. 35. Specifically, the radial arrangement of the bar-shaped permanent magnets 426 as shown in FIG. 36 can give the substrate 409*e* and the thin film 409*a* finer deformation than the example shown in FIG. 31. In addition, deforming the substrate 409*e* and the thin film 409*a* by electromagnetic force (the examples of FIG. 31 and FIG. 33) has a merit that the substrate and the thin film can be driven at a lower voltage than in the case where electrostatic force is used.

While several examples of the deformable mirror are described above, two or more kinds of forces may be used for deformation of a mirror formed of a thin film as set forth in the example of FIG. 30. Specifically, two or more kinds of forces out of electrostatic force, electromagnetic force, piezoelectric effect, magnetrostriction, pressure of fluid, electric field, magnetic field, temperature change, electromagnetic wave, etc. may be simultaneously used, to deform the deformable mirror. Accordingly, if two or more different driving methods are used to make the variable optical-property optical element, substantial deformation and fine deformation can be simultaneously achieved, to realize a mirror surface with high accuracy.

FIG. 37 is a schematic configuration diagram of an imaging system, which uses the deformable mirror 409 as a deformable mirror applicable to the imaging apparatus using the zoom optical system according to the present invention, such an imaging system being applied to a digital camera of a cellular phone, a capsule endoscope, an electronic endoscope, a digital camera for a personal computer, and a digital camera for a PDA.

In the imaging optical system of this example, the deformable mirror 409, the lens 902, the solid-state image sensor 408, and a control system 103 form an imaging unit 104, namely one imaging device. In the imaging unit 104 of this example, the configuration is made so that light from an object passing through the lens 902 is reflected at the thin film (reflecting surface) 409*a* of the deformable mirror 409 to be converged and imaged on the solid-state image sensor 408. The deformable mirror 409 is a kind of variable optical-property optical element, and is referred to as a variable focus mirror also.

According to this example, even when the object distance is changed, the object can be brought into focus by deformation of the reflecting surface 409*a* of the deformable mirror 409. Therefore, the configuration does not require any motor or the like to move the lenses and thus excels in achieving compact and lightweight design and low power consumption. Also, the imaging unit 104 is applicable, as an imaging optical system according to the present invention, to each of the examples. Also, if a plurality of deformable mirrors 409 are used, an optical system such as a zoom imaging optical system or a variable magnification imaging system can be constructed.

It is noted that FIG. 37 shows a configuration example of the control system 103, which includes a boosting circuit of a transformer using coils. Specifically, use of a laminated piezoelectric transformer would facilitate compact design and thus is favorable. A boosting circuit may be used in any of the deformable mirrors and variable focus lenses of the present invention that use electricity, and, in particular, is useful for a deformable mirror or a variable focus lens that utilizes electrostatic force or piezoelectric effect. In order to use the deformable mirror 409 for focusing, it is only necessary to form an object image on the solid-state image sensor 408, for example, and to detect a state where high-frequency components of the object image are maximized while changing the focal length of the deformable mirror 409. In order to detect high-frequency components, it is only necessary to connect a processor including a microcomputer and so on with the solid-state image sensor 408 and to detect the high-frequency components therein.

FIG. 38 is a schematic configuration diagram that relates to still another example of the deformable mirror applicable to the zoom optical system according to the present invention. The deformable mirror 188 of FIG. 38 is constructed so that fluid 161 in a pipe 106*a* is taken in and out by a micropump 180 to deform a mirror surface, which is the outside surface of a reflecting film 189 spread across the upper face of a support 189*a*. This example has a merit that the mirror surface can be considerably deformed. Also, a liquid tank 168 is provided between the support 189*a* and the micropump 180, which are connected by the pipe, so that the fluid 161 can be supplied by a preset amount inside the support 189*a*.

The micropump 180 is, for example, a small-sized pump fabricated by micromachining technique and is configured to work using an electric power. As examples of pumps fabricated by the micromachining technique, there are those which use thermal deformation, piezoelectric substance, electrostatic force, etc.

FIG. 39 is a schematic configuration diagram that shows one example of the micropump. In the micropump 180, a vibrating plate 181 is vibrated by an electric force such as electrostatic force, piezoelectric effect or the like. FIG. 39 shows an example where vibration is caused by the electrostatic force. In FIG. 39, the reference numerals 182 and 183 denote electrodes. Also, the dash lines indicate the vibrating plate 181 as deformed. As the vibrating plate 181 vibrates, tips 184*a* and 185*a* of two valve 184 and 185 are opened and closed, to feed the fluid 161 from the right to the left.

In the deformable mirror 188 shown in FIG. 38, the surface of the reflecting film 189 functions as a deformable mirror upon the reflecting film 189 being deformed into a concave or convex shape in accordance with an amount of the fluid 161. That is, the deformable mirror 188 is driven by the fluid 161. Organic or inorganic substance, such as silicon oil, air, water, and jelly, can be used as the fluid.

Also, a deformable mirror, a variable focus lens or the like using electrostatic force or piezoelectric effect sometimes requires a high voltage for driving it. In this case, as shown in FIG. 37, for example, a boosting transformer or a piezoelectric transformer is preferably used to configure the control system.

Also, if the thin film 409*a* or the reflecting film 189 for reflection is provided with a non-deformable portion to be fixed to the support 423 or the support 189*a*, this portion can be conveniently used as a reference surface for measuring the shape of the deformable mirror with an interferometer or the like.

FIG. 40 shows an example where a variable focus lens is used as the variable focus mirror in the zoom optical system according to the present invention. The variable focus mirror 565 includes a first transparent substrate 566 having first and second surfaces 566*a* and 566*b*, and a second transparent substrate 567 having third and fourth surfaces 567*a* and 567*b*. The first transparent substrate 566 is configured to have a flat plate shape or a lens shape and to be provided with a transparent electrode 513*a* on the inner surface (the second surface) 566*b* thereof. The second transparent substrate 567 is configured so that the inner surface (the third surface) 567*a* thereof is shaped as a concave surface, which is coated with a reflecting film 568, on which a transparent electrode 513*b* is further provided. A macromolecular dispersed liquid crystal layer 514 is sandwiched between the transparent electrodes 513*a* and 513*b* so that an alternating-current voltage is applied thereto as the transparent electrodes 513a and 513b are connected with an alternating-current power supply 516 via a switch 515 and a variable resistor 519. In FIG. 40, illustration of liquid crystal molecules is omitted.

In this configuration, since a ray of light incident on the mirror from the side of the transparent substrate 566 forms a path reciprocated in the macromolecular dispersed liquid crystal layer 514 by the reflecting film (reflecting surface) 568, the macromolecular dispersed liquid crystal layer 514 exerts its function twice. Also, by changing the voltage applied to the macromolecular dispersed liquid crystal layer 514, it is possible to shift the focal position for reflected light. In this case, since a ray of light incident on the variable focus mirror 565 is transmitted through the macromolecular dispersed liquid crystal layer 514 twice, when twice the thickness of the macromolecular dispersed liquid crystal layer 514 is represented by t, the numerical conditions set forth above are applicable in the similar manner. Also, the inner surface of the transparent substrate 566 or 567 can be configured as a diffraction grating, to reduce the thickness of the macromolecular dispersed liquid crystal layer 514. This solution is favorable in reducing scattered light.

In the description set forth above, the alternating-current power supply 516 is used as a power source to apply an alternating-current voltage to the liquid crystal layer for the purpose of preventing deterioration of the liquid crystal. However, a direct-current power supply may be used to apply a direct-current voltage to the liquid crystal. Change of orientation of the liquid crystal molecules may be achieved by, not limited to the technique of changing the voltage, a technique of changing frequency of an electric field applied to the liquid crystal layer, intensity and frequency of a magnetic field applied to the liquid crystal layer, or temperature or the like of the liquid crystal layer. Some kind of macromolecular dispersed liquid crystal is nearly a solid rather than a liquid. In such a case, therefore, one of the transparent substrates 566 and 567 shown in FIG. 40 is dispensable.

The optical element of the type as set forth in reference to FIG. 40, the focal length of which is changed by altering the refracting index of a medium that forms a macromolecular dispersed liquid crystal layer, has merits such that it facilitates mechanical design, has a simple mechanical structure and so on because of its unchanged shape.

In the present invention, a variable focus mirror that is non-deformable as shown in FIG. 40 also is classified into the deformable mirror.

FIG. 41 is a schematic configuration diagram that shows still another example of the deformable mirror applicable as a deformable mirror used in the zoom optical system according to the present invention. In this example, explanation is made on the basis of the supposition that the deformable mirror is applied to a digital camera. In FIG. 41, the reference numeral 411 denotes a variable resistor, the reference numeral 414 denotes an arithmetical unit, the reference numeral 415 denotes a temperature sensor, the reference numeral 416 denotes a humidity sensor, the reference numeral 417 denotes a range sensor, and the reference numeral 424 denotes a shake sensor.

The deformable mirror 45 of this example is configured to provide a plurality of segmented electrodes 409b disposed spaced away from an electrostrictive substance 453 made of an organic substance such as acrylic elastomer, to provide an electrode 452 and a deformable substrate 451 arranged in this order on the electrostrictive substance 453, and to provide a reflecting film 450 made of metal such as aluminum further on the substrate 451. In this way, the deformable layer of the deformable mirror 45 has a four-layer structure.

This configuration has a merit that the surface of the reflecting film (reflecting surface) 450 is made smoother than in the case where the segmented electrodes 409b and the electrostrictive substance 453 are integrally constructed and thus aberrations are hard to generate optically. It is noted that the arrangement order of the deformable substrate 451 and the electrodes 452 may be reversed.

In FIG. 41, the reference numeral 449 denotes a button for performing magnification change or zooming of the optical system. The deformable mirror 45 is controlled via the arithmetical unit 414 so that a user can change the shape of the reflecting film 450 for magnification change or zooming by pushing the button 449.

It is noted that a piezoelectric substance such as barium titanate set forth above may be used instead of the electrostrictive substance made of an organic substance such as acrylic elastomer.

As is commonly applicable to the various deformable mirrors described above, it is desirable that the contour of the deformable portion of the reflecting surface as viewed from a direction perpendicular to the reflecting surface is oblong in the direction of the plane of incidence of an axial ray, for example, elliptical, oval, or polygonal. The reason is as follows. The deformable mirror, as in the example of FIG. 25, is often used in a state where a ray of light is incident at a grazing angle. In order to suppress aberrations generated in this case, it is desirable that the reflecting surface has a shape similar to ellipsoid of revolution, paraboloid of revolution, or hyperboloid of revolution. If the contour of the deformable portion of the reflecting surface as viewed from the direction perpendicular to the reflecting surface is shaped oblong in the direction of the plane of incidence of an axial ray, the reflecting surface of the deformable mirror can be easily deformed into a shape similar to ellipsoid of revolution, paraboloid of revolution, or hyperboloid of revolution, which is advantageous for compensation for aberrations.

Finally, definitions of terms used in the present invention will be described.

The optical apparatus signifies an apparatus including an optical system or optical elements. It is not necessary that the optical apparatus can function by itself, that is, the optical apparatus may be a part of an apparatus. An imaging apparatus, an observation apparatus, a display apparatus, an illumination apparatus, a signal processing apparatus, etc. are classified into the optical apparatus.

As examples of the imaging apparatus, there are a film camera, a digital camera, robot eyes, a lens-exchange-type digital single-lens reflex camera, a TV camera, a motion-picture recording apparatus, an electronic motion-picture recording apparatus, a camcorder, a VTR camera, an electronic endoscope, etc. The digital camera, a card-type digital camera, the TV camera, the VTR camera, the motion-picture recording camera, etc. are examples of the electronic imaging apparatus.

As examples of the observation apparatus, there are a microscope, a telescope, spectacles, binoculars, a magnifying glass, a fiberscope, a finder, a viewfinder, etc.

As examples of the display apparatus, there are a liquid crystal display, a viewfinder, a game machine (PlayStation by SONY), a video projector, a liquid crystal projector, a head mounted display (HMD), a personal data assistant (PDA), a cellular phone, etc.

As examples of the illumination apparatus, there are a strobe for a camera, a headlight of an automobile, a light source for an endoscope, a light source for a microscope, etc.

As examples of the signal processing apparatus, there are a cellular phone, a personal computer, a game machine, a read/write apparatus for optical discs, an arithmetical unit in an optical computer, etc.

The zoom optical system according to the present invention is small and lightweight, and thus is effectively used as an imaging system in an electronic imaging apparatus or in a signal processing apparatus, in particular, in a digital camera or a cellular phone.

The image pickup element signifies, for example, a CCD, a pickup tube, a solid-state image sensor, a photographic film, etc. A plane parallel plate is classified into the prism. Change of the observer includes the case where the diopter is changed. Change of the object includes the cases where the object distance is changed, where the object is displaced, where the object is moved, vibrated, or shaken, etc.

The expanded curved surface is defined as follows.

Not limited to a spherical, planar or rotationally symmetric aspherical surface, a surface may be configured as a spherical, planar or rotationally symmetric aspherical surface that is decentered from the optical axis; an aspherical surface defining planes of symmetry, only one plane of symmetry or no plane of symmetry; a free-formed surface; a surface having an indifferentiable point or line, or the like. In addition, irrespective of whether it is a reflecting surface or a refracting surface, any surface is applicable as long as it can exert some effect on light. According to the present invention, these surfaces are generally referred to as expanded curved surfaces.

A variable focus lens, a deformable mirror, a polarizing prism having a variable surface shape, a variable apex-angle prism, a variable diffraction optical element having a variable light-deflecting function, that is, a variable HOE or a variable DOE, etc. are classified into the variable optical-property optical element. A variable lens that changes not the focal length but the amount of aberrations is classified into the variable focus lens, also. Regarding the deformable mirror also, similar classification is applied. To conclude, an optical element that is changeable in light deflecting function such as reflection, refraction and diffraction is referred to as a variable optical-property optical element.

The data transmitter signifies an apparatus that allows data to be input therein and transmits the data, including a cellular phone; a fixed phone; a game machine; a remote controller of a TV set, a radio cassette recorder or a stereo set; a personal computer; and a keyboard, a mouse, a touch panel, etc. of a computer. A TV monitor provided with an imaging device, and a monitor and a display of a personal computer also are classified into the data transmitter. Also, the data transmitter is classified into the signal processing apparatus.

What is claimed is:

1. A zoom optical system comprising:
   an optical-element group moved in a magnification change; and
   a variable optical-property optical element,
   wherein only the optical-element group is moved in the magnification change, and
   wherein the variable optical-property optical element is a reflection-type optical element and has at least one of a compensating function for compensating for a shift of an image surface caused by the magnification change and a focusing function.

2. A zoom optical system comprising:
   two optical-element groups; and
   a variable optical-property optical element,
   wherein the two optical-element groups are movable in a magnification change and have a magnification varying function or a compensating function for compensating for a shift of an image surface caused by the magnification change, and
   wherein the variable optical-property optical element has a focusing function.

3. A zoom optical system comprising:
   an optical-element group moved in a magnification change; and
   a variable optical-property optical element,
   wherein only the optical-element ground is moved in the magnification change,
   wherein the variable optical-property optical element has at least one of a compensating function for compensating for a shift of an image surface caused by the magnification change and a focusing function, and
   wherein the variable optical-property optical element has a rotationally asymmetric curved surface that has a function for compensating for decentered aberrations.

4. A zoom optical system according to claim 2, wherein the variable optical-property optical element has a rotationally asymmetric curved surface that has a function for compensating for decentered aberrations.

5. A zoom optical system comprising:
   an optical-element group moved in a magnification change; and
   a variable optical-property optical element,
   wherein only the optical-element group is moved in the magnification change,
   wherein the variable optical-property optical element has at least one of a compensating function for compensating for a shift of an image surface caused by the magnification change and a focusing function, and
   wherein the variable optical-property optical element satisfies the following conditions:

$$\phi_{DMW} > \phi_{DMS}$$

$$\phi_{DMT} > \phi_{DMS}$$

where $\phi_{DMW}$, $\phi_{DMS}$, and $\phi_{DMT}$ are optical powers of the variable optical-property optical element, under a condition where an object distance is infinite, at a wide-angle end, at an intermediate position, and at a telephoto end, respectively, and each of $\phi_{DMW}$, $\phi_{DMS}$, and $\phi_{DMT}$ is an average value of a power $\phi_{DMiy}$ (i=W, S, T) in a plane of a decentration direction (Y direction) and a power $\phi_{DMix}$ (i=W, S, T) in a plane of a direction perpendicular thereto (X direction) of the variable optical-property optical element, as defined as follows:

$$\phi_{DMW} = (\phi_{DMWx} + \phi_{DMWy})/2$$

$$\phi_{DMS} = (\phi_{DMSx} + \phi_{DMSy})/2$$

$$\phi_{DMT} = (\phi_{DMTx} + \phi_{DMTy})/2.$$

6. A zoom optical system according to claim 1, wherein the variable optical-property optical element has both of a state where an optical power thereof is negative and a state where an optical power thereof is positive.

7. A zoom optical system comprising:
an optical-element group moved in a magnification change; and
a variable optical-property optical element,
wherein only the optical-element group is moved in the magnification change,
wherein the variable optical-property optical element has at least one of a compensating function for compensating for a shift of an image surface caused by the magnification change and a focusing function, and
wherein the variable optical-property optical element has a positive optical power only.

8. A zoom optical system according to claim 1, wherein the zoom optical system has at least one negative lens disposed on an object side of the variable optical-property optical element.

9. A zoom optical system comprising:
an optical-element around moved in a magnification change; and
a variable optical-property optical element,
wherein only the optical-element group is moved in the magnification change,
wherein the variable optical-property optical element has at least one of a compensating function for compensating for a shift of an image surface caused by the magnification change and a focusing function, and
wherein at least one refracting surface is formed as a rotationally asymmetric surface.

10. A zoom optical system comprising:
an optical-element group moved in a magnification change; and
a variable optical-property optical element,
wherein only the optical-element group is moved in the magnification change,
wherein the variable optical-property optical element has at least one of a compensating function for compensating for a shift of an image surface caused by the magnification change and a focusing function, and
wherein the following condition is satisfied:

$$0.3 < |\eta_W| \times |\eta_T| < 3.0$$

where $\eta_W$ and $\eta_T$ are magnifications of an optical-element group having a magnification varying function, at a wide-angle end and at a telephoto end, respectively.

11. A zoom optical system according to claim 1, wherein the variable optical-property optical element is arranged in a most object-side negative lens group.

12. A zoom optical system comprising:
an optical-element group moved in a magnification change; and
a variable optical-property optical element,
wherein only the optical-element group is moved in the magnification change,
wherein the variable optical-property optical element has at least one of a compensating function for compensating for a shift of an image surface caused by the magnification change and a focusing function,
wherein the variable optical-property optical element is arranged in a most object-side negative lens group, and
wherein the following condition is satisfied:

$$-8.0 < f_{1a}/f_{WT} < -0.5$$

where $f_{1a}$ is a focal length of an optical element disposed on an object side of the variable optical-property optical element, and $f_{WT}$ is a value defined by the following equation:

$$f_{WT} = \sqrt{(f_W \times f_T)}$$

where $f_W$ and $f_T$ are focal lengths of an entire system, under a condition where an object distance is infinite, at a wide-angle end and at a telephoto end, respectively.

13. A zoom optical system according to claim 2, wherein the variable optical-property optical element has a focusing function and is disposed before the optical-element group having a magnification varying function.

14. A zoom optical system comprising:
an optical-element group moved in a magnification change; and
a variable optical-property optical element,
wherein only the optical-element group is moved in the magnification change,
wherein the variable optical-property optical element has at least one of a compensating function for compensating for a shift of an image surface caused by the magnification change and a focusing function, and
wherein the optical-element group is a variator group having a magnification varying function, and the variable optical-property optical element has a focusing function and a compensating function and is disposed before the variator group.

15. A zoom optical system comprising:
an optical-element group moved in a magnification change; and
a variable optical-property optical element,
wherein only the optical-element group is moved in the magnification change,
wherein the variable optical-property optical element has at least one of a compensating function for compensating for a shift of an image surface caused by the magnification change and a focusing function, and
wherein the optical-element group moved in a magnification change is a second group having a positive refracting power, the zoom optical system further comprises a first group with a negative optical power disposed on an object side of the second group and a third group with a positive optical power disposed on an image side of the second group, and the variable optical-property optical element is arranged in the first group with a negative optical power.

16. A zoom optical system according to claim 15, further comprising a fourth group with a positive power disposed on an object side of the third group.

17. A zoom optical system comprising:
an optical-element group moved in a magnification change; and
a variable optical-property optical element,
wherein only the optical-element group is moved in the magnification change,
wherein the variable optical-property optical element has at least one of a compensating function for compensating for a shift of an image surface caused by the magnification change and a focusing function, and
wherein the zoom optical system comprises at least two variable optical-property optical elements.

18. A zoom optical system according to claim 17, wherein an inner product of vectors that express azimuths of an axial ray incident on the two variable optical-property optical elements has a negative value.

19. A zoom optical system according to claim 17, wherein a stop is arranged between the two variable optical-property optical elements.

20. A zoom optical system comprising:
an optical-element group moved in a magnification change; and
a variable optical-property optical element,
wherein only the optical-element group is moved in the magnification change,
wherein the variable optical-property optical element has at least one of a compensating function for compensating for a shift of an image surface caused by the magnification change and a focusing function, and
wherein an angle Φ of turning of an optical axis caused by the variable optical-property optical element satisfies the following condition:

$70° \leq \Phi \leq 110°$.

21. A zoom optical system comprising:
an optical-element group moved in a magnification change; and
a variable optical-property optical element,
wherein only the optical-element ground is moved in the magnification change,
wherein the variable optical-property optical element has at least one of a compensating function for compensating for a shift of an image surface caused by the magnification change and a focusing function, and
wherein the variable optical-property optical element is driven by one of an electrostatic force, an electromagnetic force, a piezoelectric effect, and fluid.

22. A zoom optical system comprising:
an optical-element group moved in a magnification change; and
a mirror,
wherein only the optical-element group is moved in the magnification change,
wherein the mirror has at least one of a compensating function for compensating for a shift of an image surface caused by the magnification change and a focusing function.

23. An imaging apparatus comprising:
a zoom optical system according to claim 1.

24. An imaging apparatus comprising:
a zoom optical system according to claim 2.

* * * * *

UNITED STATES PATENT AND TRADEMARK OFFICE
CERTIFICATE OF CORRECTION

PATENT NO. : 6,927,920 B2 Page 1 of 1
APPLICATION NO. : 10/457363
DATED : August 9, 2005
INVENTOR(S) : Tetsuo Nagata It is certified that error appears in the above-identified patent and that said Letters Patent is hereby corrected as shown below:

Claim 3, (Col. 64, line 16) replace "ground" with -- group --;
Claim 9, (Col. 65, line 19) replace "around" with -- group --.

Signed and Sealed this

Eleventh Day of July, 2006

JON W. DUDAS
*Director of the United States Patent and Trademark Office*